US012571990B2

(12) United States Patent
Yeh et al.

(10) Patent No.: US 12,571,990 B2
(45) Date of Patent: Mar. 10, 2026

(54) IMAGING OPTICAL SYSTEM LENS ASSEMBLY, IMAGING APPARATUS AND ELECTRONIC DEVICE

(71) Applicant: LARGAN PRECISION CO., LTD., Taichung City (TW)

(72) Inventors: Kuan-Ting Yeh, Taichung City (TW); Meng-Kuan Cho, Taichung City (TW); Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 563 days.

(21) Appl. No.: 18/060,997

(22) Filed: Dec. 2, 2022

(65) Prior Publication Data
US 2023/0228973 A1 Jul. 20, 2023

(30) Foreign Application Priority Data

Jan. 14, 2022 (TW) .................................. 111101769

(51) Int. Cl.
*G02B 9/62* (2006.01)
*G02B 1/04* (2006.01)

(52) U.S. Cl.
CPC ............... *G02B 9/62* (2013.01); *G02B 1/041* (2013.01)

(58) Field of Classification Search
CPC .... G02B 1/041; G02B 13/18; G02B 13/0045; G02B 27/0172; G02B 27/0012; G02B 27/0025; G02B 13/16; G02B 13/0015; G02B 15/146; G02B 9/62; G02B 9/64; H04N 5/222; H04N 5/2254

USPC ................ 359/656–658, 708, 713, 749, 752, 359/756–762
See application file for complete search history.

(56) References Cited

U.S. PATENT DOCUMENTS

| | | | |
|---|---|---|---|
| 3,642,351 A | 2/1972 | Tronnier | |
| 2016/0147044 A1* | 5/2016 | Kondo | ............... G02B 13/0045 359/761 |
| 2017/0357079 A1 | 12/2017 | Liao | |
| 2019/0331900 A1 | 10/2019 | Yao | |
| 2020/0018928 A1 | 1/2020 | Chen | |
| 2020/0026043 A1 | 1/2020 | Jung | |

(Continued)

FOREIGN PATENT DOCUMENTS

| | | |
|---|---|---|
| CN | 107783259 A | 3/2018 |
| CN | 207488602 U | 6/2018 |

(Continued)

*Primary Examiner* — Travis S Fissel
(74) *Attorney, Agent, or Firm* — McClure, Qualey & Rodack, LLP

(57) ABSTRACT

An imaging optical system lens assembly includes six lens elements, which is, in order from an object side to an image side along an optical path, a first lens element, a second lens element, a third lens element, a fourth lens element, a fifth lens element and a sixth lens element. The first lens element has negative refractive power, the object-side surface of the first lens element is concave in a paraxial region thereof, the image-side surface of the first lens element is convex in a paraxial region thereof. The second lens element has positive refractive power, the object-side surface of the second lens element is convex in a paraxial region thereof, the image-side surface of the second lens element is concave in a paraxial region thereof. The fifth lens element has positive refractive power.

32 Claims, 33 Drawing Sheets

(56)　　　　　References Cited

U.S. PATENT DOCUMENTS

| | | | |
|---|---|---|---|
| 2021/0011260 A1 | 1/2021 | Dai | |
| 2021/0018726 A1 | 1/2021 | Feng | |
| 2021/0286152 A1 | 9/2021 | Jia | |
| 2022/0035133 A1 | 2/2022 | Chen et al. | |
| 2022/0091382 A1* | 3/2022 | Dou | G02B 9/62 |
| 2022/0137342 A1* | 5/2022 | Zhou | G02B 27/0025 |
| | | | 359/714 |
| 2022/0187574 A1 | 6/2022 | Yamazaki et al. | |
| 2022/0187575 A1 | 6/2022 | Oinuma et al. | |

FOREIGN PATENT DOCUMENTS

| | | | |
|---|---|---|---|
| CN | 109212721 A | 1/2019 |
| CN | 110297307 A | 10/2019 |
| CN | 110297314 A | 10/2019 |
| CN | 110579863 A | 12/2019 |
| CN | 209911635 U | 1/2020 |
| CN | 110955022 A | 4/2020 |
| CN | 111025582 A | 4/2020 |
| CN | 111025583 A | 4/2020 |
| CN | 111856730 A | 10/2020 |
| CN | 111897101 A | 11/2020 |
| CN | 111983784 A | 11/2020 |
| CN | 112198628 A | 1/2021 |
| CN | 112230398 A | 1/2021 |
| CN | 112269243 A | 1/2021 |
| CN | 111221099 B | 9/2021 |
| JP | H07174972 A | 7/1995 |
| JP | 2002162562 A | 6/2002 |
| JP | 2015125405 A | 7/2015 |
| WO | 2018113071 A1 | 6/2018 |
| WO | 2021003714 A1 | 1/2021 |

* cited by examiner

100

101

102

103

104

200

300

301

310

320

330

IMAGING OPTICAL SYSTEM LENS ASSEMBLY, IMAGING APPARATUS AND ELECTRONIC DEVICE

RELATED APPLICATIONS

This application claims priority to Taiwan Application Serial Number 111101769, filed Jan. 14, 2022, which is herein incorporated by reference.

BACKGROUND

Technical Field

The present disclosure relates to an imaging optical system lens assembly and an imaging apparatus. More particularly, the present disclosure relates to an imaging optical system lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an image capturing system lens assembly that meets the aforementioned needs.

SUMMARY

According to one aspect of the present disclosure, an imaging optical system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The first lens element preferably has negative refractive power, the object-side surface of the first lens element preferably is concave in a paraxial region thereof, the image-side surface of the first lens element preferably is convex in a paraxial region thereof. The second lens element preferably has positive refractive power, the object-side surface of the second lens element preferably is convex in a paraxial region thereof, the image-side surface of the second lens element preferably is concave in a paraxial region thereof. The fifth lens element preferably has positive refractive power. When a central thickness of the third lens element is CT3, a central thickness of the fourth lens element is CT4, a central thickness of the fifth lens element is CT5, a focal length of the imaging optical system lens assembly is f, a focal length of the fourth lens element is f4, and a focal length of the sixth lens element is f6, the following conditions preferably are satisfied: $5.30 < (CT3+CT5)/CT4 < 15.0$; $-2.10 < f/f4 < 1.00$; and $-0.35 < f/f6 < 0.90$.

According to one aspect of the present disclosure, an imaging apparatus includes the imaging optical system lens assembly of the aforementioned aspect and an image sensor, wherein the image sensor is disposed on the image surface of the imaging optical system lens assembly.

According to one aspect of the present disclosure, an electronic device includes the imaging apparatus of the aforementioned aspect.

According to one aspect of the present disclosure, an imaging optical system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The first lens element preferably has negative refractive power, the object-side surface of the first lens element preferably is concave in a paraxial region thereof, the image-side surface of the first lens element preferably is convex in a paraxial region thereof. The image-side surface of the second lens element preferably is concave in a paraxial region thereof. The fifth lens element preferably has positive refractive power. At least one surface of at least one of the six lens elements preferably includes at least one inflection point. When a curvature radius of the image-side surface of the second lens element is R4, a curvature radius of the image-side surface of the sixth lens element is R12, a focal length of the imaging optical system lens assembly is f, a focal length of the sixth lens element is f6, an axial distance between the third lens element and the fourth lens element is T34, an axial distance between the fourth lens element and the fifth lens element is T45, and an axial distance between the fifth lens element and the sixth lens element is T56, the following conditions preferably are satisfied: $1.60 < (R4+R12)/(R4-R12) < 3.30$; $4.22 < f/(T34+T45+T56) < 15.0$; and $-0.63 < f/f6 < 1.20$.

According to one aspect of the present disclosure, an imaging optical system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The first lens element preferably has negative refractive power, the object-side surface of the first lens element preferably is concave in a paraxial region thereof, the image-side surface of the first lens element preferably is convex in a paraxial region thereof. The third lens element preferably has positive refractive power. The image-side surface of the sixth lens element preferably is concave in a paraxial region thereof. At least one surface of at least one of the six lens elements preferably includes at least one inflection point. When a curvature radius of the image-side surface of the second lens element is R4, a curvature radius of the image-side surface of the fifth lens element is R10, a curvature radius of the image-side surface of the sixth lens element is R12, a focal length of the imaging optical system lens assembly is f, a focal length of the fourth lens element is f4, and a focal length of the sixth lens element is f6, the following conditions preferably are satisfied: $(R4+R12)/(R4-R12) < 2.32$; $-0.65 < f/f4 < 0.80$; $-0.37 < f/f6 < 1.00$; and $-4.00 < R10/R12 < -1.55$.

According to one aspect of the present disclosure, an imaging optical system lens assembly includes six lens elements, the six lens elements being, in order from an object side to an image side along an optical path, a first lens element, a second lens element, a third lens element, a fourth lens element, a fifth lens element and a sixth lens element.

Each of the six lens elements has an object-side surface towards the object side and an image-side surface towards the image side. The first lens element preferably has negative refractive power. At least one surface of at least one of the six lens elements preferably includes at least one inflection point. The imaging optical system lens assembly further preferably includes an aperture stop. When an axial distance between the aperture stop and an image surface is SL, a focal length of the imaging optical system lens assembly is f, a focal length of the sixth lens element is f6, a composite focal length of the second lens element and the third lens element is f23, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a central thickness of the third lens element is CT3, a central thickness of the fourth lens element is CT4, and a central thickness of the fifth lens element is CT5, the following conditions preferably are satisfied: $4.50<(CT3+CT5)/CT4<8.00$; $1.95<f/(T12+T23)<16.0$; $3.70<f/(T34+T45+T56)<14.5$; $-0.10<f/f23<0.92$; $-0.25<f/f6<0.55$; and $2.00<SL/f<2.90$.

DETAILED DESCRIPTION

Figure 1:
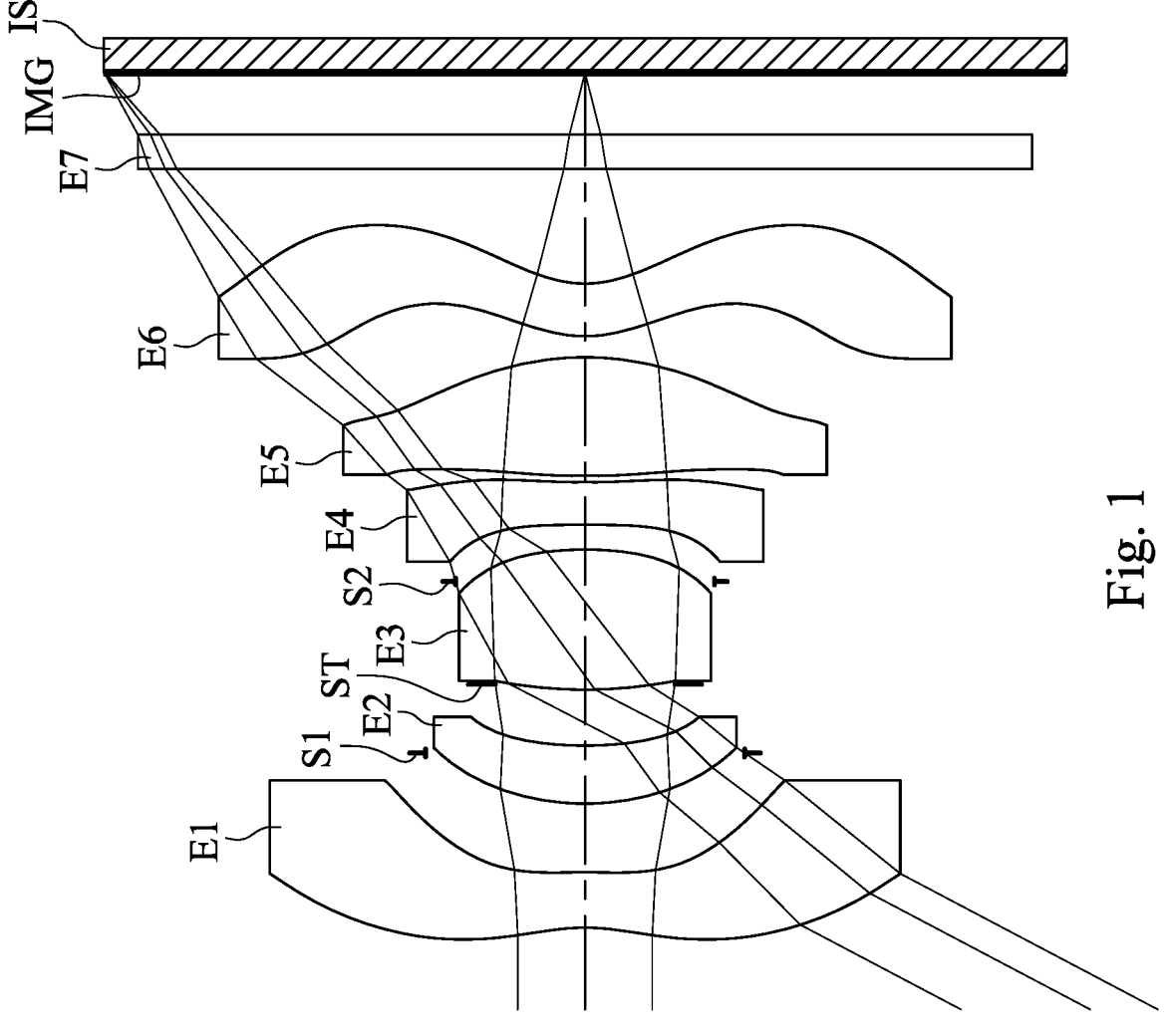
FIG. 1 is a schematic view of an imaging apparatus according to the 1st embodiment of the present disclosure.

The present disclosure provides an imaging optical system lens assembly, which includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side.

The first lens element has negative refractive power, so that it is favorable for increasing field of view and image size. The object-side surface of the first lens element can be concave in a paraxial region thereof, so that it is favorable for adjusting refractive power of the first lens element and reducing the total track length of the imaging optical system lens assembly. The image-side surface of the first lens element can be convex in a paraxial region thereof, so that it is favorable for enhancing the image quality by increasing field of view and adjusting refractive power of the first lens element.

The second lens element can have positive refractive power, which can cooperate with the first lens element so as to reduce the effective radius of the entire imaging optical system lens assembly. The object-side surface of the second lens element can be convex in a paraxial region thereof, so that aberrations can be corrected by adjusting the surface shape and refractive power of the second lens element. The image-side surface of the second lens element can be concave in a paraxial region thereof, so that it is favorable for reducing the flare in the center region by cooperating with the surface shape of the third lens element.

The third lens element can have positive refractive power, so that it is favorable for correcting aberrations, such as spherical aberration etc., by cooperating with the fourth lens element.

The fifth lens element can have positive refractive power, so that it is favorable for enlarging the image size and reducing the volume of the imaging optical system lens assembly. Further, at least one of the object-side surface and the image-side surface of the fifth lens element can include at least one critical point in an off-axis region thereof. Therefore, it is favorable for reducing coma aberration of the peripheral field by adjusting the surface shape of at least one of the object-side surface and the image-side surface of the fifth lens element.

The image-side surface of the sixth lens element can be concave in a paraxial region thereof, so that it is favorable for reducing the total track length of the imaging optical system lens assembly by adjusting the entire back focal length.

At least one surface of at least one of the six lens elements can include at least one inflection point. Therefore, it is favorable for reducing the field curvature of the peripheral field and enhancing the resolution of the peripheral field.

When a focal length of the imaging optical system lens assembly is f, and a focal length of the sixth lens element is f6, the following condition is satisfied: $-0.63 < f/f6 < 1.20$. Therefore, it is favorable for reducing spherical aberration of the central field by adjusting refractive power of the sixth lens element. Further, the following condition can be satisfied: $-0.37 < f/f6 < 1.00$. Furthermore, the following condition can be satisfied: $-0.35 < f/f6 < 0.90$. Moreover, the following condition can be satisfied: $-0.25 < f/f6 < 0.55$. Furthermore, the following condition can be satisfied: $-0.20 < f/f6 < 0.45$.

When a central thickness of the third lens element is CT3, a central thickness of the fourth lens element is CT4, and a central thickness of the fifth lens element is CT5, the following condition is satisfied: $5.30 < (CT3+CT5)/CT4 < 15.0$. Therefore, it is favorable for maintaining the thickness ratio from the third lens element to the fifth lens element by adjusting the ratio between the sum of the central thickness of the third lens element and the central thickness of the fifth lens element and the central thickness of the fourth lens element so as to reduce the manufacturing difficulties. Further, the following condition can be satisfied: $5.45 < (CT3+CT5)/CT4 < 9.10$. Furthermore, the following condition can be satisfied: $4.50 < (CT3+CT5)/CT4 < 8.00$.

When the focal length of the imaging optical system lens assembly is f, and a focal length of the fourth lens element is f4, the following condition is satisfied: $-2.10 < f/f4 < 1.00$. Therefore, it is favorable for balancing refractive power from the third lens element to the fifth lens element by adjusting refractive power of the fourth lens element so as to achieve better light focusing effect. Further, the following condition can be satisfied: $-0.65 < f/f4 < 0.80$. Furthermore, the following condition can be satisfied: $-0.38 < f/f4 < 0.80$. Moreover, the following condition can be satisfied: $-1.00 < f/f4 < 1.30$. Furthermore, the following condition can be satisfied: $-0.55 < f/f4 < 0.70$.

When a curvature radius of the image-side surface of the second lens element is R4, and a curvature radius of the image-side surface of the sixth lens element is R12, the following condition is satisfied: $1.35 < (R4+R12)/(R4-R12) < 5.00$. Therefore, it is favorable for balancing the light focusing quality among the second lens element to the sixth lens element by adjusting the curvature radius of the image-side surface of the second lens element and the curvature radius of the image-side surface of the sixth lens element so as to reduce spherical aberration of central and adjacent field. Further, the following condition can be satisfied: $1.60 < (R4+R12)/(R4-R12) < 3.30$. Furthermore, the following condition can be satisfied: $(R4+R12)/(R4-R12) < 2.32$. Moreover, the following condition can be satisfied: $1.70 < (R4+R12)/(R4-R12) < 2.30$.

When the focal length of the imaging optical system lens assembly is f, an axial distance between the third lens element and the fourth lens element is T34, an axial distance between the fourth lens element and the fifth lens element is T45, and an axial distance between the fifth lens element and the sixth lens element is T56, the following condition is satisfied: $4.22 < f/(T34+T45+T56) < 15.0$. Therefore, it is favorable for balancing the total track length of the imaging optical system lens assembly and assembling error by adjusting the ratio between the focal length and the sum of all distance between each adjacent lens elements from the third lens element to the sixth lens element. Further, the following condition can be satisfied: $3.70 < f/(T34+T45+T56) < 14.5$. Furthermore, the following condition can be satisfied: $4.50 < f/(T34+T45+T56) < 14.0$.

When a curvature radius of the image-side surface of the fifth lens element is R10, and the curvature radius of the image-side surface of the sixth lens element is R12, the following condition is satisfied: $R10/R12 < -1.60$. Therefore, it is favorable for maintaining the light focusing ability of the fifth lens element and the sixth lens element and reducing the back focal length by adjusting the ratio between the curvature radius of the image-side surface of the fifth lens element and the curvature radius of the image-side surface of the sixth lens element. Further, the following condition can be satisfied: $-4.00 < R10/R12 < -1.55$. Furthermore, the following condition can be satisfied: $-3.50 < R10/R12 < -1.70$.

When the focal length of the imaging optical system lens assembly is f, an axial distance between the first lens element and the second lens element is T12, and an axial distance between the second lens element and the third lens element is T23, the following condition is satisfied: $1.95 < f/(T12+T23) < 16.0$. Therefore, it is favorable for maintaining the distance between the first lens element to the third lens element and balancing the volume of the imaging optical system lens assembly by adjusting the ratio between the sum of the distances of each adjacent lens elements from the first lens element to the third lens element and the focal length. Further, the following condition can be satisfied: $1.70 < f/(T12+T23) < 3.80$. Furthermore, the following condition can be satisfied: $1.80 < f/(T12+T23) < 3.75$. Moreover, the following condition can be satisfied: $2.00 < f/(T12+T23) < 3.60$.

When the focal length of the imaging optical system lens assembly is f, and a composite focal length of the second lens element and the third lens element is f23, the following condition is satisfied: $-0.20 < f/f23 < 1.50$. Therefore, it is favorable for balancing refractive power of the first lens element and increasing field of view by adjusting entire refractive power of the second lens element and the third lens element. Further, the following condition can be satisfied: $-0.10 < f/f23 < 0.92$. Furthermore, the following condition can be satisfied: $0.20 < f/f23 < 1.50$.

The imaging optical system lens assembly can further include an aperture stop, when an axial distance between the aperture stop and an image surface is SL, and the focal length of the imaging optical system lens assembly is f, the following condition is satisfied: $2.00 < SL/f < 2.90$. Therefore, it is favorable for balancing the image size and the length of the lens elements on the image side of the aperture stop by adjusting the distance between the aperture stop and the image surface. Further, the following condition can be satisfied: $2.05 < SL/f < 2.75$. Furthermore, the following condition can be satisfied: $2.10 < SL/f < 2.50$.

When a focal length of the third lens element is f3, and a focal length of the fifth lens element is f5, the following condition is satisfied: $-0.50 < f3/f5 < 2.80$. Therefore, it is favorable for reducing astigmatism of the central and adjacent field by adjusting the ratio between the focal length of the third lens element and the focal length of the fifth lens element. Further, the following condition can be satisfied: $0.20 < f3/f5 < 2.70$.

When the focal length of the imaging optical system lens assembly is f, the central thickness of the third lens element is CT3, and the central thickness of the fifth lens element is CT5, the following condition is satisfied: $0.50 < f/(CT3+CT5) < 1.65$. Therefore, it is favorable for balancing the central light focusing quality and the size of the imaging optical system lens assembly by adjusting the ratio between the focal length of the imaging optical system lens assembly and the thicknesses of the third lens element and the fifth lens element. Further, the following condition can be satisfied: $0.90 < f/(CT3+CT5) < 1.27$.

When a curvature radius of the object-side surface of the sixth lens element is R11, and the curvature radius of the image-side surface of the sixth lens element is R12, the following condition is satisfied: $5.00 < (R11+R12)/(R11-R12) < 20.0$. Therefore, the sixth lens element can be cooperated with the fifth lens element by adjusting the surface shape of the sixth lens element so as to enhancing central image quality. Further, the following condition can be satisfied: $5.50 < (R11+R12)/(R11-R12) < 19.0$. Furthermore, the following condition can be satisfied: $7.00 < (R11+R12)/(R11-R12) < 17$. Moreover, the following condition can be satisfied: $4.90 < (R11+R12)/(R11-R12) < 17.0$.

When a curvature radius of the object-side surface of the third lens element is R5, and a curvature radius of the image-side surface of the third lens element is R6, the following condition is satisfied: $-5.00 < (R5+R6)/(R5-R6) < 1.50$. Therefore, the third lens element can be cooperated with the second lens element by adjusting the curvature radius of the object-side surface of the third lens element and the curvature radius of the image-side surface of the third lens element so as to reduce the effective radius and the size of the imaging optical system lens assembly. Further, the following condition can be satisfied: $-1.70 < (R5+R6)/(R5-R6) < 0.40$. Furthermore, the following condition can be satisfied: $-1.68 < (R5+R6)/(R5-R6) < 0.38$. Moreover, the following condition can be satisfied: $-1.30 < (R5+R6)/(R5-R6) < 0.18$.

When the focal length of the imaging optical system lens assembly is f, and the axial distance between the fourth lens element and the fifth lens element is T45, the following condition is satisfied: $18.0 < f/T45 < 65.0$. Therefore, it is favorable for balancing the total track length of the imaging optical system lens assembly and central chromatic aberration by adjusting the ratio between the distance between the fourth lens element and the fifth lens element and the focal length of the imaging optical system lens assembly. Further, the following condition can be satisfied: $20.0 < f/T45 < 70.0$. Furthermore, the following condition can be satisfied: $20.0 < f/T45 < 60.0$.

When an Abbe number of the second lens element is V2, and an Abbe number of the fourth lens element is V4, the following condition is satisfied: $12 < (V2+V4)/2 < 24$. Therefore, it is favorable for reducing chromatic aberration of the peripheral field by adjusting the average of the Abbe number of the second lens element and the Abbe number of the fourth lens element. Further, the following condition can be satisfied: $15 < (V2+V4)/2 < 20$.

When the focal length of the imaging optical system lens assembly is f, and a focal length of the fifth lens element is f5, the following condition is satisfied: $0.18 < f/f5 < 1.00$. Therefore, it is favorable for enhancing the resolution of the central and adjacent field by adjusting refractive power of the fifth lens element.

When a curvature radius of the object-side surface of the second lens element is R3, and the axial distance between the first lens element and the second lens element is T12, the following condition is satisfied: $2.50 < R3/T12 < 17.0$. Therefore, it is favorable for balancing the arrangement of the relative location of the first lens element and the second lens element and the decrease of spherical aberration by adjusting the ratio between the curvature radius of the object-side surface of the second lens element and the axial distance between the first lens element and the second lens element.

When a refractive index of the second lens element is N2, and a refractive index of the fourth lens element is N4, the following condition is satisfied: $1.62 < (N2+N4)/2 < 1.79$. Therefore, it is favorable for increasing the image size and reducing the effective radius by adjusting the average of the refractive index of the second lens element and the refractive index of the fourth lens element. Further, the following condition can be satisfied: $1.65 < (N2+N4)/2 < 1.75$.

When the axial distance between the fourth lens element and the fifth lens element is T45, and a central thickness of the fourth lens element is CT4, the following condition is satisfied: $0.05 < T45/CT4 < 0.35$. Therefore, it is favorable for balancing the assembling error of the fourth lens element and the manufacturing by adjusting the ratio between the axial distance between the fourth lens element and the fifth lens element and the thickness of the fourth lens element.

When an f-number of the imaging optical system lens assembly is Fno, the following condition is satisfied: $1.95 < Fno < 2.20$. Therefore, it is favorable for adjusting f-number of the lens elements so as to enhance the aperture size and maintain the illumination of the peripheral field, so that unable imaging can be avoided and the image quality can be maintained.

When a half of a maximum field of view of the imaging optical system lens assembly is HFOV, the following condition is satisfied: 58 degrees < HFOV. Therefore, it is favorable for obtaining wider image capturing angle by adjusting field of view.

Each of the aforementioned features of the imaging optical system lens assembly can be utilized in various combinations for achieving the corresponding effects.

According to the imaging optical system lens assembly of the present disclosure, the lens elements thereof can be made of glass or plastic materials. When the lens elements are made of glass materials, the distribution of the refractive power of the imaging optical system lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the imaging optical system lens assembly. Therefore, the total track length of the imaging optical system lens assembly can also be reduced. The aspheric surfaces may be formed by a plastic injection molding method, a glass molding method or other manufacturing methods.

According to the imaging optical system lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for light in a wavelength range of 600 nm-800 nm in the imaging optical system lens assembly so as to reduce extra red light or infrared light, or the additives can have the absorption ability for light in a wavelength range of 350 nm-450 nm in the imaging optical system lens assembly so as to reduce blue light or ultraviolet light. Therefore, additives can prevent the image from interfering by light in a particular wavelength range. Furthermore, the additives can be homogeneously mixed with the plastic material, and the lens elements can be made by the injection molding method. Moreover, the additives can be coated on the lens surfaces to provide the aforementioned effects.

According to the imaging optical system lens assembly of the present disclosure, when a surface of the lens element is aspheric, it indicates that entire optical effective region of the surface of the lens element or a part thereof is aspheric.

According to the imaging optical system lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the imaging optical system lens assembly of the present disclosure, if the lens element has positive refractive power or negative refractive power, or the focal length of the lens element, all can be referred to the refractive power, or the focal length, in the paraxial region of the lens element.

According to the imaging optical system lens assembly of the present disclosure, a critical point is a non-axial point of the lens surface where its tangent is perpendicular to the optical axis; an inflection point is a point on a lens surface with a curvature changing from positive to negative or from negative to positive.

According to the imaging optical system lens assembly of the present disclosure, the image surface thereof, based on the corresponding image sensor, can be flat or curved. In particular, the image surface can be a concave curved surface facing towards the object side. Furthermore, the imaging optical system lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 29A:
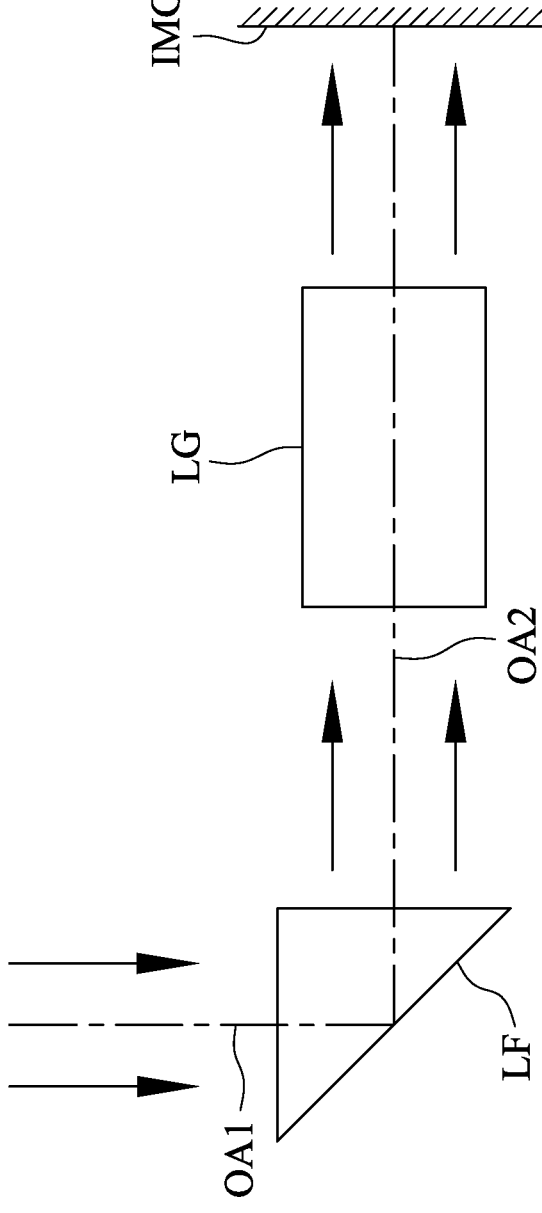
FIG. 29A is a schematic view of an arrangement of a light path folding element in the imaging optical system lens assembly of the present disclosure.
Figure 29B:
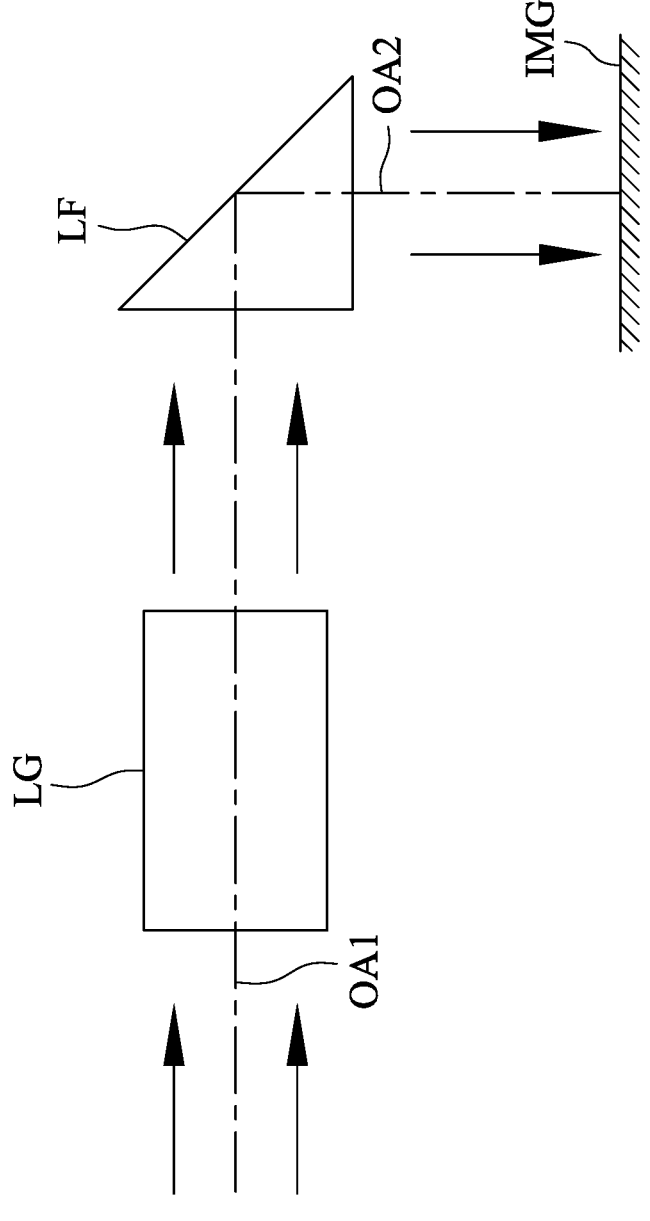
FIG. 29B is a schematic view of another arrangement of the light path folding element in the imaging optical system lens assembly of the present disclosure.
Figure 29C:
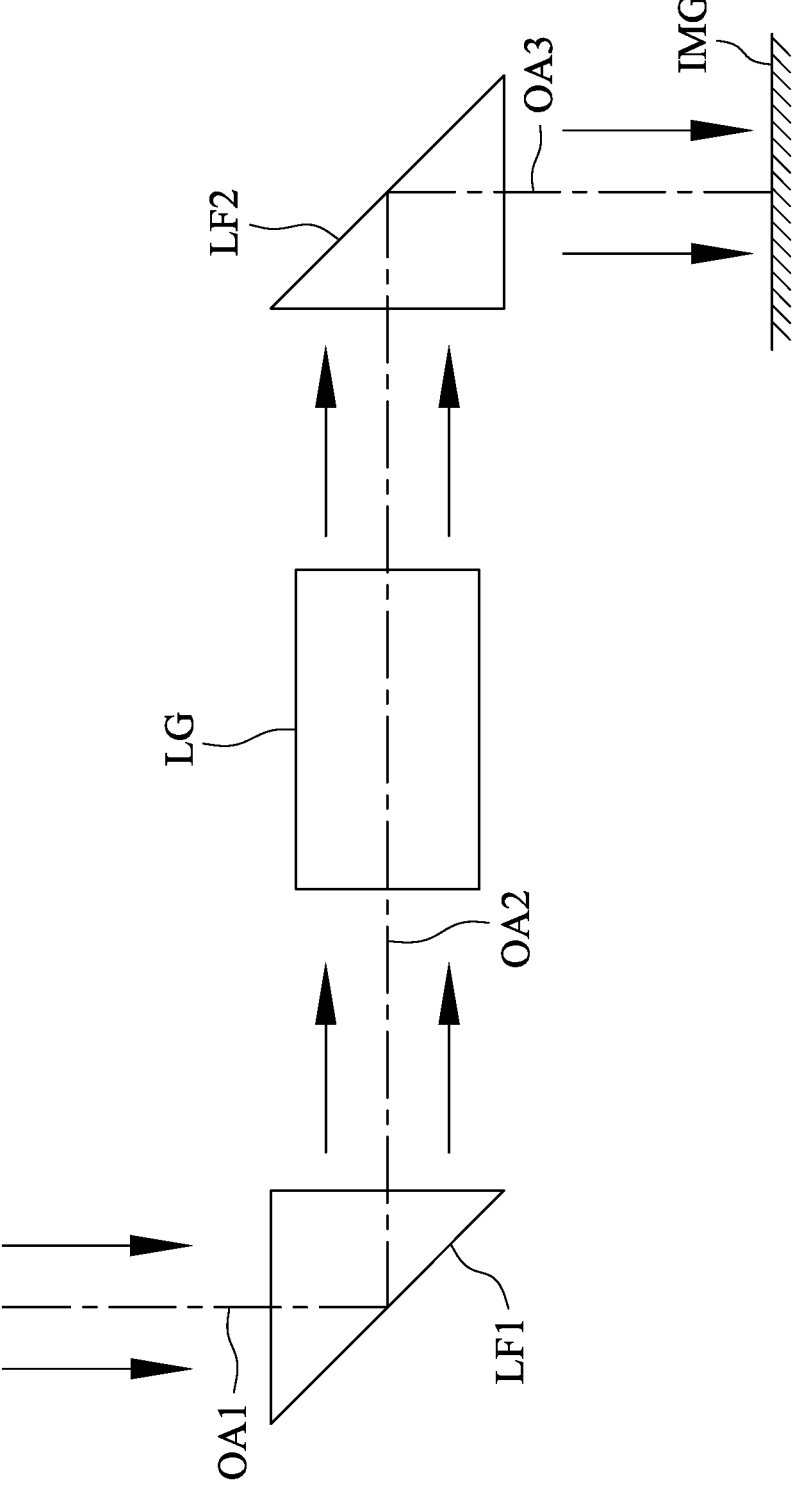
FIG. 29C is a schematic view of an arrangement of two light path folding elements in the imaging optical system lens assembly of the present disclosure.

According to the imaging optical system lens assembly of the present disclosure, at least one element with light path folding function can be selectively disposed between the imaged object and the image surface, such as a prism or a mirror, etc. Therefore it is favorable for providing high flexible space arrangement of the imaging optical system lens assembly, so that the compactness of the electronic device would not be restricted by the optical total track length of the imaging optical system lens assembly. FIG. 29A is a schematic view of an arrangement of a light path folding element LF in the imaging optical system lens assembly of the present disclosure. FIG. 29B is a schematic view of another arrangement of the light path folding element LF in the imaging optical system lens assembly of the present disclosure. As shown in FIGS. 29A and 29B, the imaging optical system lens assembly includes, in order from an imaged object (not shown in drawings) to an image surface IMG, a first optical axis OA1, the light path folding element LF and a second optical axis OA2, wherein the light path folding element LF can be disposed between the imaged object and a lens group LG of the imaging optical system lens assembly as shown in FIG. 29A, or can be disposed between the lens group LG of the imaging optical system lens assembly and the image surface IMG as shown in FIG. 29B. Moreover, FIG. 29C is a schematic view of an arrangement of two light path folding elements LF1, LF2 in the imaging optical system lens assembly of the present disclosure. As shown in FIG. 29C, the imaging optical system lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the imaging optical system lens assembly, and the light path folding element LF2 is disposed between the lens group LG of the imaging optical system lens assembly and the image surface IMG. The imaging optical system lens assembly can also be selectively disposed with three or more light path folding element, the type, amount and location of the light path folding element will not be limited to the present disclosure.

Furthermore, according to the imaging optical system lens assembly of the present disclosure, the imaging optical system lens assembly can include at least one stop, such as an aperture stop, a glare stop or a field stop, for eliminating stray light and thereby improving image resolution thereof.

According to the imaging optical system lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the imaging optical system lens assembly and the image surface can be obtained, and thereby obtains a telecentric effect and improves the image-sensing efficiency of the image sensor, such as CCD or CMOS. The middle stop is favorable for enlarging the field of view of the imaging optical system lens assembly and thereby provides a wider field of view for the same.

According to the imaging optical system lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the imaging optical system lens assembly according to the present disclosure, so as to moderate the image quality by changing f-number such as changing the depth of field or the exposure speed.

According to the imaging optical system lens assembly of the present disclosure, the imaging optical system lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned imaging optical system lens assembly and an image sensor is provided, wherein the image sensor is disposed on the image surface of the imaging optical system lens assembly. By the arrangement of the first lens element with negative refractive power and the ratio between the focal length of the sixth lens element and the focal length of the imaging optical system lens assembly, it is favorable for increasing field of view and image size, and reducing spherical aberration of the central field. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1st Embodiment

Figure 2:
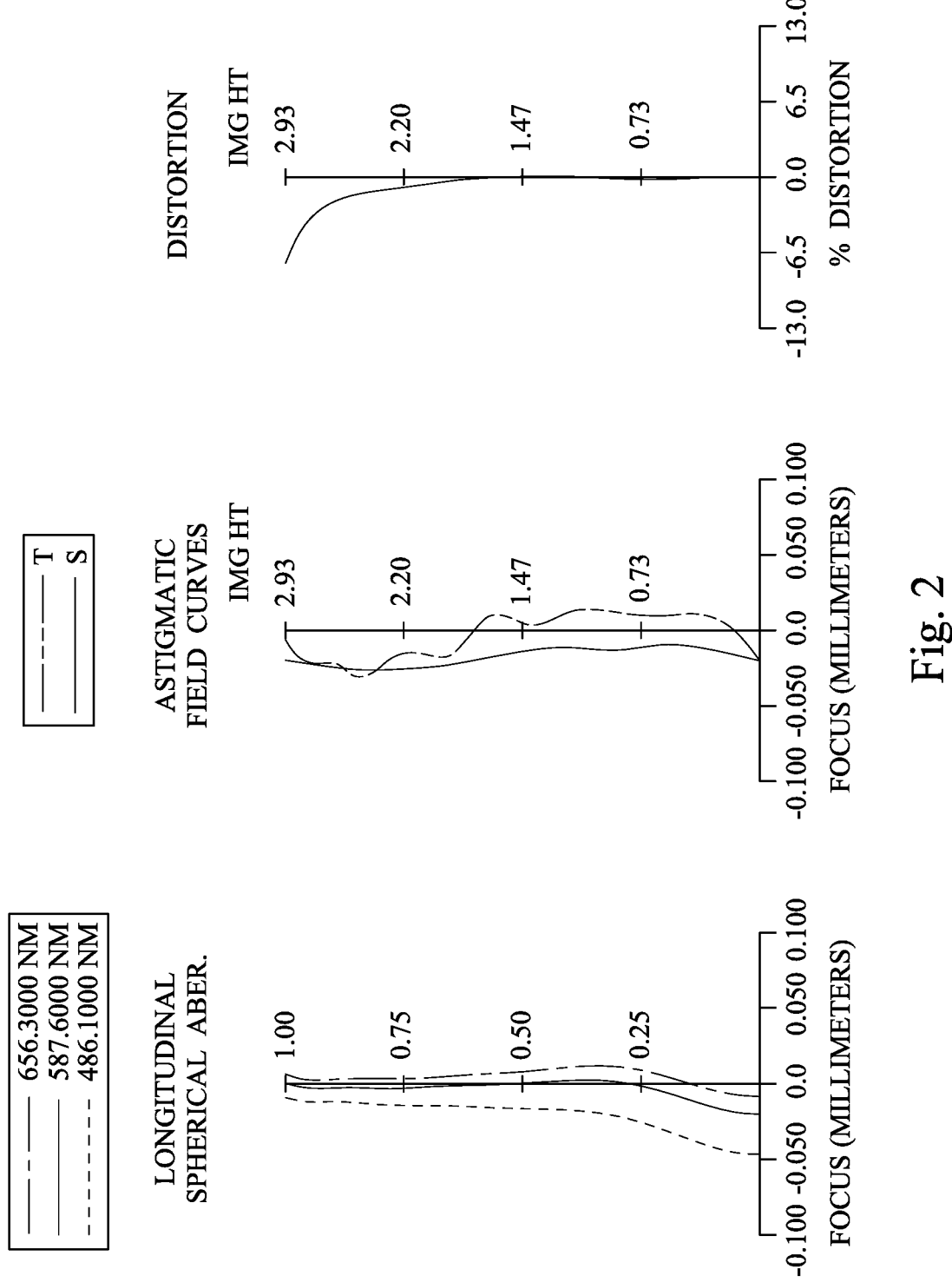
FIG. 2 shows spherical aberration curves, astigmatic field curves and a distortion curve of the imaging apparatus according to the 1st embodiment.

FIG. 1 is a schematic view of an imaging apparatus 1 according to the 1st embodiment of the present disclosure. FIG. 2 shows spherical aberration curves, astigmatic field curves and a distortion curve of the imaging apparatus 1 according to the 1st embodiment. In FIG. 1, the imaging apparatus 1 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

Figure 23:
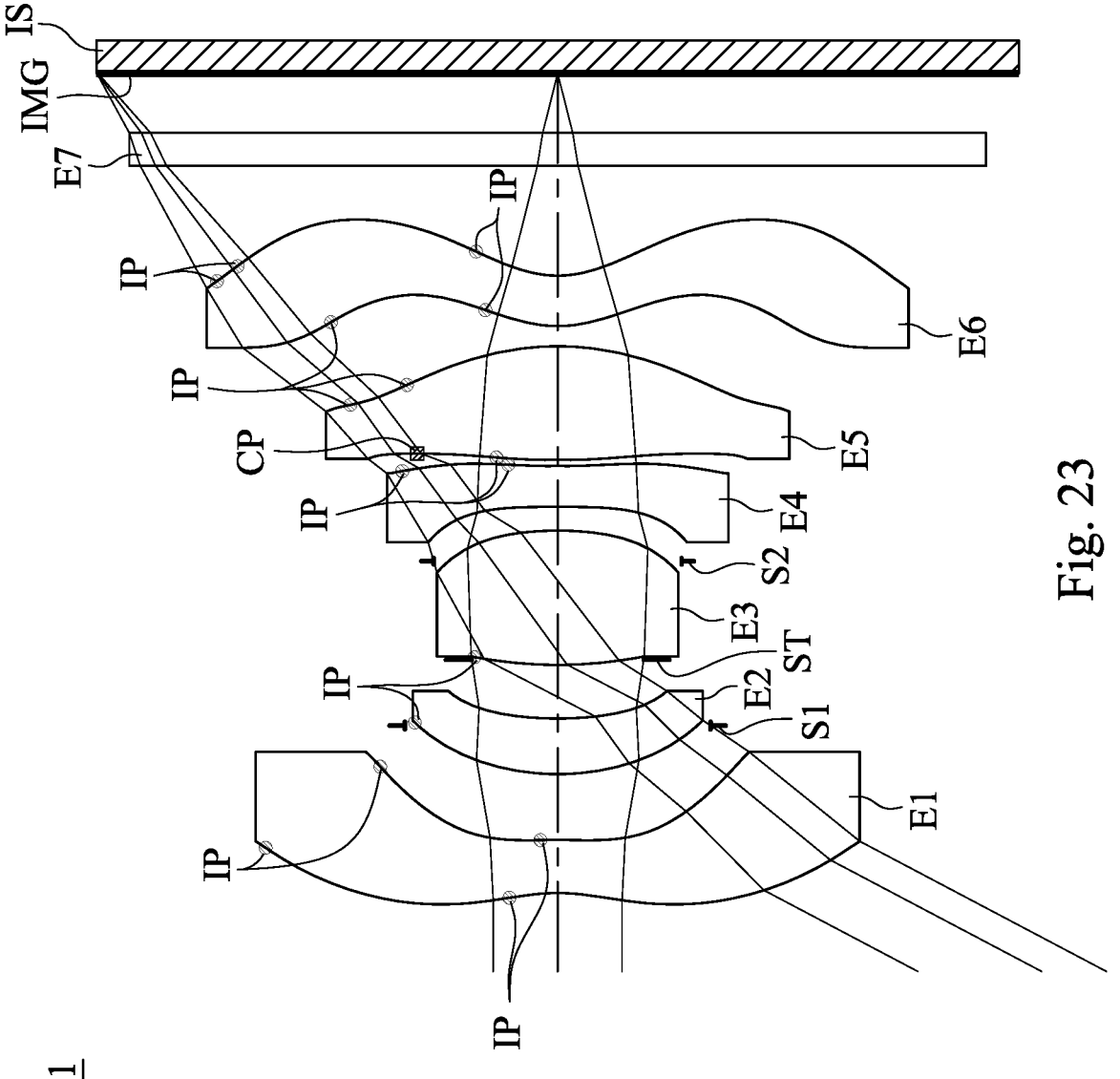
FIG. 23 is a schematic view of partial parameters, the inflection points of each lens element and the critical points of the fifth lens element according to the 1st embodiment.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, FIG. 23 is a schematic view of partial parameters, the inflection points IP of each lens element and the critical points CP of the fifth lens element E5 according to the 1st embodiment. In FIG. 23, the object-side surface of the first lens element E1 includes two inflection points IP, and the image-side surface of the first lens element E1 includes two inflection points IP.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point IP (as shown in FIG. 23).

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point IP (as shown in FIG. 23).

The fourth lens element E4 with negative refractive power has an object-side surface being concave in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes two inflection points IP (as shown in FIG. 23).

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point IP (as shown in FIG. 23) and a critical point CP (as shown in FIG. 23) in an off-axis region thereof, and the image-side surface of the fifth lens element E5 includes two inflection points IP (as shown in FIG. 23).

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points IP (as shown in FIG. 23), and the image-side surface of the sixth lens element E6 includes three inflection points IP (as shown in FIG. 23).

The filter E7 is made of a glass material, which is located between the sixth lens element E6 and the image surface IMG in order, and will not affect the focal length of the imaging optical system lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the imaging optical system lens assembly according to the 1st embodiment, when a focal length of the imaging optical system lens assembly is f, an f-number of the imaging optical system lens assembly is Fno, and half of a maximum field of view of the imaging optical system lens assembly is HFOV, these parameters have the following values: f=1.67 mm; Fno=2.03; and HFOV=62.18 degrees.

In the imaging optical system lens assembly according to the 1st embodiment, when a central thickness of the third lens element E3 is CT3, a central thickness of the fourth lens element E4 is CT4, and a central thickness of the fifth lens element E5 is CT5, the following condition is satisfied: (CT3+CT5)/CT4=6.08.

In the imaging optical system lens assembly according to the 1st embodiment, when a refractive index of the second lens element E2 is N2, and a refractive index of the fourth lens element E4 is N4, the following condition is satisfied: (N2+N4)/2=1.69.

In the imaging optical system lens assembly according to the 1st embodiment, when a curvature radius of the image-side surface of the second lens element E2 is R4, a curvature radius of the object-side surface of the third lens element E3 is R5, a curvature radius of the image-side surface of the third lens element E3 is R6, a curvature radius of the object-side surface of the sixth lens element E6 is R11, and a curvature radius of the image-side surface of the sixth lens element E6 is R12, the following conditions are satisfied: (R11+R12)/(R11−R12)=11.03; (R4+R12)/(R4−R12)=1.84; and (R5+R6)/(R5−R6)=0.15.

In the imaging optical system lens assembly according to the 1st embodiment, when an Abbe number of the second lens element E2 is V2, and an Abbe number of the fourth lens element E4 is V4, the following condition is satisfied: (V2+V4)/2=18.38.

In the imaging optical system lens assembly according to the 1st embodiment, when the focal length of the imaging optical system lens assembly is f, the central thickness of the third lens element E3 is CT3, and the central thickness of the fifth lens element E5 is CT5, the following condition is satisfied: f/(CT3+CT5)=1.05.

In the imaging optical system lens assembly according to the 1st embodiment, when the focal length of the imaging optical system lens assembly is f, an axial distance between the first lens element E1 and the second lens element E2 is T12, an axial distance between the second lens element E2 and the third lens element E3 is T23, an axial distance between the third lens element E3 and the fourth lens element E4 is T34, an axial distance between the fourth lens element E4 and the fifth lens element E5 is T45, and an axial distance between the fifth lens element E5 and the sixth lens element E6 is T56, the following conditions are satisfied: f/(T12+T23)=2.19; and f/(T34+T45+T56)=5.21.

In the imaging optical system lens assembly according to the 1st embodiment, when the focal length of the imaging optical system lens assembly is f, a focal length of the fourth lens element E4 is f4, a focal length of the fifth lens element E5 is f5, a focal length of the sixth lens element E6 is f6, and a composite focal length of the second lens element E2 and the third lens element E3 is f23, the following conditions are satisfied: f/f23=0.81; f/f4=−0.24; f/f5=0.53; and f/f6=−0.04.

In the imaging optical system lens assembly according to the 1st embodiment, when the focal length of the imaging optical system lens assembly is f, and the axial distance between the fourth lens element E4 and the fifth lens element E5 is T45, the following condition is satisfied: f/T45=42.71.

In the imaging optical system lens assembly according to the 1st embodiment, when a focal length of the third lens element E3 is f3, and the focal length of the fifth lens element E5 is f5, the following condition is satisfied: f3/f5=0.75.

In the imaging optical system lens assembly according to the 1st embodiment, when a curvature radius of the image-side surface of the fifth lens element E5 is R10, and the curvature radius of the image-side surface of the sixth lens element E6 is R12, the following condition is satisfied: R10/R12=−2.70.

In the imaging optical system lens assembly according to the 1st embodiment, when a curvature radius of the object-side surface of the second lens element E2 is R3, and the axial distance between the first lens element E1 and the second lens element E2 is T12, the following condition is satisfied: R3/T12=3.99.

In the imaging optical system lens assembly according to the 1st embodiment, when an axial distance between the aperture stop ST and an image surface IMG is SL, and the focal length of the imaging optical system lens assembly is f, the following condition is satisfied: SL/f=2.24.

In the imaging optical system lens assembly according to the 1st embodiment, when the axial distance between the fourth lens element E4 and the fifth lens element E5 is T45, and the central thickness of the fourth lens element E4 is CT4, the following condition is satisfied: T45/CT4=0.15.

The detailed optical data of the 1st embodiment are shown in Table 1A and the aspheric surface data are shown in Table 1B below.

TABLE 1A

1st Embodiment
f = 1.67 mm, Fno = 2.03, HFOV = 62.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −1.2360 ASP | 0.338 | Plastic | 1.545 | 56.1 | −2.88 |
| 2 | | −6.3501 ASP | 0.729 | | | | |
| 3 | Stop | Plano | −0.309 | | | | |
| 4 | Lens 2 | 1.6772 ASP | 0.354 | Plastic | 1.686 | 18.4 | 7.14 |
| 5 | | 2.3316 ASP | 0.374 | | | | |
| 6 | Ape. Stop | Plano | −0.032 | | | | |
| 7 | Lens 3 | 2.8552 ASP | 0.856 | Plastic | 1.544 | 56.0 | 2.37 |
| 8 | | −2.1090 ASP | −0.195 | | | | |
| 9 | Stop | Plano | 0.347 | | | | |
| 10 | Lens 4 | −9.2480 ASP | 0.260 | Plastic | 1.686 | 18.4 | −6.91 |
| 11 | | 9.8328 ASP | 0.039 | | | | |
| 12 | Lens 5 | 19.6461 ASP | 0.724 | Plastic | 1.544 | 56.0 | 3.16 |
| 13 | | −1.8610 ASP | 0.129 | | | | |
| 14 | Lens 6 | 0.8266 ASP | 0.321 | Plastic | 1.544 | 56.0 | −43.10 |
| 15 | | 0.6892 ASP | 0.700 | | | | |
| 16 | Filter | Plano | 0.210 | Glass | 1.517 | 64.2 | — |
| 17 | | Plano | 0.379 | | | | |
| 18 | Image | Plano | — | | | | |

Reference wavelength is 587.6 nm (d-line).
Effective radius of Surface 3 (stop S1) is 0.973 mm.
Effective radius of Surface 9 (stop S2) is 0.790 mm.

TABLE 1B

Aspheric Coefficients

| Surface # | 1 | 2 | 4 | 5 |
|---|---|---|---|---|
| k= | −1.00000000E+00 | 1.52006000E+01 | −3.49692000E−01 | −5.79772000E−01 |
| A4= | 1.02794457E+00 | 1.06046815E+00 | 2.01304067E−01 | 2.40090371E−01 |
| A6= | −1.90310831E+00 | −1.07672614E+00 | −8.35728715E−01 | −1.05698220E+00 |
| A8= | 2.97953248E+00 | −1.92656141E+00 | 3.72056563E+00 | 1.11585981E+01 |
| A10= | −3.62833091E+00 | 1.35718094E+01 | −1.26354029E+01 | −6.87277413E+01 |
| A12= | 3.34201351E+00 | −3.56694984E+01 | 3.05183891E+01 | 2.88656715E+02 |
| A14= | −2.30733699E+00 | 5.61739754E+01 | −4.85176751E+01 | −7.86825942E+02 |
| A16= | 1.18776870E+00 | −5.71105648E+01 | 4.76157141E+01 | 1.32701626E+03 |
| A18= | −4.51974405E−01 | 3.76437980E+01 | −2.56590597E+01 | −1.23723880E+03 |
| A20= | 1.25032750E−01 | −1.54776265E+01 | 5.67616093E+00 | 4.80501635E+02 |
| A22= | −2.43944620E−02 | 3.58837156E+00 | | |
| A24= | 3.17662913E−03 | −3.55904950E−01 | | |
| A26= | −2.47473680E−04 | | | |
| A28= | 8.71500238E−06 | | | |

| Surface # | 7 | 8 | 10 | 11 |
|---|---|---|---|---|
| k= | 0.00000000E+00 | 2.95385000E+00 | 0.00000000E+00 | −9.90000000E+01 |
| A4= | −2.43651757E−02 | −6.57461148E−02 | −1.30249114E−01 | 8.76578871E−01 |
| A6= | 1.33831646E+00 | −2.56719694E+00 | −2.22455948E+00 | −7.85362855E+00 |
| A8= | −1.71845020E+01 | 2.06982228E+01 | 1.06058405E+01 | 3.12197869E+01 |
| A10= | 1.03090028E+02 | −1.09263544E+02 | −2.36393405E+01 | −7.65539632E+01 |
| A12= | −1.73600165E+02 | 3.70416437E+02 | −1.62564353E+00 | 1.24359219E+02 |
| A14= | −1.32854027E+03 | −8.01423948E+02 | 1.37339038E+02 | −1.36832894E+02 |
| A16= | 8.29929091E+03 | 1.06684379E+03 | −3.41569154E+02 | 1.01508060E+02 |
| A18= | −1.82515941E+04 | −7.94435226E+02 | 4.03261157E+02 | −4.89826618E+01 |
| A20= | 1.46532004E+04 | 2.52410878E+02 | −2.41559763E+02 | 1.39843293E+01 |
| A22= | | | 5.92387131E+01 | −1.80172375E+00 |

| Surface # | 12 | 13 | 14 | 15 |
|---|---|---|---|---|
| k= | −9.58587000E+01 | −6.20903000E−01 | −9.97550000E−01 | −1.00000000E+00 |
| A4= | 1.27303634E+00 | −1.18294796E−01 | −7.31731049E−01 | −7.10232265E−01 |
| A6= | −8.29941883E+00 | 5.80776442E−01 | 9.54907453E−01 | 6.10371206E−01 |
| A8= | 2.85353505E+01 | −8.81139339E−01 | −1.88758215E+00 | −6.39870377E−01 |
| A10= | −6.30865482E+01 | −1.49493940E+00 | 2.68168051E+00 | 6.71187273E−01 |
| A12= | 9.56758651E+01 | 8.37795350E+00 | −2.41291239E+00 | −5.52238409E−01 |
| A14= | −1.02498278E+02 | −1.54163239E+01 | 1.41344150E+00 | 3.29823394E−01 |
| A16= | 7.81201625E+01 | 1.60173802E+01 | −5.53852381E−01 | −1.41918801E−01 |
| A18= | −4.17091341E+01 | −1.04218922E+01 | 1.46672683E−01 | 4.39833018E−02 |
| A20= | 1.48939221E+01 | 4.33893378E+00 | −2.59642588E−02 | −9.71927045E−03 |

TABLE 1B-continued

| Aspheric Coefficients | | | |
| --- | --- | --- | --- |
| A22= | −3.20549361E+00 | −1.12591155E+00 | 2.94797824E−03 | 1.49123730E−03 |
| A24= | 3.15216333E−01 | 1.66244280E−01 | −1.94345656E−04 | −1.50637572E−04 |
| A26= | | −1.06859330E−02 | 5.66151094E−06 | 8.98933030E−06 |
| A28= | | | | −2.39615585E−07 |

In Table 1A, the curvature radius, the thickness and the focal length are shown in millimeters (mm). Surface numbers 0-18 represent the surfaces sequentially arranged from the object side to the image side along the optical axis. In Table 1 B, k represents the conic coefficient of the equation of the aspheric surface profiles. A4-A28 represent the aspheric coefficients ranging from the 4th order to the 28th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

2nd Embodiment

Figure 3:
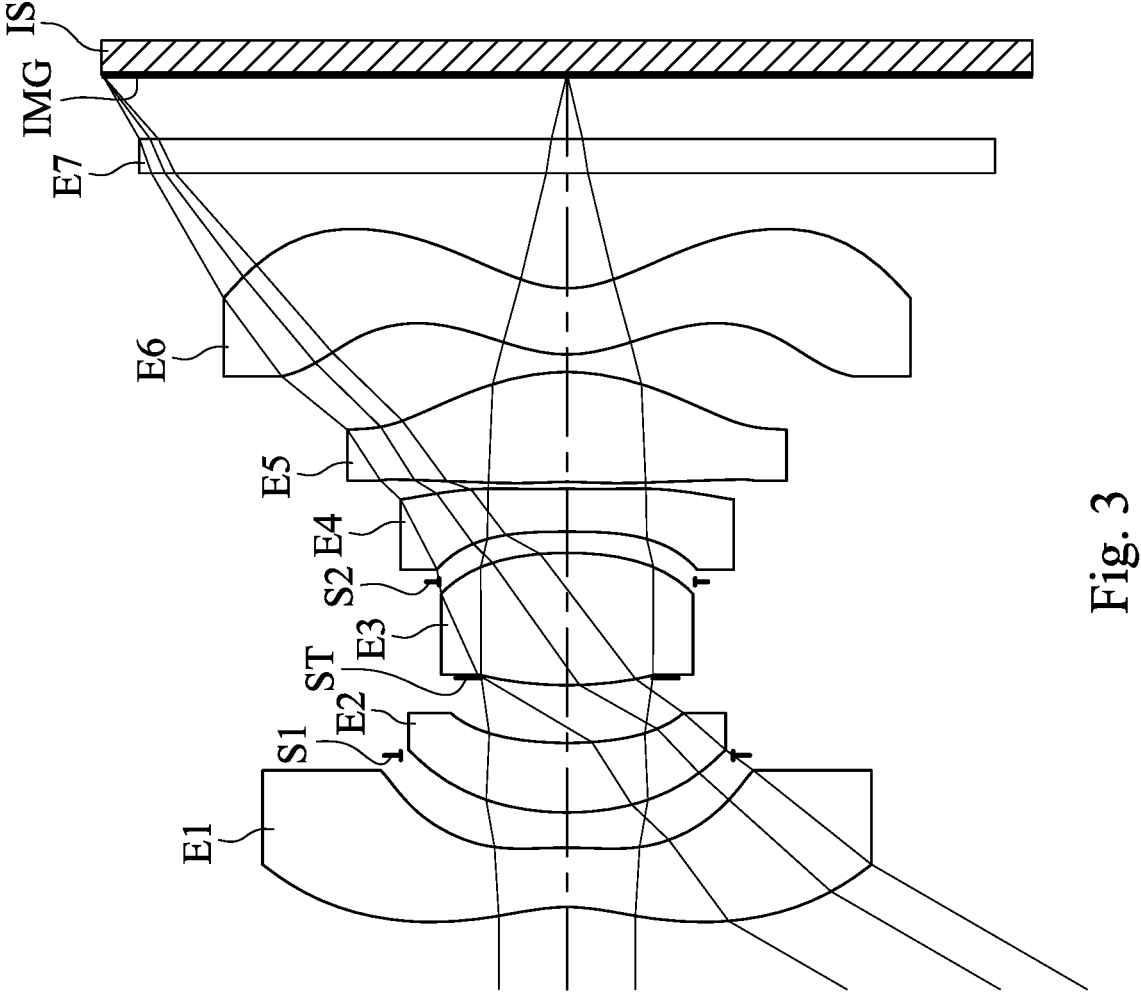
FIG. 3 is a schematic view of an imaging apparatus according to the 2nd embodiment of the present disclosure.
Figure 4:
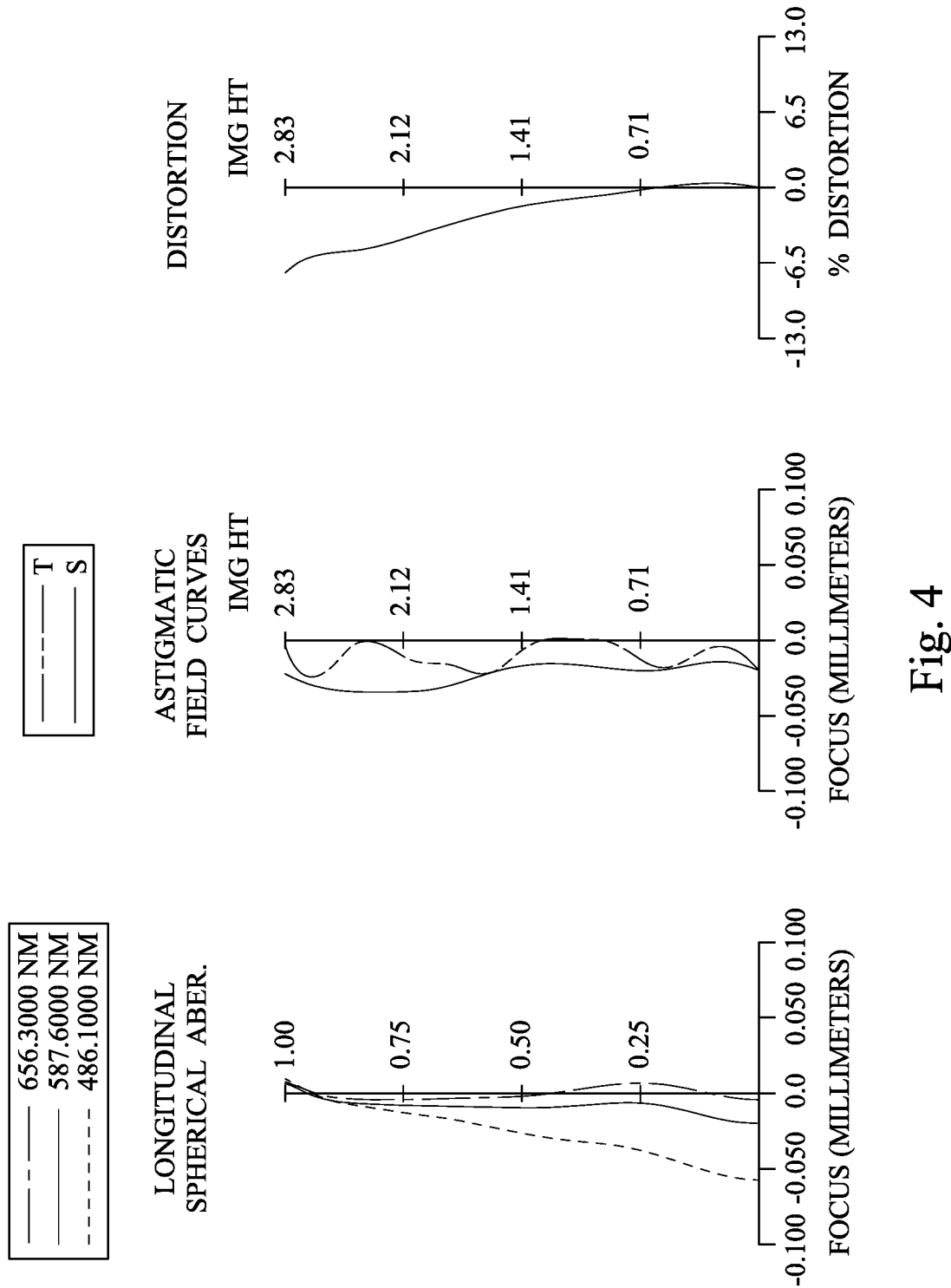
FIG. 4 shows spherical aberration curves, astigmatic field curves and a distortion curve of the imaging apparatus according to the 2nd embodiment.

FIG. 3 is a schematic view of an imaging apparatus 2 according to the 2nd embodiment of the present disclosure. FIG. 4 shows spherical aberration curves, astigmatic field curves and a distortion curve of the imaging apparatus 2 according to the 2nd embodiment. In FIG. 3, the imaging apparatus 2 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes three inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes four inflection points and two critical points in an off-axis region thereof, and the image-side surface of the fifth lens element E5 includes two inflection points.

The sixth lens element E6 with negative refractive power has an surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points.

The filter E7 is made of a glass material, which is located between the sixth lens element E6 and the image surface IMG in order, and will not affect the focal length of the imaging optical system lens assembly.

The detailed optical data of the 2nd embodiment are shown in Table 2A and the aspheric surface data are shown in Table 2B below.

TABLE 2A

| 2nd Embodiment | | | | | | |
| --- | --- | --- | --- | --- | --- | --- |
| f = 1.76 mm, Fno = 2.12, HFOV = 59.9 deg. | | | | | | |
| Surface # | | Curvature Radius | Thickness | Material | Index | Abbe # | Focal Length |
| 0 | Object | Plano | Infinity | | | | |
| 1 | Lens 1 | −1.1161 ASP | 0.362 | Plastic | 1.566 | 37.4 | −3.44 |
| 2 | | −2.9192 ASP | 0.561 | | | | |

TABLE 2A-continued

| | | | | 2nd Embodiment f = 1.76 mm, Fno = 2.12, HFOV = 59.9 deg. | | | | |
|---|---|---|---|---|---|---|---|---|
| Surface # | | Curvature Radius | Thickness | Material | Index | Abbe # | Focal Length |
| 3 | Stop | Plano | −0.347 | | | | |
| 4 | Lens 2 | 1.8585 ASP | 0.423 | Plastic | 1.722 | 15.6 | 9.63 |
| 5 | | 2.2943 ASP | 0.396 | | | | |
| 6 | Ape. Stop | Plano | −0.044 | | | | |
| 7 | Lens 3 | 2.4384 ASP | 0.805 | Plastic | 1.544 | 56.0 | 2.24 |
| 8 | | −2.1569 ASP | −0.176 | | | | |
| 9 | Stop | Plano | 0.305 | | | | |
| 10 | Lens 4 | −6.9717 ASP | 0.261 | Plastic | 1.680 | 18.2 | 26.46 |
| 11 | | −5.1010 ASP | 0.043 | | | | |
| 12 | Lens 5 | −1.6998 ASP | 0.667 | Plastic | 1.544 | 56.0 | 6.95 |
| 13 | | −1.3348 ASP | 0.108 | | | | |
| 14 | Lens 6 | 0.8465 ASP | 0.403 | Plastic | 1.544 | 56.0 | −47.16 |
| 15 | | 0.6820 ASP | 0.700 | | | | |
| 16 | Filter | Plano | 0.210 | Glass | 1.517 | 64.2 | — |
| 17 | | Plano | 0.388 | | | | |
| 18 | Image | Plano | — | | | | |

Reference wavelength is 587.6 nm (d-line).
Effective radius of Surface 3 (stop S1) is 1.010 mm.
Effective radius of Surface 9 (stop S2) is 0.778 mm.

TABLE 2B

| | | | Aspheric Coefficients | |
|---|---|---|---|---|
| Surface # | 1 | 2 | 4 | 5 |
| k= | −1.00651000E+00 | 1.17268000E+00 | 3.72140000E−01 | −6.64096000E−01 |
| A4= | 1.09405790E+00 | 1.25004428E+00 | 3.63765672E−01 | 1.94206867E−01 |
| A6= | −2.07077931E+00 | −9.03699286E−01 | −1.28348308E+00 | −3.57871932E−01 |
| A8= | 3.27125857E+00 | −7.27323252E+00 | 3.44312534E+00 | 8.33049297E−01 |
| A10= | −3.99994565E+00 | 4.16755924E+01 | −6.93654204E+00 | 2.22700984E+01 |
| A12= | 3.70170152E+00 | −1.20124302E+02 | 1.25062698E+01 | −1.78557234E+02 |
| A14= | −2.57304351E+00 | 2.20712025E+02 | −1.98586764E+01 | 6.42477913E+02 |
| A16= | 1.33720906E+00 | −2.69811041E+02 | 2.34194093E+01 | −1.23003878E+03 |
| A18= | −5.15385146E−01 | 2.17956728E+02 | −1.62377369E+01 | 1.21006830E+03 |
| A20= | 1.44955438E−01 | −1.11164145E+02 | 4.69661649E+00 | −4.79158167E+02 |
| A22= | −2.88763747E−02 | 3.20643029E+01 | | |
| A24= | 3.85721638E−03 | −3.82660373E+00 | | |
| A26= | −3.09758952E−04 | −6.19533882E−02 | | |
| A28= | 1.13017094E−05 | | | |

| Surface # | 7 | 8 | 10 | 11 |
|---|---|---|---|---|
| k= | 1.44169000E+00 | 2.68230000E+00 | −8.31717000E−01 | −1.24520000E+00 |
| A4= | −9.31346550E−02 | −1.86515847E−01 | −2.81770718E−01 | 2.24605813E+00 |
| A6= | 5.03421772E+00 | −2.34811696E+00 | −5.37017717E+00 | −1.88333989E+01 |
| A8= | −9.45296736E+01 | 2.93099838E+01 | 4.39182077E+01 | 8.74621517E+01 |
| A10= | 1.04872852E+03 | −1.91531044E+02 | −1.74981754E+02 | −2.67970432E+02 |
| A12= | −7.21671138E+03 | 7.61842478E+02 | 3.49193917E+02 | 5.70570961E+02 |
| A14= | 3.10650294E+04 | −1.90007729E+03 | −1.21024774E+02 | −8.60912099E+02 |
| A16= | −8.13646296E+04 | 2.87855139E+03 | −9.94539105E+02 | 9.20609348E+02 |
| A18= | 1.18482521E+05 | −2.40837010E+03 | 2.20947940E+03 | −6.83720044E+02 |
| A20= | −7.35129971E+04 | 8.49816691E+02 | −1.95608029E+03 | 3.35472436E+02 |
| A22= | | | 6.52959020E+02 | −9.75847220E+01 |
| A24= | | | | 1.26948922E+01 |

| Surface # | 12 | 13 | 14 | 15 |
|---|---|---|---|---|
| k= | 2.61976000E−01 | −9.89510000E−01 | −9.99630000E−01 | −1.00150000E+00 |
| A4= | 3.61989221E+00 | 1.92673304E−01 | −6.86401019E−01 | −8.25519888E−01 |
| A6= | −2.24097112E+01 | −1.62214341E+00 | 3.53122343E+00 | 8.33100684E−01 |
| A8= | 9.10032439E+01 | 9.76160649E+00 | 3.86517160E−01 | −7.47353875E−01 |
| A10= | −2.55833660E+02 | −3.50119566E+01 | −1.64545984E+00 | 5.23414079E−01 |
| A12= | 5.14482730E+02 | 8.14386440E+01 | 2.67210084E+00 | −2.63969910E−01 |
| A14= | −7.52384240E+02 | −1.27959546E+02 | −2.60260738E+00 | 8.64340510E−02 |
| A16= | 8.02660513E+02 | 1.39308572E+02 | 1.65545535E+00 | −1.29322851E−02 |
| A18= | −6.18000111E+02 | −1.06489410E+02 | −7.09834060E−01 | −2.68028465E−03 |
| A20= | 3.33973925E+02 | 5.72642823E+01 | 2.06929783E−01 | 2.02932720E−03 |
| A22= | −1.19949691E+02 | −2.14214253E+01 | −4.04918340E−02 | −5.37951161E−04 |
| A24= | 2.56516618E+01 | 5.41289814E+00 | 5.09729967E−03 | 7.85576115E−05 |

TABLE 2B-continued

| | | Aspheric Coefficients | | |
|---|---|---|---|---|
| A26= | −2.46543715E+00 | −8.70351984E−01 | −3.73457372E−04 | −6.23602764E−06 |
| A28= | | 7.87649926E−02 | 1.21151527E−05 | 2.10580226E−07 |
| A30= | | −2.93629588E−03 | | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions in Table 2C:

TABLE 2C

| 2nd Embodiment | | | |
|---|---|---|---|
| f [mm] | 1.76 | f/(T34 + T45 + T56) | 6.29 |
| Fno | 2.12 | f/f23 | 0.84 |
| HFOV [degrees] | 59.9 | f/f4 | 0.07 |
| (CT3 + CT5)/CT4 | 5.64 | f/f5 | 0.25 |
| (N2 + N4)/2 | 1.70 | f/f6 | −0.04 |
| (R11 + R12)/(R11 − R12) | 9.29 | f/T45 | 40.95 |
| (R4 + R12)/(R4 − R12) | 1.85 | f3/f5 | 0.32 |
| (R5 + R6)/(R5 − R6) | 0.06 | R10/R12 | −1.96 |
| (V2 + V4)/2 | 16.90 | R3/T12 | 8.68 |
| f/(CT3 + CT5) | 1.20 | SL/f | 2.08 |
| f/(T12 + T23) | 3.11 | T45/CT4 | 0.16 |

3rd Embodiment

Figure 5:
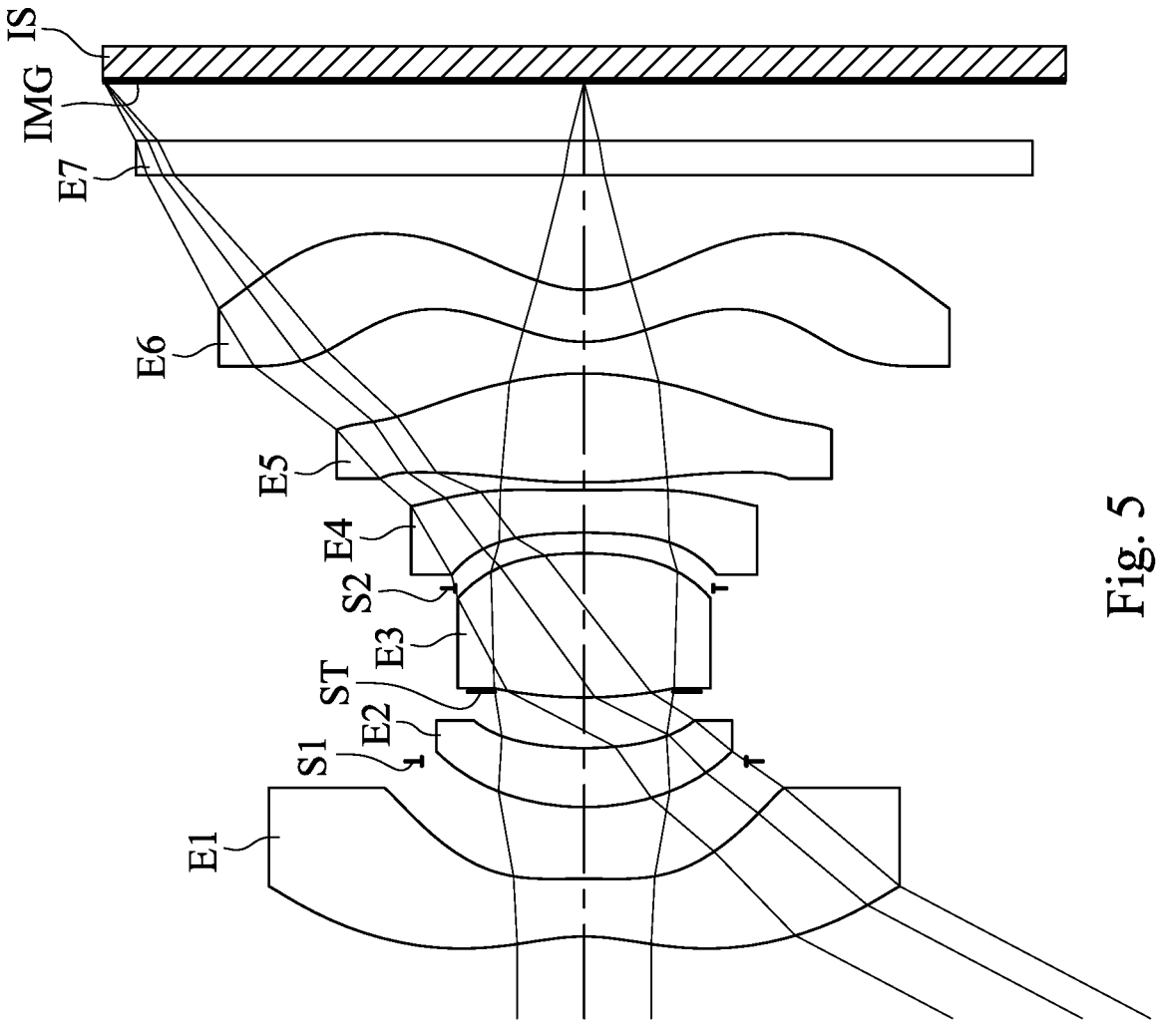
FIG. 5 is a schematic view of an imaging apparatus according to the 3rd embodiment of the present disclosure.
Figure 6:
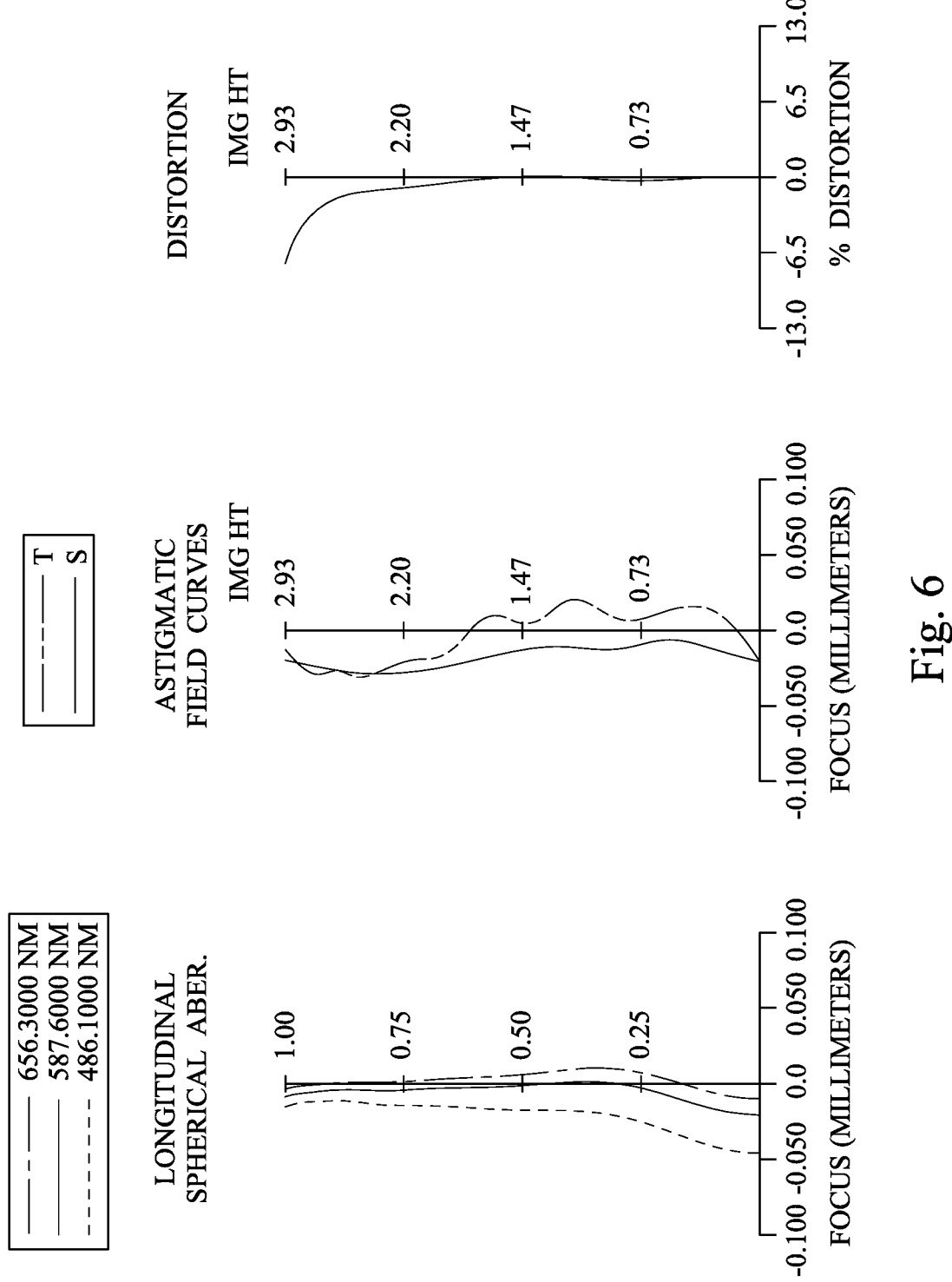
FIG. 6 shows spherical aberration curves, astigmatic field curves and a distortion curve of the imaging apparatus according to the 3rd embodiment.

FIG. 5 is a schematic view of an imaging apparatus 3 according to the 3rd embodiment of the present disclosure. FIG. 6 shows spherical aberration curves, astigmatic field curves and a distortion curve of the imaging apparatus 3 according to the 3rd embodiment. In FIG. 5, the imaging apparatus 3 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes three inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point and one critical point in an off-axis region thereof, and the image-side surface of the fifth lens element E5 includes two inflection points.

The sixth lens element E6 with negative refractive power has an surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 3rd embodiment are shown in Table 3A and the aspheric surface data are shown in Table 3B below.

TABLE 3A

3rd Embodiment
f = 1.67 mm, Fno = 2.04, HFOV = 62.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −1.2330 ASP | 0.353 | Plastic | 1.545 | 56.1 | −2.89 |
| 2 | | −6.2632 ASP | 0.716 | | | | |
| 3 | Stop | Plano | −0.279 | | | | |
| 4 | Lens 2 | 1.6155 ASP | 0.360 | Plastic | 1.686 | 18.4 | 7.00 |
| 5 | | 2.2144 ASP | 0.344 | | | | |
| 6 | Ape. Stop | Plano | −0.035 | | | | |
| 7 | Lens 3 | 2.8337 ASP | 0.881 | Plastic | 1.544 | 56.0 | 2.34 |
| 8 | | −2.0562 ASP | −0.215 | | | | |
| 9 | Stop | Plano | 0.340 | | | | |
| 10 | Lens 4 | −3.4813 ASP | 0.260 | Plastic | 1.686 | 18.4 | −6.29 |
| 11 | | −18.5202 ASP | 0.048 | | | | |
| 12 | Lens 5 | 9.9315 ASP | 0.664 | Plastic | 1.544 | 56.0 | 3.18 |
| 13 | | −2.0491 ASP | 0.193 | | | | |
| 14 | Lens 6 | 0.8268 ASP | 0.317 | Plastic | 1.544 | 56.0 | −50.22 |
| 15 | | 0.6941 ASP | 0.700 | | | | |
| 16 | Filter | Plano | 0.210 | Glass | 1.517 | 64.2 | — |
| 17 | | Plano | 0.367 | | | | |
| 18 | Image | Plano | — | | | | |

Reference wavelength is 587.6 nm (d-line).
Effective radius of Surface 3 (stop S1) is 0.989 mm.
Effective radius of Surface 9 (stop S2) is 0.787 mm.

TABLE 3B

Aspheric Coefficients

| Surface # | 1 | 2 | 4 | 5 |
|---|---|---|---|---|
| k = | −1.00000000E+00 | 1.61308000E+01 | −1.68665000E−01 | 9.80926000E−01 |
| A4 = | 1.01871385E+00 | 1.07473828E+00 | 2.25506846E−01 | 2.27948711E−01 |
| A6 = | −1.86970208E+00 | −1.15126735E+00 | −1.04320062E+00 | −6.32892994E−01 |
| A8 = | 2.91482592E+00 | −1.42584209E+00 | 5.39229342E+00 | 5.75188839E+00 |
| A10= | −3.54794506E+00 | 1.17506345E+01 | −2.10397754E+01 | −3.13135385E+01 |
| A12= | 3.27393211E+00 | −3.16560165E+01 | 5.61468125E+01 | 1.39455339E+02 |
| A14= | −2.26781379E+00 | 5.04246534E+01 | −9.61357438E+01 | −4.35492241 E+02 |
| A16= | 1.17251917E+00 | −5.16697568E+01 | 1.00300396E+02 | 8.60719774E+02 |
| A18= | −4.48475963E−01 | 3.42991017E+01 | −5.73812972E+01 | −9.27143135E+02 |
| A20= | 1.24785418E−01 | −1.42051403E+01 | 1.36029413E+01 | 4.05151605E+02 |
| A22= | −2.45009906E−02 | 3.31792545E+00 | | |
| A24= | 3.21237409E−03 | −3.31347397E−01 | | |
| A26= | −2.52091169E−04 | | | |
| A28= | 8.94663885E−06 | | | |

| Surface # | 7 | 8 | 10 | 11 |
|---|---|---|---|---|
| k= | 0.00000000E+00 | 3.00334000E+00 | 0.00000000E+00 | 8.35968000E+01 |
| A4= | 1.91231582E−03 | −2.65811096E−03 | 1.37116419E−02 | 9.61605223E−01 |
| A6= | 1.01991186E+00 | −3.20479920E+00 | −2.52689609E+00 | −8.25144250E+00 |
| A8= | −1.06841733E+01 | 2.49340283E+01 | 5.56959494E+00 | 3.29739746E+01 |
| A10= | 2.92372229E+01 | −1.29133275E+02 | 3.52619036E+01 | −8.20549533E+01 |
| A12= | 3.51638718E+02 | 4.30175089E+02 | −3.09068523E+02 | 1.35479635E+02 |
| A14= | −3.66671719E+03 | −9.14255218E+02 | 1.06983064E+03 | −1.51106794E+02 |
| A16= | 1.46276883E+04 | 1.19497748E+03 | −2.07522760E+03 | 1.13091173E+02 |
| A18= | −2.77640580E+04 | −8.72026757E+02 | 2.34548064E+03 | −5.48389171E+01 |
| A20= | 2.07468276E+04 | 2.70823557E+02 | −1.44080945E+03 | 1.57447695E+01 |
| A22= | | | 3.71511579E+02 | −2.05720359E+00 |

| Surface # | 12 | 13 | 14 | 15 |
|---|---|---|---|---|
| k= | −9.90000000E+01 | −6.29043000E−01 | −9.99234000E−01 | −1.00000000E+00 |
| A4= | 1.22198441E+00 | −1.36971008E−01 | −7.87891730E−01 | −7.91064831E−01 |
| A6= | −7.74736334E+00 | 1.18275304E+00 | 1.23093260E+00 | 9.63298523E−01 |
| A8= | 2.69365703E+01 | −3.75019572E+00 | −2.39681146E+00 | −1.35832754E+00 |
| A10= | −6.18644398E+01 | 6.39207476E+00 | 3.18455379E+00 | 1.55436673E+00 |
| A12= | 9.89989404E+01 | −5.79260287E+00 | −2.72266061E+00 | −1.28086150E+00 |
| A14= | −1.12508389E+02 | 1.74303849E+00 | 1.54200622E+00 | 7.52622892E−01 |
| A16= | 9.06050044E+01 | 1.84997435E+00 | −5.91256982E−01 | −3.18044023E−01 |
| A18= | −5.05374323E+01 | −2.45157311E+00 | 1.54408002E−01 | 9.68967639E−02 |
| A20= | 1.85483930E+01 | 1.33499745E+00 | −2.70893097E−02 | −2.10804026E−02 |

TABLE 3B-continued

| Aspheric Coefficients | | | |
|---|---|---|---|
| A22= | −4.02516956E+00 | −4.00229699E−01 | 3.05811741E−03 | 3.19041381E−03 |
| A24= | 3.91024168E−01 | 6.46340838E−02 | −2.00876980E−04 | −3.18662526E−04 |
| A26= | | −4.41157930E−03 | 5.83846545E−06 | 1.88561334E−05 |
| A28= | | | | −4.99947838E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions in Table 3C:

TABLE 3C

| 3rd Embodiment | | | |
|---|---|---|---|
| f [mm] | 1.67 | f/(T34 + T45 + T56) | 4.55 |
| Fno | 2.04 | f/f23 | 0.82 |
| HFOV [degrees] | 62.2 | f/f4 | −0.26 |
| (CT3 + CT5)/CT4 | 5.94 | f/f5 | 0.52 |
| (N2 + N4)/2 | 1.69 | f/f6 | −0.03 |
| (R11 + R12)/(R11 − R12) | 11.46 | f/T45 | 34.71 |
| (R4 + R12)/(R4 − R12) | 1.91 | f3/f5 | 0.73 |
| (R5 + R6)/(R5 − R6) | 0.16 | R10/R12 | −2.95 |
| (V2 + V4)/2 | 18.38 | R3/T12 | 3.70 |
| f/(CT3 + CT5) | 1.08 | SL/f | 2.24 |
| f/(T12 + T23) | 2.23 | T45/CT4 | 0.18 |

4th Embodiment

Figure 7:
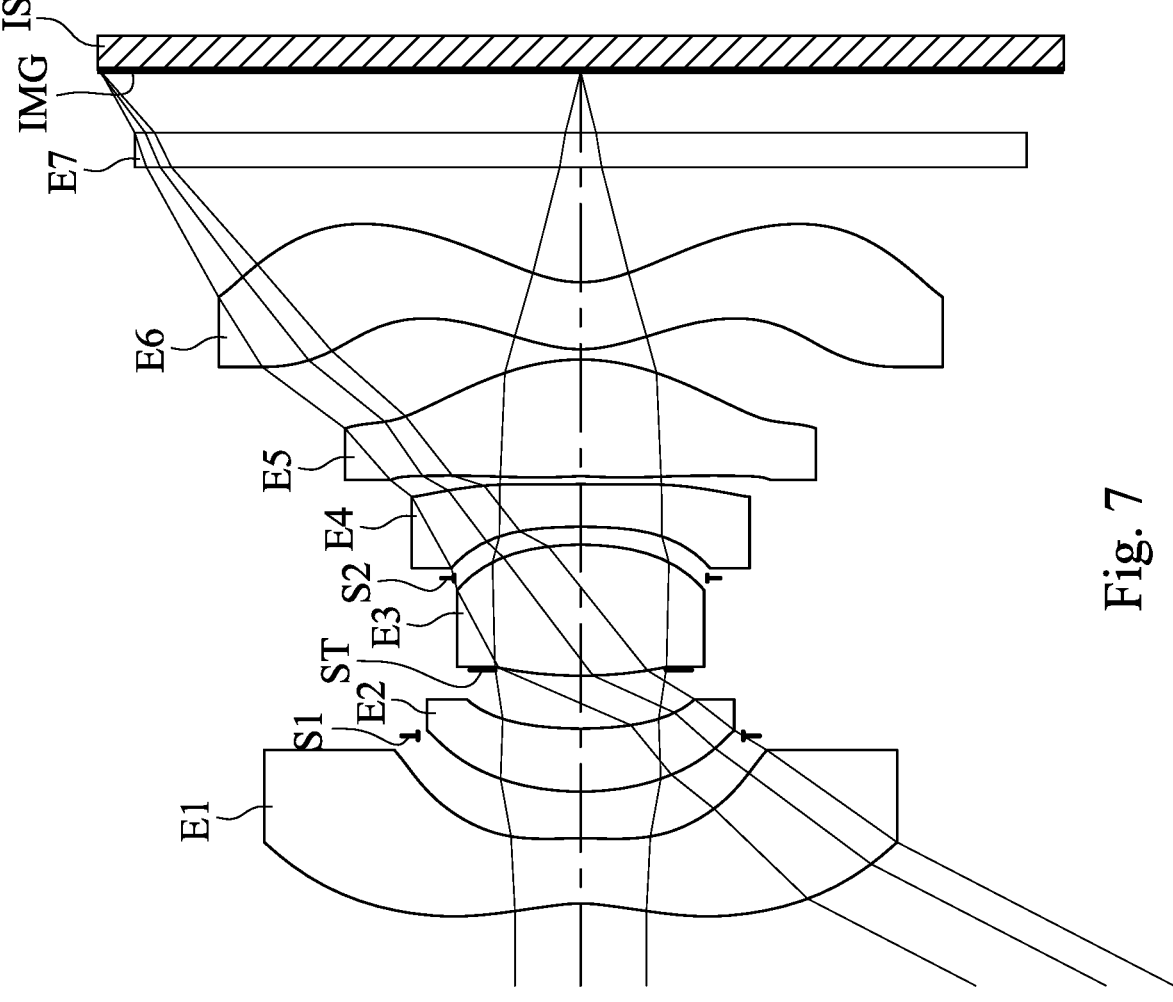
FIG. 7 is a schematic view of an imaging apparatus according to the 4th embodiment of the present disclosure.
Figure 8:
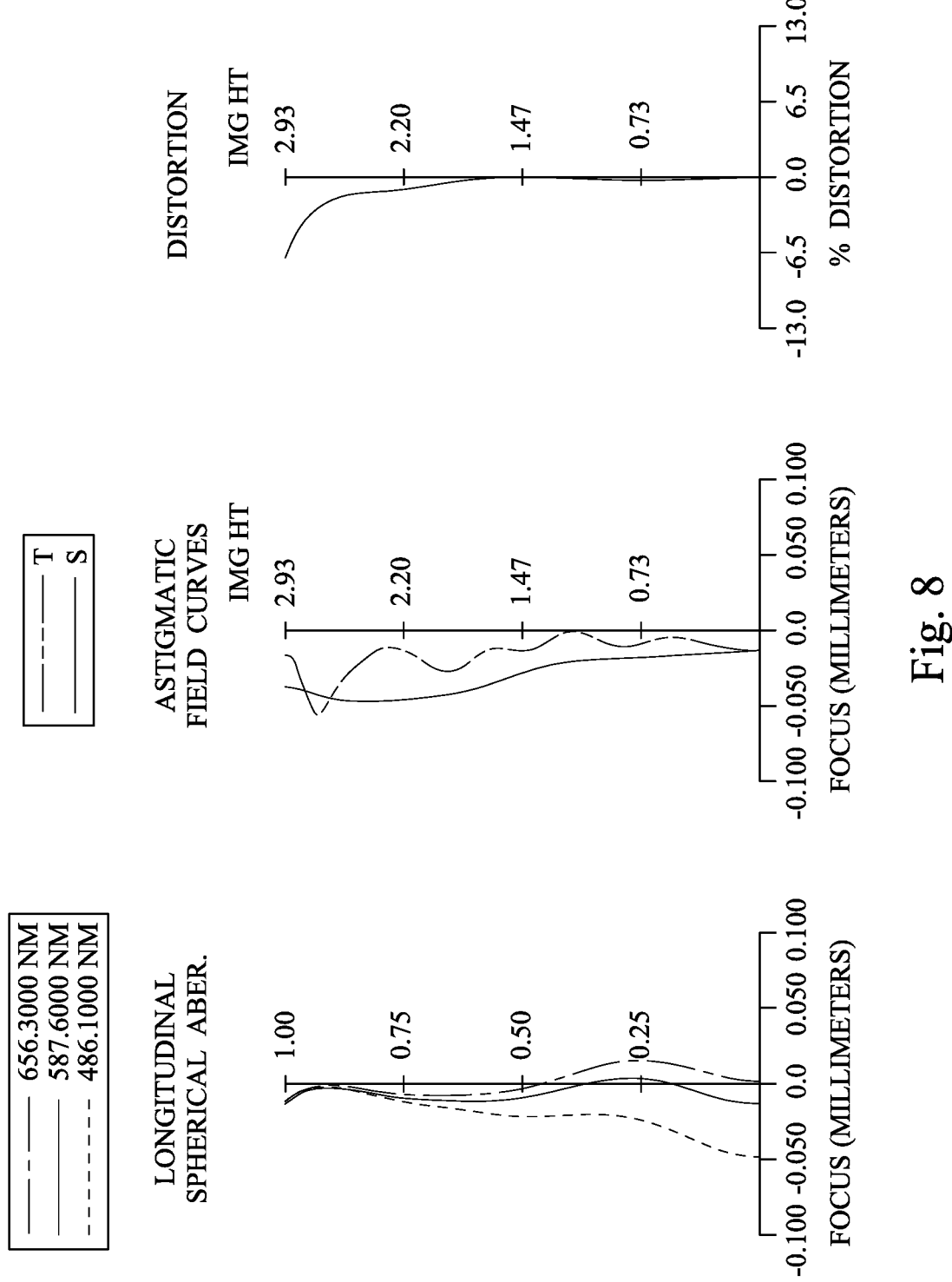
FIG. 8 shows spherical aberration curves, astigmatic field curves and a distortion curve of the imaging apparatus according to the 4th embodiment.

FIG. 7 is a schematic view of an imaging apparatus 4 according to the 4th embodiment of the present disclosure. FIG. 8 shows spherical aberration curves, astigmatic field curves and a distortion curve of the imaging apparatus 4 according to the 4th embodiment. In FIG. 7, the imaging apparatus 4 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes three inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points and two critical points in an off-axis region thereof, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points.

The filter E7 is made of a glass material, which is located between the sixth lens element E6 and the image surface IMG in order, and will not affect the focal length of the imaging optical system lens assembly.

The detailed optical data of the 4th embodiment are shown in Table 4A and the aspheric surface data are shown in Table 4B below.

TABLE 4A

| | | | | | | | Focal |
|---|---|---|---|---|---|---|---|
| Surface # | | Curvature Radius | Thickness | Material | Index | Abbe # | Length |

4th Embodiment
f = 1.63 mm, Fno = 2.04, HFOV = 62.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −1.1932 ASP | 0.397 | Plastic | 1.545 | 56.1 | −3.16 |
| 2 | | −4.3493 ASP | 0.624 | | | | |
| 3 | Stop | Plano | −0.339 | | | | |
| 4 | Lens 2 | 1.8251 ASP | 0.383 | Plastic | 1.660 | 20.4 | 9.03 |
| 5 | | 2.4108 ASP | 0.357 | | | | |
| 6 | Ape. Stop | Plano | −0.035 | | | | |
| 7 | Lens 3 | 2.6600 ASP | 0.797 | Plastic | 1.544 | 56.0 | 2.13 |
| 8 | | −1.8310 ASP | −0.203 | | | | |
| 9 | Stop | Plano | 0.312 | | | | |
| 10 | Lens 4 | −4.1063 ASP | 0.260 | Plastic | 1.686 | 18.4 | 65.63 |
| 11 | | −3.8601 ASP | 0.048 | | | | |
| 12 | Lens 5 | −1.7016 ASP | 0.710 | Plastic | 1.544 | 56.0 | 6.75 |
| 13 | | −1.3340 ASP | 0.063 | | | | |
| 14 | Lens 6 | 0.8228 ASP | 0.408 | Plastic | 1.545 | 56.1 | −605.77 |
| 15 | | 0.6772 ASP | 0.700 | | | | |
| 16 | Filter | Plano | 0.210 | Glass | 1.517 | 64.2 | — |
| 17 | | Plano | 0.381 | | | | |
| 18 | Image | Plano | — | | | | |

Reference wavelength is 587.6 nm (d-line).
Effective radius of Surface 3 (stop S1) is 0.989 mm.
Effective radius of Surface 9 (stop S2) is 0.770 mm.

TABLE 4B

Aspheric Coefficients

| Surface # | 1 | 2 | 4 | 5 |
|---|---|---|---|---|
| k= | −1.00000000E+00 | 0.00000000E+00 | 5.57303000E−01 | 2.25316000E+00 |
| A4= | 1.07786245E+00 | 1.26361271E+00 | 4.58908023E−01 | 2.57383821E−01 |
| A6= | −2.06497239E+00 | −9.86244389E−01 | −2.51246365E+00 | −1.30382645E+00 |
| A8= | 3.28961730E+00 | −7.54966145E+00 | 1.14780725E+01 | 9.42365249E+00 |
| A10= | −4.02404503E+00 | 4.41169572E+01 | −3.92336603E+01 | −3.02449524E+01 |
| A12= | 3.69677803E+00 | −1.25218255E+02 | 9.56879857E+01 | 4.19759128E+01 |
| A14= | −2.53648541E+00 | 2.18695824E+02 | −1.55838164E+02 | 4.37350143E+01 |
| A16= | 1.29635252E+00 | −2.41125280E+02 | 1.60062290E+02 | −2.29997997E+02 |
| A18= | −4.90112500E−01 | 1.55298596E+02 | −9.32632054E+01 | 2.82711705E+02 |
| A20= | 1.34956427E−01 | −3.37520707E+01 | 2.32803172E+01 | −1.18325176E+02 |
| A22= | −2.62736110E−02 | −3.25103895E+01 | | |
| A24= | 3.42340716E−03 | 3.48987067E+01 | | |
| A26= | −2.67626579E−04 | −1.65074977E+01 | | |
| A28= | 9.48417357E−06 | 4.40839539E+00 | | |
| A30= | | −5.48216465E−01 | | |

| Surface # | 7 | 8 | 10 | 11 |
|---|---|---|---|---|
| k= | 0.00000000E+00 | 2.95569000E+00 | 0.00000000E+00 | 0.00000000E+00 |
| A4= | −7.23191583E−02 | −1.15062586E−01 | −1.92404784E−01 | 2.77911403E+00 |
| A6= | 4.03789827E+00 | −3.94138861E+00 | −6.23796528E+00 | −2.48844252E+01 |
| A8= | −7.09842960E+01 | 4.60601830E+01 | 4.84816206E+01 | 1.24070411E+02 |
| A10= | 7.12181894E+02 | −2.89585007E+02 | −1.75908279E+02 | −4.04495798E+02 |
| A12= | −4.32920351E+03 | 1.11384720E+03 | 2.53893506E+02 | 9.07608577E+02 |
| A14= | 1.60730870E+04 | −2.70162764E+03 | 3.64562587E+02 | −1.42787093E+03 |
| A16= | −3.54033120E+04 | 4.01109248E+03 | −2.23563187E+03 | 1.57311904E+03 |
| A18= | 4.20592501E+04 | −3.31354057E+03 | 4.03322488E+03 | −1.18864509E+03 |
| A20= | −2.04279695E+04 | 1.16252779E+03 | −3.41745852E+03 | 5.86310259E+02 |
| A22= | | | 1.14806045E+03 | −1.69766331E+02 |
| A24= | | | | 2.18329827E+01 |

| Surface # | 12 | 13 | 14 | 15 |
|---|---|---|---|---|
| k= | 0.00000000E+00 | −1.00000000E+00 | −1.00000000E+00 | −1.00000000E+00 |
| A4= | 4.09579538E+00 | −1.44997590E−01 | −9.46030057E−01 | −9.89816263E−01 |
| A6= | −2.76670378E+01 | 8.34265384E−01 | 1.41788128E+00 | 1.35040403E+00 |
| A8= | 1.19326354E+02 | −9.06081099E−01 | −2.30103996E+00 | −1.69957348E+00 |
| A10= | −3.51923466E+02 | −4.52015337E+00 | 2.97289895E+00 | 1.71643371E+00 |
| A12= | 7.36294253E+02 | 2.13408091E+01 | −2.70004071E+00 | −1.31056450E+00 |
| A14= | −1.11413056E+03 | −4.35275846E+01 | 1.66905974E+00 | 7.39035788E−01 |
| A16= | 1.22568882E+03 | 5.27502155E+01 | −7.02025239E−01 | −3.05319670E−01 |

TABLE 4B-continued

| Aspheric Coefficients | | | |
|---|---|---|---|
| A18= | −9.71467401E+02 | −4.10396785E+01 | 2.01334318E−01 | 9.17081827E−02 |
| A20= | 5.40172052E+02 | 2.08672257E+01 | −3.89864653E−02 | −1.97268821E−02 |
| A22= | −1.99708221E+02 | −6.77898588E+00 | 4.93711952E−03 | 2.95176940E−03 |
| A24= | 4.40115823E+01 | 1.28891835E+00 | −3.80636897E−04 | −2.91038445E−04 |
| A26= | −4.36561038E+00 | −1.03371392E−01 | 1.52141409E−05 | 1.69627253E−05 |
| A28= | | −5.37088864E−03 | −1.97366180E−07 | −4.41927491E−07 |
| A30= | | 1.16250828E−03 | | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 4A and Table 4B as the following values and satisfy the following conditions in Table 4C:

TABLE 4C

| 4th Embodiment | | | |
|---|---|---|---|
| f [mm] | 1.63 | f/(T34 + T45 + T56) | 7.41 |
| Fno | 2.04 | f/f23 | 0.83 |
| HFOV [degrees] | 62.6 | f/f4 | 0.02 |
| (CT3 + CT5)/CT4 | 5.80 | f/f5 | 0.24 |
| (N2 + N4)/2 | 1.67 | f/f6 | 0.00 |
| (R11 + R12)/(R11 − R12) | 10.30 | f/T45 | 33.97 |
| (R4 + R12)/(R4 − R12) | 1.78 | f3/f5 | 0.31 |
| (R5 + R6)/(R5 − R6) | 0.18 | R10/R12 | −1.97 |
| (V2 + V4)/2 | 19.39 | R3/T12 | 6.40 |
| f/(CT3 + CT5) | 1.08 | SL/f | 2.24 |
| f/(T12 + T23) | 2.69 | T45/CT4 | 0.18 |

5th Embodiment

Figure 9:
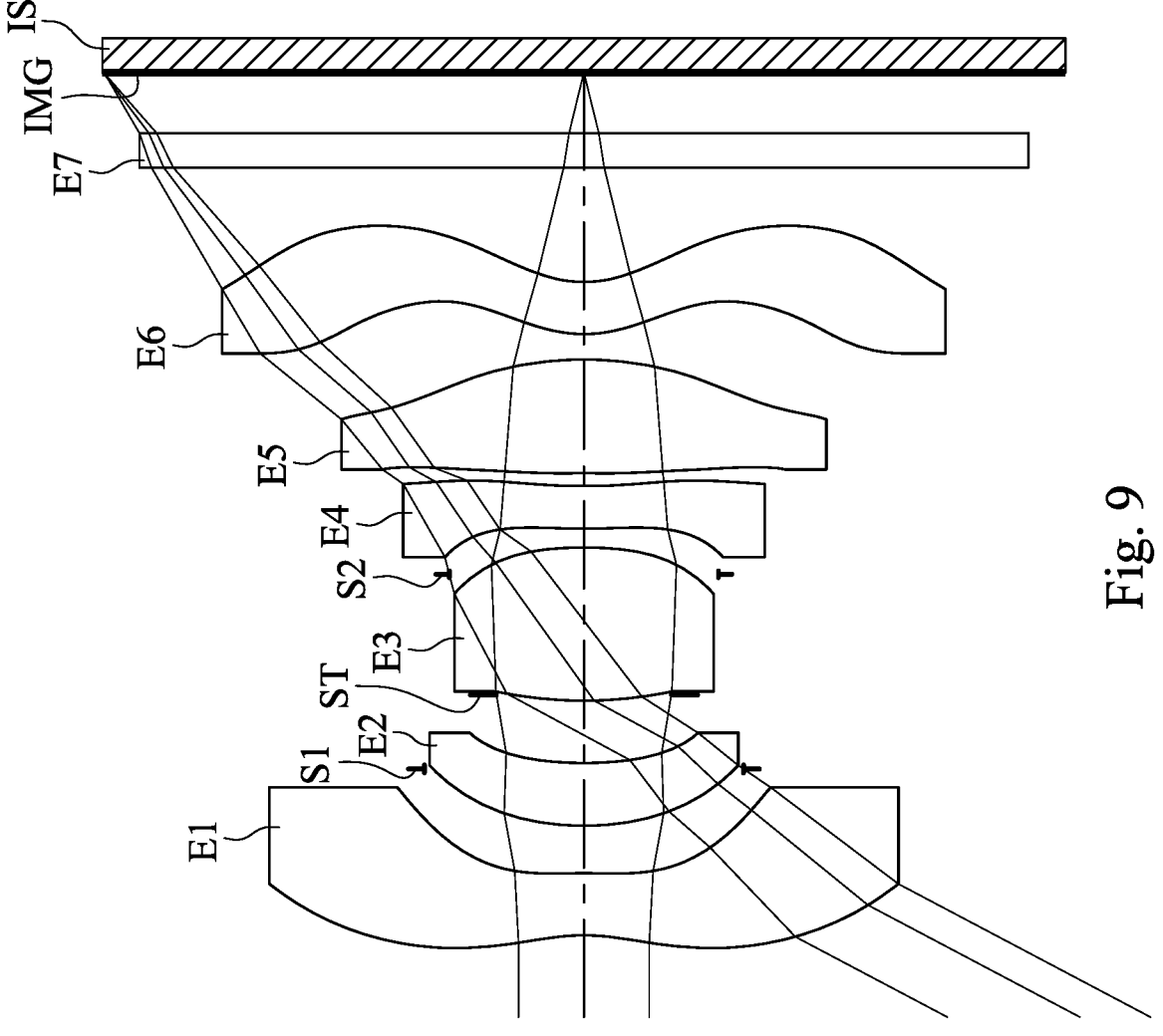
FIG. 9 is a schematic view of an imaging apparatus according to the 5th embodiment of the present disclosure.
Figure 10:
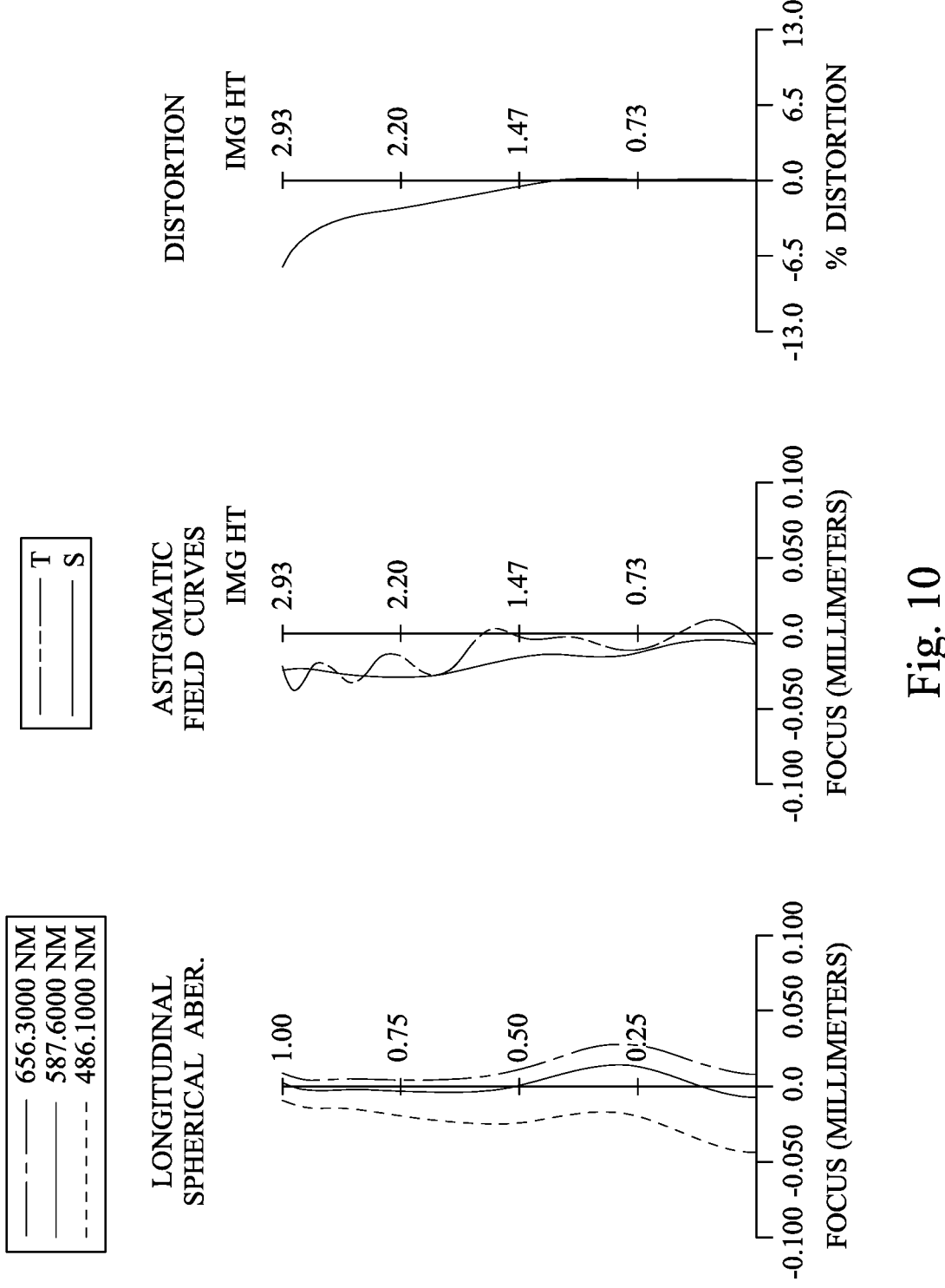
FIG. 10 shows spherical aberration curves, astigmatic field curves and a distortion curve of the imaging apparatus according to the 5th embodiment.

FIG. 9 is a schematic view of an imaging apparatus 5 according to the 5th embodiment of the present disclosure. FIG. 10 shows spherical aberration curves, astigmatic field curves and a distortion curve of the imaging apparatus 5 according to the 5th embodiment. In FIG. 9, the imaging apparatus 5 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes two inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes four inflection points and two critical points in an off-axis region thereof, and the image-side surface of the fifth lens element E5 includes two inflection points.

The sixth lens element E6 with positive refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 5th embodiment are shown in Table 5A and the aspheric surface data are shown in Table 5B below.

TABLE 5A

| | | | | | | | Focal |
|---|---|---|---|---|---|---|---|
| Surface # | | Curvature Radius | Thickness | Material | Index | Abbe # | Length |
| 0 | Object | Plano | Infinity | | | | |
| 1 | Lens 1 | −1.2214 ASP | 0.379 | Plastic | 1.545 | 56.1 | −2.90 |
| 2 | | −5.9374 ASP | 0.637 | | | | |
| 3 | Stop | Plano | −0.347 | | | | |
| 4 | Lens 2 | 1.8389 ASP | 0.383 | Plastic | 1.660 | 20.4 | 10.60 |
| 5 | | 2.2881 ASP | 0.416 | | | | |
| 6 | Ape. Stop | Plano | −0.035 | | | | |
| 7 | Lens 3 | 2.5911 ASP | 0.936 | Plastic | 1.544 | 56.0 | 2.53 |
| 8 | | −2.5641 ASP | −0.163 | | | | |
| 9 | Stop | Plano | 0.279 | | | | |
| 10 | Lens 4 | 5.1833 ASP | 0.260 | Plastic | 1.686 | 18.4 | 53.11 |
| 11 | | 5.9195 ASP | 0.078 | | | | |
| 12 | Lens 5 | −11.5603 ASP | 0.694 | Plastic | 1.544 | 56.0 | 5.27 |
| 13 | | −2.3472 ASP | 0.156 | | | | |
| 14 | Lens 6 | 0.8072 ASP | 0.318 | Plastic | 1.544 | 56.0 | 52.18 |
| 15 | | 0.7155 ASP | 0.700 | | | | |
| 16 | Filter | Plano | 0.210 | Glass | 1.517 | 64.2 | — |
| 17 | | Plano | 0.369 | | | | |
| 18 | Image | Plano | — | | | | |

Reference wavelength is 587.6 nm (d-line).
Effective radius of Surface 3 (stop S1) is 0.974 mm.
Effective radius of Surface 9 (stop S2) is 0.821 mm.

TABLE 5B

Aspheric Coefficients

| Surface # | 1 | 2 | 4 | 5 |
|---|---|---|---|---|
| k= | −1.00000000E+00 | −3.80939000E+00 | 3.61336000E−01 | 7.23923000E−01 |
| A4= | 1.00574671E+00 | 1.09819889E+00 | 3.35766220E−01 | 2.51399938E−01 |
| A6= | −1.83981483E+00 | −7.32225603E−01 | −1.46554798E+00 | −1.12853191E+00 |
| A8= | 2.82058747E+00 | −5.40437068E+00 | 6.38273704E+00 | 1.24999749E+01 |
| A10= | −3.34751947E+00 | 2.86975079E+01 | −2.13588692E+01 | −7.92370981E+01 |
| A12= | 2.99875273E+00 | −7.55352457E+01 | 5.07800254E+01 | 3.40171846E+02 |
| A14= | −2.01005982E+00 | 1.24377966E+02 | −7.89291001E+01 | −9.37760668E+02 |
| A16= | 1.00299715E+00 | −1.33531017E+02 | 7.52548935E+01 | 1.58117926E+03 |
| A18= | −3.69442431E−01 | 9.27835217E+01 | −3.96356125E+01 | −1.46742694E+03 |
| A20= | 9.88126807E−02 | −3.98920509E+01 | 8.74630108E+00 | 5.67225024E+02 |
| A22= | −1.86207049E−02 | 9.53176051E+00 | | |
| A24= | 2.33979520E−03 | −9.50260861E−01 | | |
| A26= | −1.75722182E−04 | | | |
| A28= | 5.95910667E−06 | | | |

| Surface # | 7 | 8 | 10 | 11 |
|---|---|---|---|---|
| k= | 0.00000000E+00 | 4.92624000E+00 | 0.00000000E+00 | 2.56374000E+00 |
| A4= | −5.63487631E−02 | −3.77611807E−01 | −3.91876590E−01 | 8.58168157E−01 |
| A6= | 2.34286552E+00 | −8.46660090E−01 | 5.59423962E−01 | −6.98437939E+00 |
| A8= | −3.35157707E+01 | 1.03333276E+01 | −1.74302610E+01 | 2.64491356E+01 |
| A10= | 2.49076363E+02 | −6.04127052E+01 | 1.45966148E+02 | −6.28410858E+01 |
| A12= | −9.07348024E+02 | 2.14253521E+02 | −6.51946543E+02 | 9.93347821E+01 |
| A14= | 5.58415807E+02 | −4.71619411E+02 | 1.77034400E+03 | −1.06300532E+02 |
| A16= | 6.96940876E+03 | 6.28417767E+02 | −3.01776860E+03 | 7.64544172E+01 |
| A18= | −2.19908852E+04 | −4.63936376E+02 | 3.16130592E+03 | −3.55566881E+01 |
| A20= | 2.07623361E+04 | 1.45198105E+02 | −1.86322724E+03 | 9.70129922E+00 |
| A22= | | | 4.73243700E+02 | −1.18374536E+00 |

| Surface # | 12 | 13 | 14 | 15 |
|---|---|---|---|---|
| k= | −9.77070000E+01 | −1.26239000E−01 | −1.00372000E+00 | −1.00000000E+00 |
| A4= | 1.22317055E+00 | −9.74509133E−02 | −5.99027146E−01 | −4.92149804E−01 |
| A6= | −6.79195802E+00 | 1.84529007E−01 | 4.12512616E−01 | −8.92793169E−02 |
| A8= | 2.10474574E+01 | −7.50428337E−02 | −1.05486790E+00 | 5.66108852E−01 |
| A10= | −4.15227600E+01 | −1.89983713E+00 | 1.93287622E+00 | −6.76857510E−01 |
| A12= | 5.52821166E+01 | 7.24484522E+00 | −1.94583177E+00 | 4.93963230E−01 |
| A14= | −5.11902275E+01 | −1.25064207E+01 | 1.19778010E+00 | −2.49345578E−01 |
| A16= | 3.32399600E+01 | 1.25748941E+01 | −4.79769965E−01 | 8.92614102E−02 |
| A18= | −1.49100590E+01 | −7.96702519E+00 | 1.28204042E−01 | −2.25668723E−02 |
| A20= | 4.40611702E+00 | 3.23773788E+00 | −2.27542296E−02 | 3.94726405E−03 |

TABLE 5B-continued

| | | Aspheric Coefficients | | |
|---|---|---|---|
| A22= | −7.70443379E−01 | −8.21584031E−01 | 2.58180314E−03 | −4.58823987E−04 |
| A24= | 6.00775055E−02 | 1.18805260E−01 | −1.69805844E−04 | 3.28634372E−05 |
| A26= | | −7.48789208E−03 | 4.93086544E−06 | −1.24039631E−06 |
| A28= | | | | 1.61006871E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 5A and Table 5B as the following values and satisfy the following conditions in Table 5C:

TABLE 5C

| | | 5th Embodiment | |
|---|---|---|---|
| f [mm] | 1.68 | f/(T34 + T45 + T56) | 4.79 |
| Fno | 2.10 | f/f23 | 0.72 |
| HFOV [degrees] | 62.11 | f/f4 | 0.03 |
| (CT3 + CT5)/CT4 | 6.27 | f/f5 | 0.32 |
| (N2 + N4)/2 | 1.67 | f/f6 | 0.03 |
| (R11 + R12)/(R11 − R12) | 16.61 | f/T45 | 21.48 |
| (R4 + R12)/(R4 − R12) | 1.91 | f3/f5 | 0.48 |
| (R5 + R6)/(R5 − R6) | 0.01 | R10/R12 | −3.28 |
| (V2 + V4)/2 | 19.39 | R3/T12 | 6.34 |
| f/(CT3 + CT5) | 1.03 | SL/f | 2.27 |
| f/(T12 + T23) | 2.50 | T45/CT4 | 0.30 |

6th Embodiment

Figure 11:
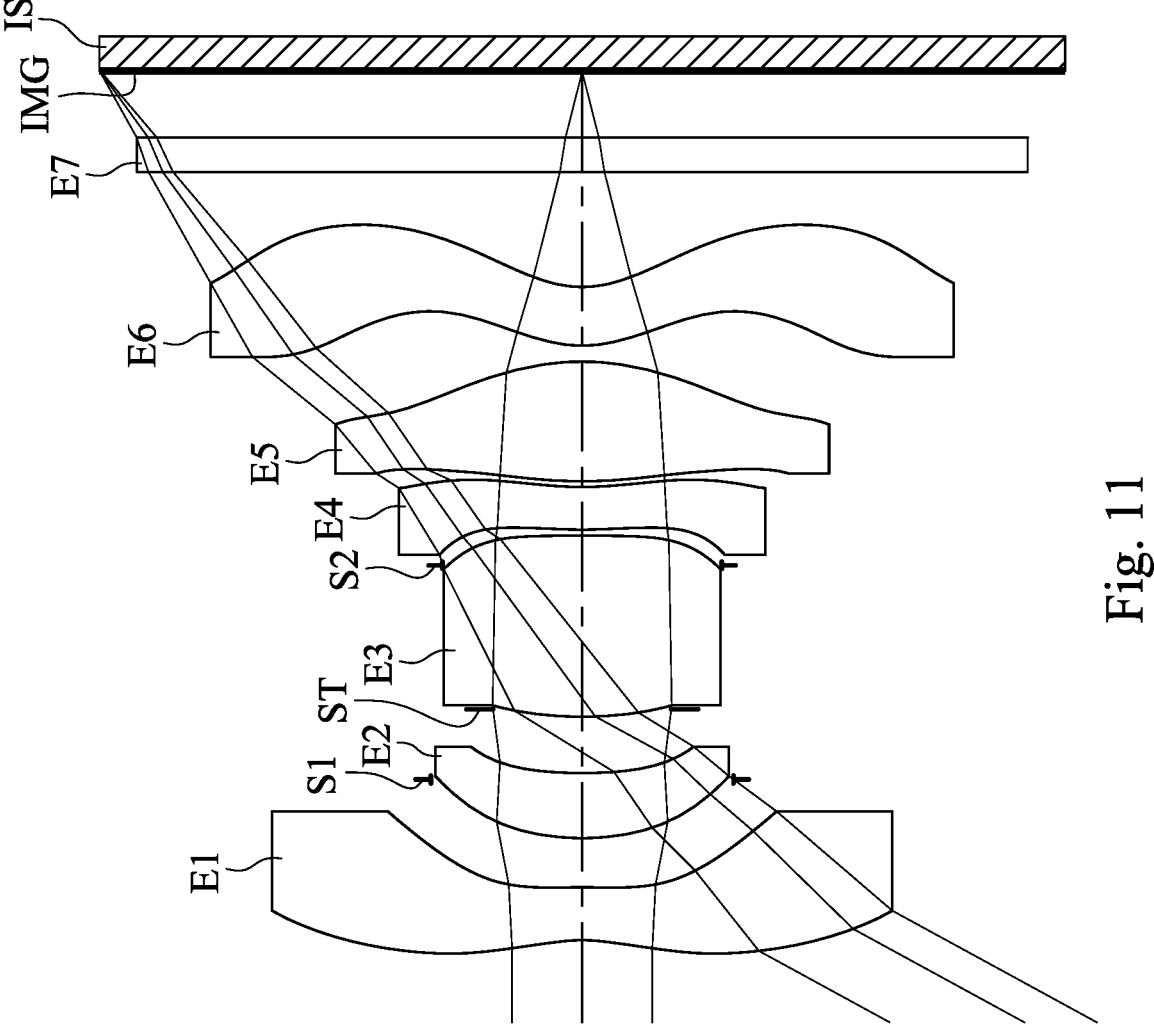
FIG. 11 is a schematic view of an imaging apparatus according to the 6th embodiment of the present disclosure.
Figure 12:
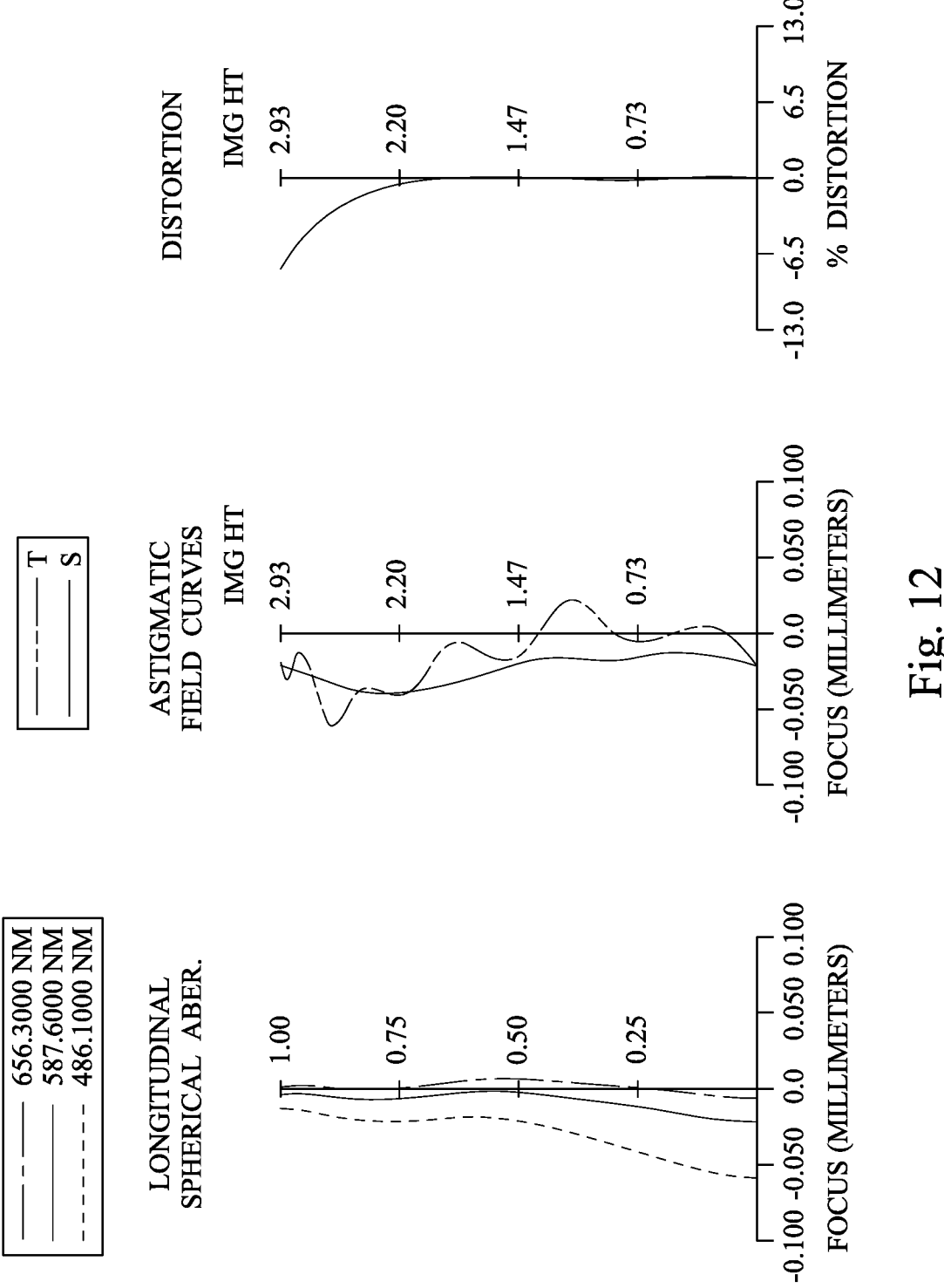
FIG. 12 shows spherical aberration curves, astigmatic field curves and a distortion curve of the imaging apparatus according to the 6th embodiment.

FIG. 11 is a schematic view of an imaging apparatus 6 according to the 6th embodiment of the present disclosure. FIG. 12 shows spherical aberration curves, astigmatic field curves and a distortion curve of the imaging apparatus 6 according to the 6th embodiment. In FIG. 11, the imaging apparatus 6 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes one inflection point.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the image-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes two inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points and one critical point in an off-axis region thereof, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 6th embodiment are shown in Table 6A and the aspheric surface data are shown in Table 6B below.

TABLE 6A

| | | 6th Embodiment<br>f = 1.73 mm, Fno = 2.03, HFOV = 61.3 deg. | | | | | |
|---|---|---|---|---|---|---|---|
| Surface # | | Curvature Radius | Thickness | Material | Index | Abbe # | Focal<br>Length |
| 0 | Object | Plano | Infinity | | | | |
| 1 | Lens 1 | −1.2080 ASP | 0.322 | Plastic | 1.545 | 56.1 | −2.85 |
| 2 | | −5.9810 ASP | 0.656 | | | | |
| 3 | Stop | Plano | −0.357 | | | | |
| 4 | Lens 2 | 1.6361 ASP | 0.396 | Plastic | 1.614 | 25.6 | 5.67 |
| 5 | | 2.8015 ASP | 0.388 | | | | |
| 6 | Ape. Stop | Plano | −0.045 | | | | |
| 7 | Lens 3 | 2.4383 ASP | 1.101 | Plastic | 1.534 | 56.0 | 5.78 |
| 8 | | 9.7943 ASP | −0.179 | | | | |
| 9 | Stop | Plano | 0.217 | | | | |
| 10 | Lens 4 | 2.6480 ASP | 0.260 | Plastic | 1.720 | 15.0 | −85.97 |
| 11 | | 2.4350 ASP | 0.036 | | | | |
| 12 | Lens 5 | 5.1626 ASP | 0.726 | Plastic | 1.544 | 56.0 | 2.35 |
| 13 | | −1.6121 ASP | 0.098 | | | | |
| 14 | Lens 6 | 0.8045 ASP | 0.357 | Plastic | 1.544 | 56.0 | −80.04 |
| 15 | | 0.6664 ASP | 0.700 | | | | |
| 16 | Filter | Plano | 0.210 | Glass | 1.517 | 64.2 | — |
| 17 | | Plano | 0.405 | | | | |
| 18 | Image | Plano | — | | | | |

Reference wavelength is 587.6 nm (d-line).
Effective radius of Surface 3 (stop S1) is 0.921 mm.
Effective radius of Surface 9 (stop S2) is 0.848 mm.

TABLE 6B

| | | | Aspheric Coefficients | |
|---|---|---|---|---|
| Surface # | 1 | 2 | 4 | 5 |
| k= | −1.00000000E+00 | 1.79604000E+01 | 5.26202000E−01 | 6.90701000E+00 |
| A4= | 1.02713934E+00 | 1.11347593E+00 | 2.67303671E−01 | 2.50731692E−01 |
| A6= | −1.92374864E+00 | −1.30230459E+00 | −5.78900818E−01 | −5.04688823E−01 |
| A8= | 3.01271458E+00 | −7.44887817E−01 | 1.86185623E+00 | 6.29945754E+00 |
| A10= | −3.68684558E+00 | 8.75839612E+00 | −4.15952546E+00 | −3.39344957E+01 |
| A12= | 3.42963704E+00 | −2.36190048E+01 | 6.27895822E+00 | 1.19407212E+02 |
| A14= | −2.39889039E+00 | 3.70982242E+01 | −4.69052384E+00 | −2.68173418E+02 |
| A16= | 1.25306145E+00 | −3.77844661E+01 | −1.33352333E+00 | 3.68933411E+02 |
| A18= | −4.84091151E−01 | 2.52777161E+01 | 4.62616277E+00 | −2.81525873E+02 |
| A20= | 1.35951632E−01 | −1.07242295E+01 | −2.20105204E+00 | 8.74162548E+01 |
| A22= | −2.69178923E−02 | 2.61689522E+00 | | |
| A24= | 3.55537450E−03 | −2.79972424E−01 | | |
| A26= | −2.80782287E−04 | | | |
| A28= | 1.00178397E−05 | | | |

| Surface # | 7 | 8 | 10 | 11 |
|---|---|---|---|---|
| k= | 0.00000000E+00 | −9.90000000E+01 | 0.00000000E+00 | −6.23350000E+01 |
| A4= | 4.21336009E−03 | −1.63253322E+00 | −1.60738813E+00 | 4.69842584E−01 |
| A6= | 2.85597602E+00 | 1.67378387E+01 | 1.29439485E+01 | −3.88269219E+00 |
| A8= | −5.18798828E+01 | −1.27478808E+02 | −8.46686614E+01 | 1.33906143E+01 |
| A10= | 5.69607169E+02 | 6.29507393E+02 | 3.70488417E+02 | −2.80594144E+01 |
| A12= | −3.91432229E+03 | −2.10072105E+03 | −1.10319120E+03 | 3.71857674E+01 |
| A14= | 1.69202612E+04 | 4.74645671E+03 | 2.20924838E+03 | −3.07127026E+01 |
| A16= | −4.46781275E+04 | −7.12588281E+03 | −2.89802797E+03 | 1.47097632E+01 |
| A18= | 6.58208915E+04 | 6.78609398E+03 | 2.36089320E+03 | −3.22560494E+00 |
| A20= | −4.14512838E+04 | −3.69950862E+03 | −1.06851296E+03 | −6.58064613E−02 |
| A22= | | 8.77201571E+02 | 2.01164698E+02 | 1.06283313E−01 |

| Surface # | 12 | 13 | 14 | 15 |
|---|---|---|---|---|
| k= | 6.76246000E+00 | −1.28218000E+00 | −9.96744000E−01 | −1.00000000E+00 |
| A4= | 8.96430155E−01 | −4.43914125E−02 | −7.41782864E−01 | −7.84551446E−01 |
| A6= | −5.87216297E+00 | 1.40632659E−01 | 8.75418493E−01 | 7.52368108E−01 |
| A8= | 1.87837525E+01 | 1.09221159E+00 | −1.51573477E+00 | −7.81453482E−01 |
| A10= | −3.83132153E+01 | −6.74412156E+00 | 1.98185271E+00 | 7.47889473E−01 |
| A12= | 5.35100950E+01 | 1.72961292E+01 | −1.67182669E+00 | −5.66552179E−01 |
| A14= | −5.25273257E+01 | −2.55031856E+01 | 9.23360291E−01 | 3.19976513E−01 |
| A16= | 3.62226469E+01 | 2.38203652E+01 | −3.41144749E−01 | −1.32577079E−01 |
| A18= | −1.71011657E+01 | −1.45915368E+01 | 8.48722436E−02 | 3.99336595E−02 |
| A20= | 5.20792115E+00 | 5.85747435E+00 | −1.40209718E−02 | −8.60862499E−03 |

TABLE 6B-continued

| | | Aspheric Coefficients | | |
| --- | --- | --- | --- | --- |
| A22= | −9.06373860E−01 | −1.48583708E+00 | 1.47144244E−03 | 1.28935472E−03 |
| A24= | 6.67905651E−02 | 2.16206221E−01 | −8.85100330E−05 | −1.27007584E−04 |
| A26= | | −1.37582596E−02 | 2.31258665E−06 | 7.37662178E−06 |
| A28= | | | | −1.90924986E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 6A and Table 6B as the following values and satisfy the following conditions in Table 6C:

TABLE 6C

| | | 6th Embodiment | |
| --- | --- | --- | --- |
| f [mm] | 1.73 | f/(T34 + T45 + T56) | 10.06 |
| Fno | 2.03 | f/f23 | 0.57 |
| HFOV [degrees] | 61.3 | f/f4 | −0.02 |
| (CT3 + CT5)/CT4 | 7.03 | f/f5 | 0.74 |
| (N2 + N4)/2 | 1.67 | f/f6 | −0.02 |
| (R11 + R12)/(R11 − R12) | 10.65 | f/T45 | 48.07 |
| (R4 + R12)/(R4 − R12) | 1.62 | f3/f5 | 2.46 |
| (R5 + R6)/(R5 − R6) | −1.66 | R10/R12 | −2.42 |
| (V2 + V4)/2 | 20.30 | R3/T12 | 5.47 |
| f/(CT3 + CT5) | 0.95 | SL/f | 2.25 |
| f/(T12 + T23) | 2.70 | T45/CT4 | 0.14 |

7th Embodiment

Figure 13:
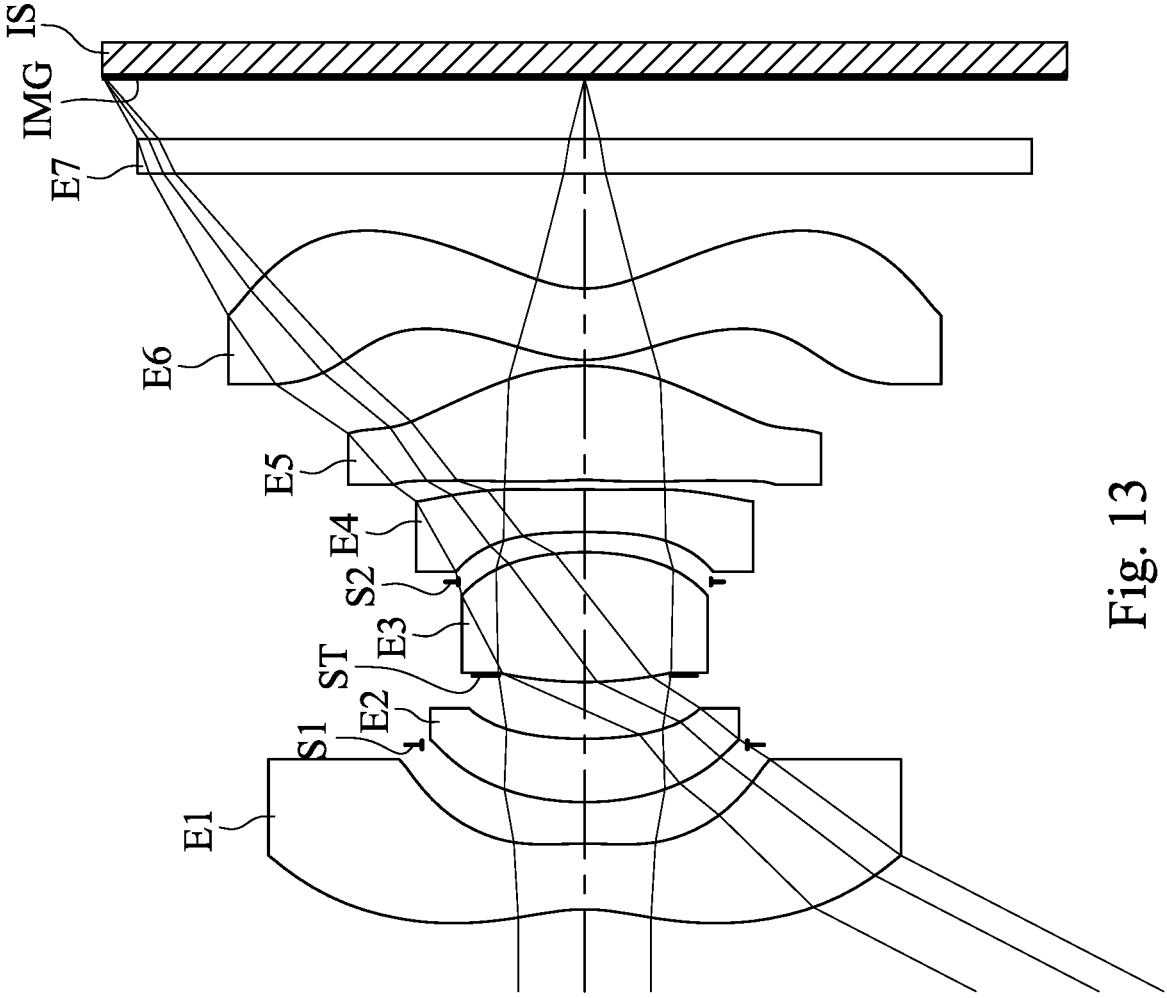
FIG. 13 is a schematic view of an imaging apparatus according to the 7th embodiment of the present disclosure.
Figure 14:
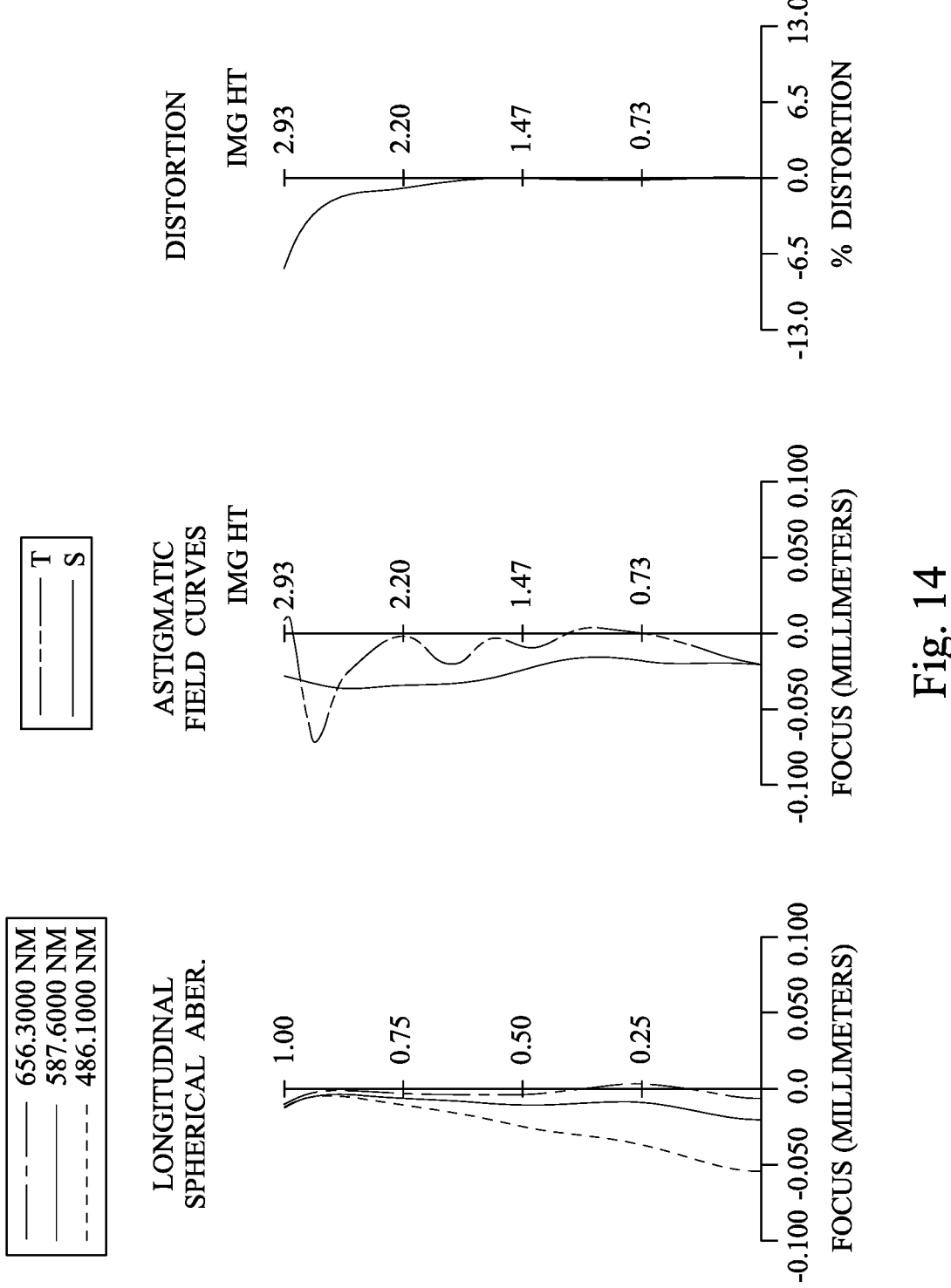
FIG. 14 shows spherical aberration curves, astigmatic field curves and a distortion curve of the imaging apparatus according to the 7th embodiment.

FIG. 13 is a schematic view of an imaging apparatus 7 according to the 7th embodiment of the present disclosure. FIG. 14 shows spherical aberration curves, astigmatic field curves and a distortion curve of the imaging apparatus 7 according to the 7th embodiment. In FIG. 13, the imaging apparatus 7 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes three inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points and two critical points in an off-axis region thereof, and the image-side surface of the fifth lens element E5 includes two inflection points.

The sixth lens element E6 with negative refractive power has an surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points.

The filter E7 is made of a glass material, which is located between the sixth lens element E6 and the image surface IMG in order, and will not affect the focal length of the imaging optical system lens assembly.

The detailed optical data of the 7th embodiment are shown in Table 7A and the aspheric surface data are shown in Table 7B below.

TABLE 7A

| | | | | | | | Focal |
|---|---|---|---|---|---|---|---|
| | | | | | | | |

7th Embodiment
f = 1.64 mm, Fno = 2.03, HFOV = 62.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −1.1355 ASP | 0.400 | Plastic | 1.545 | 56.1 | −3.39 |
| 2 | | −3.3110 ASP | 0.602 | | | | |
| 3 | Stop | Plano | −0.349 | | | | |
| 4 | Lens 2 | 1.8995 ASP | 0.385 | Plastic | 1.660 | 20.4 | 10.74 |
| 5 | | 2.3860 ASP | 0.384 | | | | |
| 6 | Ape. Stop | Plano | −0.038 | | | | |
| 7 | Lens 3 | 2.5458 ASP | 0.790 | Plastic | 1.544 | 56.0 | 2.11 |
| 8 | | −1.8665 ASP | −0.180 | | | | |
| 9 | Stop | Plano | 0.302 | | | | |
| 10 | Lens 4 | −5.3553 ASP | 0.260 | Plastic | 1.686 | 18.4 | 66.02 |
| 11 | | −4.8837 ASP | 0.059 | | | | |
| 12 | Lens 5 | −1.4996 ASP | 0.694 | Plastic | 1.544 | 56.0 | 6.88 |
| 13 | | −1.2451 ASP | 0.036 | | | | |
| 14 | Lens 6 | 0.8443 ASP | 0.434 | Plastic | 1.545 | 56.1 | −2069.65 |
| 15 | | 0.6907 ASP | 0.700 | | | | |
| 16 | Filter | Plano | 0.210 | Glass | 1.517 | 64.2 | — |
| 17 | | Plano | 0.378 | | | | |
| 18 | Image | Plano | — | | | | |

Reference wavelength is 587.6 nm (d-line).
Effective radius of Surface 3 (stop S1) is 0.990 mm.
Effective radius of Surface 9 (stop S2) is 0.769 mm.

TABLE 7B

Aspheric Coefficients

| Surface # | 1 | 2 | 4 | 5 |
|---|---|---|---|---|
| k= | −1.00000000E+00 | 0.00000000E+00 | 9.95066000E−01 | 1.74961000E+00 |
| A4= | 1.12834168E+00 | 1.39758329E+00 | 5.55596755E−01 | 2.48478656E−01 |
| A6= | −2.20753778E+00 | −1.44210850E+00 | −3.01263921E+00 | −8.46482109E−01 |
| A8= | 3.57642147E+00 | −6.55813825E+00 | 1.33774776E+01 | 3.96827074E+00 |
| A10= | −4.44537631E+00 | 4.27260678E+01 | −4.45238547E+01 | 3.81707406E+00 |
| A12= | 4.14721106E+00 | −1.24785027E+02 | 1.05378550E+02 | −9.06198856E+01 |
| A14= | −2.88659289E+00 | 2.22021933E+02 | −1.66989898E+02 | 3.74069685E+02 |
| A16= | 1.49426528E+00 | −2.50024480E+02 | 1.68090219E+02 | −7.40170532E+02 |
| A18= | −5.71153691E−01 | 1.67722087E+02 | −9.67910791E+01 | 7.22545997E+02 |
| A20= | 1.58687728E−01 | −4.53470880E+01 | 2.40437914E+01 | −2.78231577E+02 |
| A22= | −3.11097120E−02 | −2.42647175E+01 | | |
| A24= | 4.07406441E−03 | 3.01314308E+01 | | |
| A26= | −3.19532994E−04 | −1.44673125E+01 | | |
| A28= | 1.13422742E−05 | 3.89209271E+00 | | |
| A30= | | −4.95389990E−01 | | |

| Surface # | 7 | 8 | 10 | 11 |
|---|---|---|---|---|
| k= | 0.00000000E+00 | 2.70172000E+00 | 0.00000000E+00 | 0.00000000E+00 |
| A4= | −4.62588341E−02 | −1.61566938E−01 | −2.23155059E−01 | 2.40892359E+00 |
| A6= | 3.07402762E+00 | −2.77107547E+00 | −6.64229911E+00 | −2.16640524E+01 |
| A8= | −5.36477565E+01 | 3.42521021E+01 | 5.53419406E+01 | 1.08263739E+02 |
| A10= | 5.34095849E+02 | −2.20073888E+02 | −2.35712531E+02 | −3.55493653E+02 |
| A12= | −3.22597545E+03 | 8.58723602E+02 | 5.63211879E+02 | 8.04724167E+02 |
| A14= | 1.18803898E+04 | −2.11243779E+03 | −6.24507462E+02 | −1.27674003E+03 |
| A16= | −2.58587326E+04 | 3.17971157E+03 | −2.51228454E+02 | 1.41650259E+03 |
| A18= | 3.01357067E+04 | −2.66049431E+03 | 1.59184944E+03 | −1.07554808E+03 |
| A20= | −1.41652274E+04 | 9.43647280E+02 | −1.73054059E+03 | 5.31393831E+02 |
| A22= | | | 6.45820547E+02 | −1.53037131E+02 |
| A24= | | | | 1.90367310E+01 |
| A26= | | | | 1.85970833E−01 |

| Surface # | 12 | 13 | 14 | 15 |
|---|---|---|---|---|
| k= | 0.00000000E+00 | −1.00000000E+00 | −1.00000000E+00 | −1.00000000E+00 |
| A4= | 3.87971973E+00 | 3.62472142E−02 | −8.56310070E−01 | −9.93650410E−01 |
| A6= | −2.45234595E+01 | −2.91014957E−01 | 8.56320389E−01 | 1.34199930E+00 |
| A8= | 1.02829453E+02 | 3.54775577E+00 | −3.47352113E−01 | −1.53493086E+00 |
| A10= | −2.97962726E+02 | −1.54917388E+01 | −8.39298421E−01 | 1.33604934E+00 |
| A12= | 6.13875211E+02 | 3.96514437E+01 | 1.98727663E+00 | −8.57237700E−01 |
| A14= | −9.14337633E+02 | −6.53428378E+01 | −2.20732735E+00 | 3.97276642E−01 |

TABLE 7B-continued

| Aspheric Coefficients | | | |
|---|---|---|---|
| A16= | 9.89084407E+02 | 7.16607562E+01 | 1.51984414E+00 | −1.30267105E−01 |
| A18= | −7.69901941E+02 | −5.29471661E+01 | −6.90796527E−01 | 2.91434915E−02 |
| A20= | 4.19839593E+02 | 2.62281764E+01 | 2.10935603E−01 | −4.09676016E−03 |
| A22= | −1.51933937E+02 | −8.45035506E+00 | −4.28900343E−02 | 2.76358153E−04 |
| A24= | 3.26601840E+01 | 1.62834276E+00 | 5.57788881E−03 | 7.71516268E−06 |
| A26= | −3.12603741E+00 | −1.42685845E−01 | −4.20330809E−04 | −2.61815057E−06 |
| A28= | −7.70697886E−03 | −3.69047459E−03 | 1.39760726E−05 | 1.28615123E−07 |
| A30= | | 1.21666904E−03 | | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 7A and Table 7B as the following values and satisfy the following conditions in Table 7C:

TABLE 7C

| 7th Embodiment | | | |
|---|---|---|---|
| f [mm] | 1.64 | f/(T34 + T45 + T56) | 7.56 |
| Fno | 2.03 | f/f23 | 0.82 |
| HFOV [degrees] | 62.59 | f/f4 | 0.02 |
| (CT3 + CT5)/CT4 | 5.71 | f/f5 | 0.24 |
| (N2 + N4)/2 | 1.67 | f/f6 | 0.00 |
| (R11 + R12)/(R11 − R12) | 9.99 | f/T45 | 27.81 |
| (R4 + R12)/(R4 − R12) | 1.81 | f3/f5 | 0.31 |
| (R5 + R6)/(R5 − R6) | 0.15 | R10/R12 | −1.80 |
| (V2 + V4)/2 | 19.39 | R3/T12 | 7.51 |
| f/(CT3 + CT5) | 1.11 | SL/f | 2.22 |
| f/(T12 + T23) | 2.74 | T45/CT4 | 0.23 |

8th Embodiment

Figure 15:
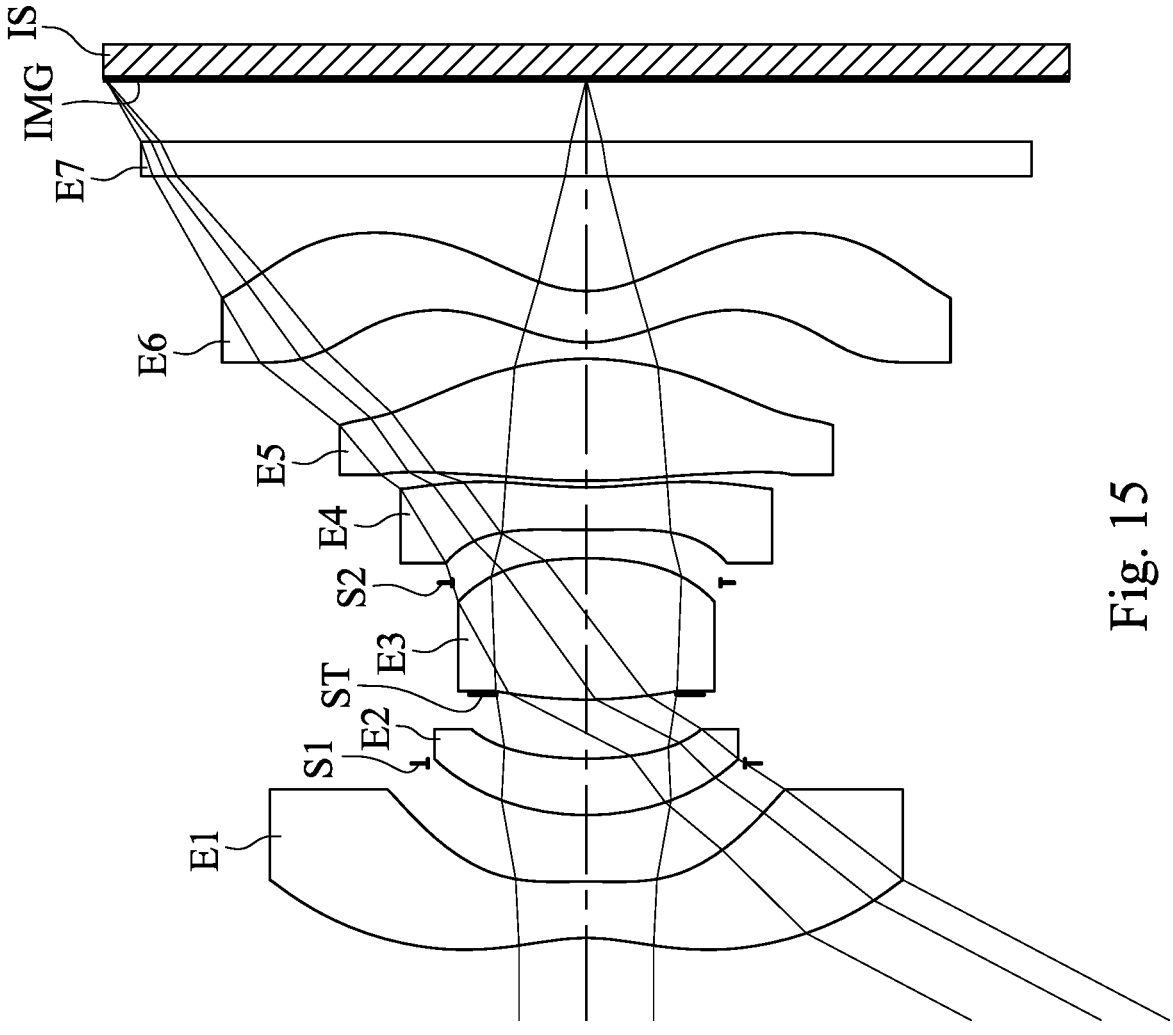
FIG. 15 is a schematic view of an imaging apparatus according to the 8th embodiment of the present disclosure.
Figure 16:
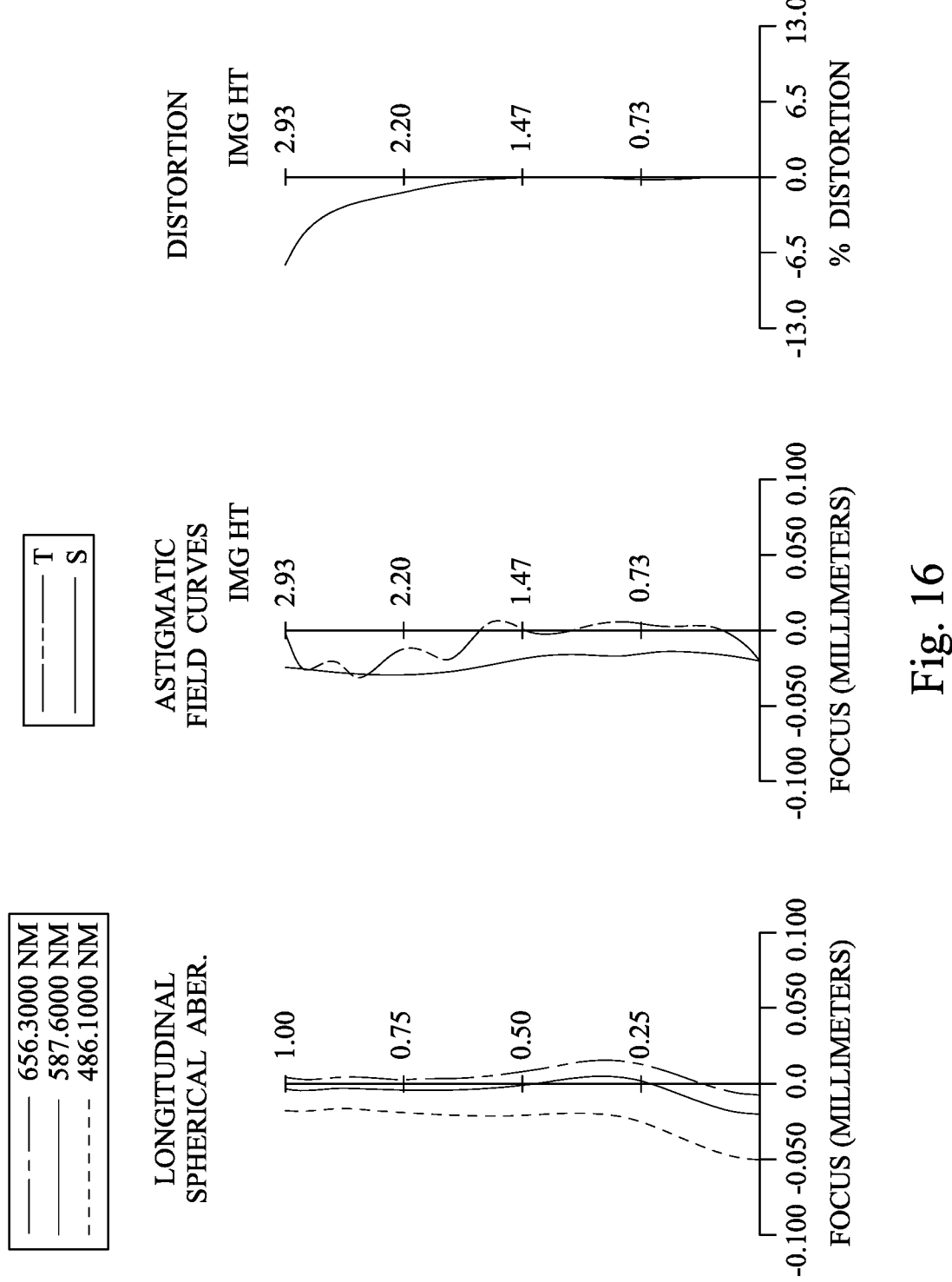
FIG. 16 shows spherical aberration curves, astigmatic field curves and a distortion curve of the imaging apparatus according to the 8th embodiment.

FIG. 15 is a schematic view of an imaging apparatus 8 according to the 8th embodiment of the present disclosure. FIG. 16 shows spherical aberration curves, astigmatic field curves and a distortion curve of the imaging apparatus 8 according to the 8th embodiment. In FIG. 15, the imaging apparatus 8 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element includes one inflection point, and the image-side surface of the fourth lens element E4 includes two inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point and one critical point in an off-axis region thereof, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 8th embodiment are shown in Table 8A and the aspheric surface data are shown in Table 8B below.

TABLE 8A

| Surface # | | Curvature Radius | Thickness | Material | Index | Abbe # | Focal Length |
|---|---|---|---|---|---|---|---|
| | | 8th Embodiment | | | | | |
| | | f = 1.67 mm, Fno = 2.04, HFOV = 62.2 deg. | | | | | |
| 0 | Object | Plano | Infinity | | | | |
| 1 | Lens 1 | −1.2437 ASP | 0.343 | Plastic | 1.545 | 56.1 | −2.85 |
| 2 | | −6.8212 ASP | 0.720 | | | | |
| 3 | Stop | Plano | −0.315 | | | | |
| 4 | Lens 2 | 1.6476 ASP | 0.343 | Plastic | 1.686 | 18.4 | 7.37 |
| 5 | | 2.2364 ASP | 0.390 | | | | |
| 6 | Ape. Stop | Plano | −0.030 | | | | |
| 7 | Lens 3 | 2.9215 ASP | 0.860 | Plastic | 1.544 | 56.0 | 2.49 |
| 8 | | −2.2685 ASP | −0.149 | | | | |
| 9 | Stop | Plano | 0.322 | | | | |
| 10 | Lens 4 | 9.9108 ASP | 0.260 | Plastic | 1.686 | 18.4 | −8.89 |
| 11 | | 3.7360 ASP | 0.040 | | | | |
| 12 | Lens 5 | 15.6164 ASP | 0.741 | Plastic | 1.544 | 56.0 | 3.18 |
| 13 | | −1.9121 ASP | 0.100 | | | | |
| 14 | Lens 6 | 0.8236 ASP | 0.312 | Plastic | 1.544 | 56.0 | −41.67 |
| 15 | | 0.6887 ASP | 0.700 | | | | |
| 16 | Filter | Plano | 0.210 | Glass | 1.517 | 64.2 | — |
| 17 | | Plano | 0.381 | | | | |
| 18 | Image | Plano | — | | | | |

Reference wavelength is 587.6 nm (d-line).
Effective radius of Surface 3 (stop S1) is 0.964 mm.
Effective radius of Surface 9 (stop S2) is 0.816 mm.

TABLE 8B

Aspheric Coefficients

| Surface # | 1 | 2 | 4 | 5 |
|---|---|---|---|---|
| k= | −1.00000000E+00 | 1.57811000E+01 | −4.64513000E−01 | −1.00227000E+00 |
| A4= | 1.02522754E+00 | 1.05692735E+00 | 2.20127464E−01 | 2.80396817E−01 |
| A6= | −1.89408554E+00 | −1.02136120E+00 | −8.93824232E−01 | −1.72574862E+00 |
| A8= | 2.95436156E+00 | −2.09111645E+00 | 3.77887226E+00 | 1.78852051E+01 |
| A10= | −3.57996649E+00 | 1.34533320E+01 | −1.22525836E+01 | −1.09893947E+02 |
| A12= | 3.27854498E+00 | −3.37564598E+01 | 2.85008461E+01 | 4.43341634E+02 |
| A14= | −2.24824851E+00 | 5.07216930E+01 | −4.40016019E+01 | −1.14318860E+03 |
| A16= | 1.14810620E+00 | −4.88405646E+01 | 4.20114231E+01 | 1.80824819E+03 |
| A18= | −4.32792746E−01 | 3.01083672E+01 | −2.20062959E+01 | −1.58063572E+03 |
| A20= | 1.18439557E−01 | −1.13515433E+01 | 4.72387855E+00 | 5.78503561E+02 |
| A22= | −2.28290960E−02 | 2.33718477E+00 | | |
| A24= | 2.93326289E−03 | −1.94450856E−01 | | |
| A26= | −2.25221846E−04 | | | |
| A28= | 7.80896276E−06 | | | |

| Surface # | 7 | 8 | 10 | 11 |
|---|---|---|---|---|
| k= | 0.00000000E+00 | 3.06381000E+00 | 0.00000000E+00 | −7.11551000E+01 |
| A4= | −4.83734221E−02 | −2.05944904E−01 | −4.13926650E−01 | 8.22070995E−01 |
| A6= | 1.78429510E+00 | −1.37552740E+00 | −1.68046141E−01 | −7.27209344E+00 |
| A8= | −2.55423914E+01 | 1.31338769E+01 | −1.33472109E+00 | 2.82135138E+01 |
| A10= | 1.93736780E+02 | −7.41576138E+01 | 2.63664872E+01 | −6.71899143E+01 |
| A12= | −7.87779599E+02 | 2.58053539E+02 | −1.47239836E+02 | 1.06061548E+02 |
| A14= | 1.30900050E+03 | −5.61996248E+02 | 4.31280269E+02 | −1.13820795E+02 |
| A16= | 1.32504965E+03 | 7.44931606E+02 | −7.48071322E+02 | 8.27184008E+01 |
| A18= | −7.89240751E+03 | −5.48792128E+02 | 7.74380397E+02 | −3.92197074E+01 |
| A20= | 8.04855744E+03 | 1.71749407E+02 | −4.43923215E+02 | 1.10034058E+01 |
| A22= | | | 1.08863952E+02 | −1.38952793E+00 |

| Surface # | 12 | 13 | 14 | 15 |
|---|---|---|---|---|
| k= | 9.90000000E+01 | −5.98096000E−01 | −9.96855000E−01 | −1.00000000E+00 |
| A4= | 1.26892010E+00 | −8.91539327E−02 | −7.14360376E−01 | −6.98383480E−01 |
| A6= | −8.27470358E+00 | 4.60147828E−01 | 8.67519884E−01 | 5.41795320E−01 |
| A8= | 2.74906327E+01 | −7.95883628E−01 | −1.80595034E+00 | −5.20063896E−01 |
| A10= | −5.70745962E+01 | −1.02277674E+00 | 2.72369688E+00 | 5.57469183E−01 |
| A12= | 7.92969050E+01 | 6.72632704E+00 | −2.53810415E+00 | −4.82815078E−01 |
| A14= | −7.58982639E+01 | −1.25874014E+01 | 1.51479213E+00 | 3.01300578E−01 |
| A16= | 5.02966718E+01 | 1.29889431E+01 | −5.98962888E−01 | −1.34254288E−01 |
| A18= | −2.26670146E+01 | −8.31369690E+00 | 1.59100762E−01 | 4.28245291E−02 |
| A20= | 6.61540527E+00 | 3.38951933E+00 | −2.81303808E−02 | −9.69845724E−03 |

TABLE 8B-continued

| | Aspheric Coefficients | | |
|---|---|---|---|
| A22= | −1.12332001E+00 | −8.59426222E−01 | 3.17925108E−03 | 1.51986644E−03 |
| A24= | 8.38417646E−02 | 1.23854390E−01 | −2.07996846E−04 | −1.56338480E−04 |
| A26= | | −7.76516704E−03 | 5.99549765E−06 | 9.47294438E−06 |
| A28= | | | | −2.55674410E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 8A and Table 8B as the following values and satisfy the following conditions in Table 8C:

TABLE 8C

| | 8th Embodiment | | |
|---|---|---|---|
| f [mm] | 1.67 | f/(T34 + T45 + T56) | 5.33 |
| Fno | 2.04 | f/f23 | 0.78 |
| HFOV [degrees] | 62.18 | f/f4 | −0.19 |
| (CT3 + CT5)/CT4 | 6.16 | f/f5 | 0.52 |
| (N2 + N4)/2 | 1.69 | f/f6 | −0.04 |
| (R11 + R12)/(R11 − R12) | 11.21 | f/T45 | 41.69 |
| (R4 + R12)/(R4 − R12) | 1.89 | f3/f5 | 0.78 |
| (R5 + R6)/(R5 − R6) | 0.13 | R10/R12 | −2.78 |
| (V2 + V4)/2 | 18.38 | R3/T12 | 4.07 |
| f/(CT3 + CT5) | 1.04 | SL/f | 2.25 |
| f/(T12 + T23) | 2.18 | T45/CT4 | 0.15 |

9th Embodiment

Figure 17:
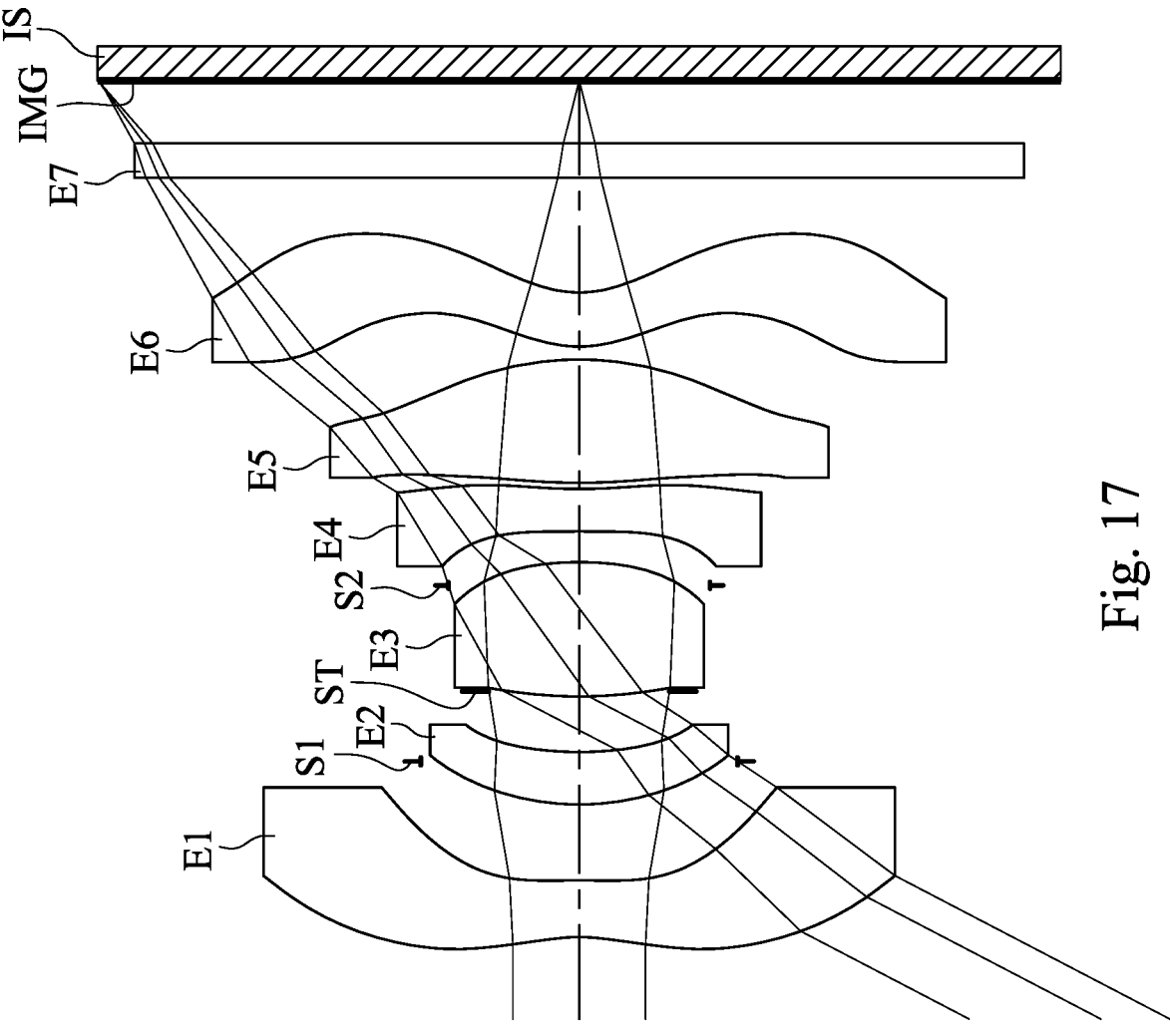
FIG. 17 is a schematic view of an imaging apparatus according to the 9th embodiment of the present disclosure.
Figure 18:
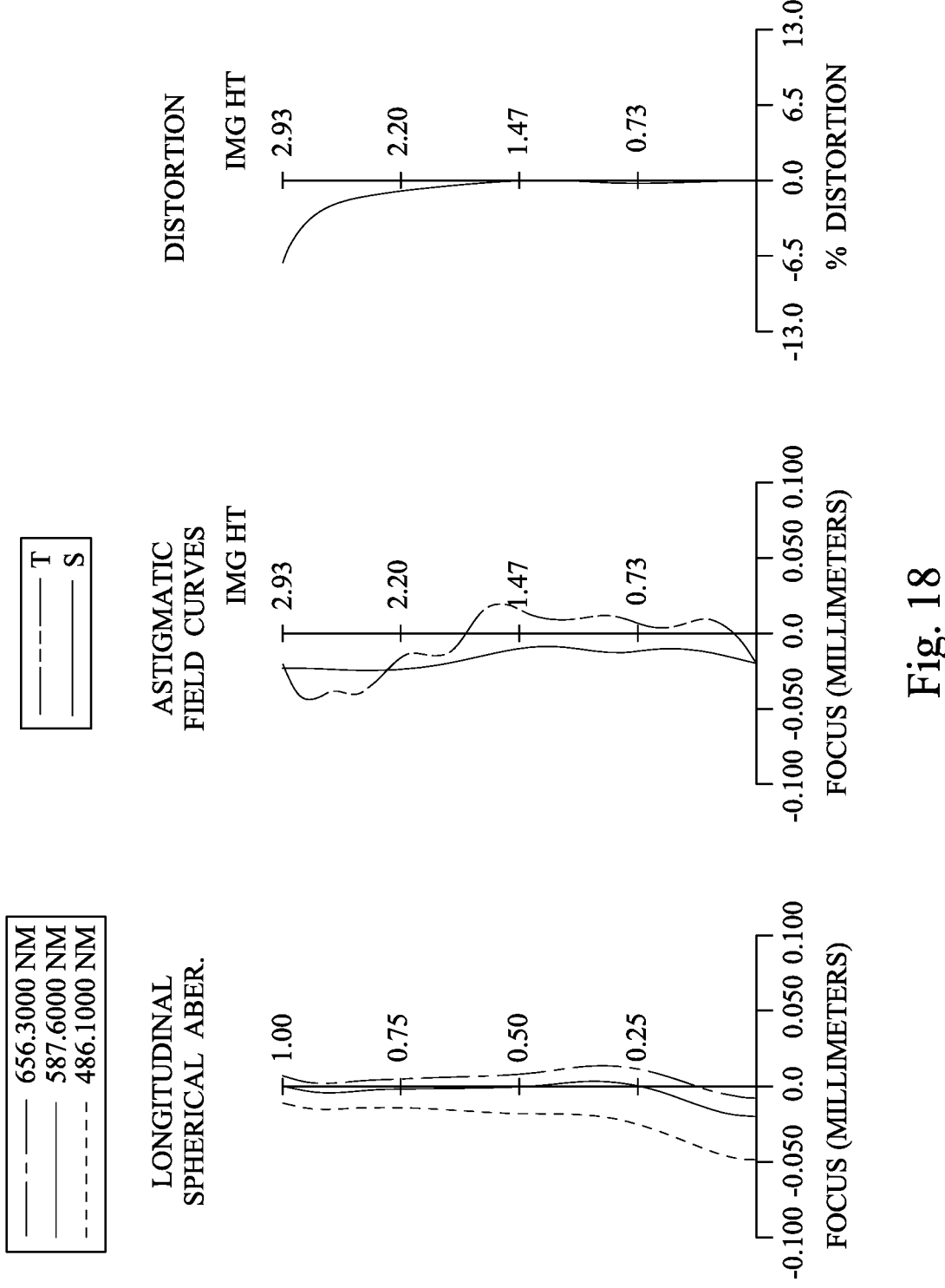
FIG. 18 shows spherical aberration curves, astigmatic field curves and a distortion curve of the imaging apparatus according to the 9th embodiment.

FIG. 17 is a schematic view of an imaging apparatus 9 according to the 9th embodiment of the present disclosure. FIG. 18 shows spherical aberration curves, astigmatic field curves and a distortion curve of the imaging apparatus 9 according to the 9th embodiment. In FIG. 17, the imaging apparatus 9 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with positive refractive power has an object-side surface being convex in a paraxial region thereof and an image-side surface being concave in a paraxial region thereof. The second lens element E2 is made of a plastic material, and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element includes one inflection point, and the image-side surface of the fourth lens element E4 includes two inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point and one critical point in an off-axis region thereof, and the image-side surface of the fifth lens element E5 includes two inflection points.

The sixth lens element E6 with positive refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 9th embodiment are shown in Table 9A and the aspheric surface data are shown in Table 9B below.

TABLE 9A

| Surface # | | Curvature Radius | | Thickness | Material | Index | Abbe # | Focal Length |
|-----------|-----------|------------------|-----|-----------|---------|-------|--------|--------------|
| | | 9th Embodiment f = 1.64 mm, Fno = 2.03, HFOV = 62.4 deg. | | | | | | |
| 0 | Object | Plano | | Infinity | | | | |
| 1 | Lens 1 | −1.2481 | ASP | 0.346 | Plastic | 1.545 | 56.1 | −2.89 |
| 2 | | −6.5878 | ASP | 0.727 | | | | |
| 3 | Stop | Plano | | −0.263 | | | | |
| 4 | Lens 2 | 1.7073 | ASP | 0.320 | Plastic | 1.712 | 15.5 | 7.93 |
| 5 | | 2.2572 | ASP | 0.370 | | | | |
| 6 | Ape. Stop | Plano | | −0.031 | | | | |
| 7 | Lens 3 | 2.8905 | ASP | 0.820 | Plastic | 1.544 | 56.0 | 2.34 |
| 8 | | −2.0446 | ASP | −0.142 | | | | |
| 9 | Stop | Plano | | 0.329 | | | | |
| 10 | Lens 4 | 105.6780 | ASP | 0.260 | Plastic | 1.686 | 18.4 | −6.44 |
| 11 | | 4.2379 | ASP | 0.039 | | | | |
| 12 | Lens 5 | 15.7698 | ASP | 0.750 | Plastic | 1.544 | 56.0 | 3.41 |
| 13 | | −2.0650 | ASP | 0.080 | | | | |
| 14 | Lens 6 | 0.7989 | ASP | 0.330 | Plastic | 1.544 | 56.0 | 54.30 |
| 15 | | 0.7016 | ASP | 0.700 | | | | |
| 16 | Filter | Plano | | 0.210 | Glass | 1.517 | 64.2 | — |
| 17 | | Plano | | 0.383 | | | | |
| 18 | Image | Plano | | — | | | | |

Reference wavelength is 587.6 nm (d-line).
Effective radius of Surface 3 (stop S1) is 0.966 mm.
Effective radius of Surface 9 (stop S2) is 0.797 mm.

TABLE 9B

Aspheric Coefficients

| Surface # | 1 | 2 | 4 | 5 |
|-----------|---|---|---|---|
| k= | −1.00000000E+00 | 1.02259000E+01 | −8.87229000E−01 | −2.22431000E+00 |
| A4= | 1.00157778E+00 | 1.02698603E+00 | 1.85466100E−01 | 2.44470289E−01 |
| A6= | −1.81855809E+00 | −1.13996699E+00 | −6.83353897E−01 | −9.57265286E−01 |
| A8= | 2.81639671E+00 | −5.05197910E−01 | 2.48714818E+00 | 8.64301690E+00 |
| A10= | −3.40748732E+00 | 6.10421127E+00 | −7.40861796E+00 | −4.98879565E+01 |
| A12= | 3.12582695E+00 | −1.37423824E+01 | 1.64532787E+01 | 2.02540156E+02 |
| A14= | −2.15085007E+00 | 1.56766995E+01 | −2.41910495E+01 | −5.30084202E+02 |
| A16= | 1.10296309E+00 | −8.45106087E+00 | 2.16649651E+01 | 8.45449363E+02 |
| A18= | −4.17574793E−01 | −2.79349538E−01 | −1.03061694E+01 | −7.33041435E+02 |
| A20= | 1.14748217E−01 | 2.98185115E+00 | 1.87419028E+00 | 2.61604959E+02 |
| A22= | −2.22026251E−02 | −1.50337174E+00 | | |
| A24= | 2.86296783E−03 | 2.50949657E−01 | | |
| A26= | −2.20571875E−04 | | | |
| A28= | 7.67323183E−06 | | | |

| Surface # | 7 | 8 | 10 | 11 |
|-----------|---|---|----|----|
| k= | 0.00000000E+00 | 2.56627000E+00 | 0.00000000E+00 | −8.99424000E+01 |
| A4= | −3.89524514E−02 | −2.05565214E−01 | −5.34120117E−01 | 7.07899526E−01 |
| A6= | 1.88521747E+00 | −1.35830381E+00 | 1.04308724E+00 | −6.55832342E+00 |
| A8= | −3.29821740E+01 | 1.58814152E+01 | −1.10369191E+01 | 2.37264279E+01 |
| A10= | 3.24368723E+02 | −1.01187111E+02 | 8.46599841E+01 | −4.87553342E+01 |
| A12= | −1.94660261E+03 | 3.84280163E+02 | −3.78828466E+02 | 6.02783315E+01 |
| A14= | 7.18649659E+03 | −8.97952318E+02 | 1.02582375E+03 | −4.29612580E+01 |
| A16= | −1.59290007E+04 | 1.26366277E+03 | −1.72242245E+03 | 1.35930160E+01 |
| A18= | 1.94013483E+04 | −9.81137869E+02 | 1.75554675E+03 | 2.16559224E+00 |
| A20= | −9.96782662E+03 | 3.21938338E+02 | −9.95023233E+02 | −2.88947037E+00 |
| A22= | | | 2.40430516E+02 | 6.12590372E−01 |

| Surface # | 12 | 13 | 14 | 15 |
|-----------|----|----|----|----|
| k= | 7.66630000E+01 | −4.27371000E−01 | −1.00364000E+00 | −1.00000000E+00 |
| A4= | 1.32910634E+00 | −1.20158820E−01 | −7.05669526E−01 | −6.00871979E−01 |
| A6= | −8.63806238E+00 | 3.54967629E−01 | 7.94555304E−01 | 2.52195653E−01 |
| A8= | 2.80382701E+01 | −5.33878815E−02 | −1.69472034E+00 | −1.11247134E−02 |
| A10= | −5.61360400E+01 | −3.23207938E+00 | 2.61882031E+00 | −3.50085498E−02 |
| A12= | 7.45978951E+01 | 1.05827269E+01 | −2.44763296E+00 | −2.78172056E−03 |
| A14= | −6.79589616E+01 | −1.67545608E+01 | 1.45072112E+00 | 2.49499588E−02 |
| A16= | 4.27601119E+01 | 1.58353102E+01 | −5.67684919E−01 | −2.01081460E−02 |
| A18= | −1.82858619E+01 | −9.53441107E+00 | 1.49135494E−01 | 8.95653683E−03 |
| A20= | 5.06671684E+00 | 3.70121169E+00 | −2.60964523E−02 | −2.54829065E−03 |

TABLE 9B-continued

| Aspheric Coefficients | | | |
|---|---|---|---|
| A22= | −8.17711668E−01 | −8.99303667E−01 | 2.92290992E−03 | 4.72415431E−04 |
| A24= | 5.81356031E−02 | 1.24652914E−01 | −1.89843115E−04 | −5.52089931E−05 |
| A26= | | −7.53334640E−03 | 5.44376681E−06 | 3.69103390E−06 |
| A28= | | | | −1.07544168E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 9A and Table 9B as the following values and satisfy the following conditions in Table 9C:

TABLE 9C

| 9th Embodiment | | | |
|---|---|---|---|
| f [mm] | 1.64 | f/(T34 + T45 + T56) | 5.37 |
| Fno | 2.03 | f/f23 | 0.80 |
| HFOV [degrees] | 62.42 | f/f4 | −0.25 |
| (CT3 + CT5)/CT4 | 6.04 | f/f5 | 0.48 |
| (N2 + N4)/2 | 1.70 | f/f6 | 0.03 |
| (R11 + R12)/(R11 − R12) | 15.42 | f/T45 | 42.10 |
| (R4 + R12)/(R4 − R12) | 1.90 | f3/f5 | 0.69 |
| (R5 + R6)/(R5 − R6) | 0.17 | R10/R12 | −2.94 |
| (V2 + V4)/2 | 16.95 | R3/T12 | 3.68 |
| f/(CT3 + CT5) | 1.05 | SL/f | 2.27 |
| f/(T12 + T23) | 2.04 | T45/CT4 | 0.15 |

10th Embodiment

Figure 19:
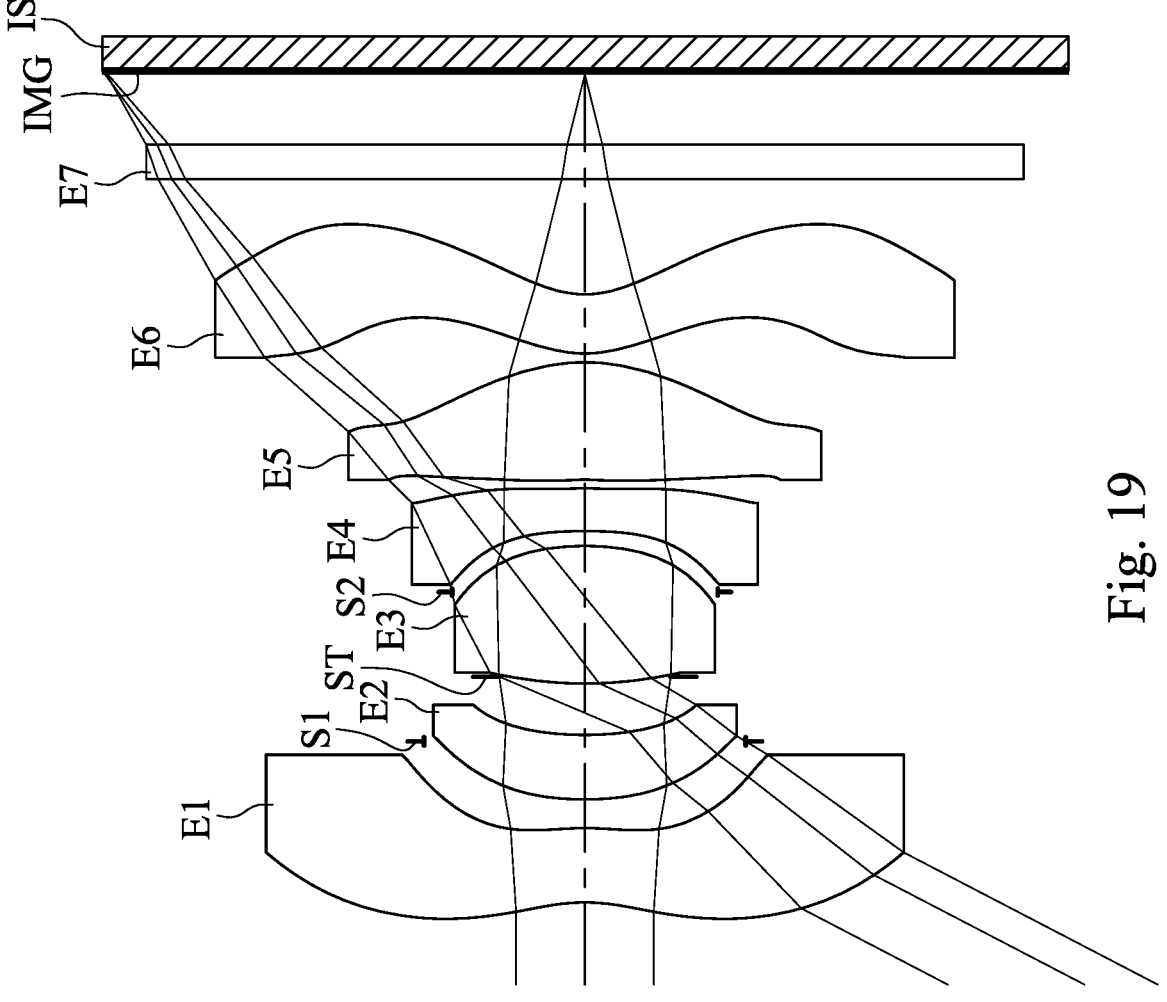
FIG. 19 is a schematic view of an imaging apparatus according to the 10th embodiment of the present disclosure.
Figure 20:
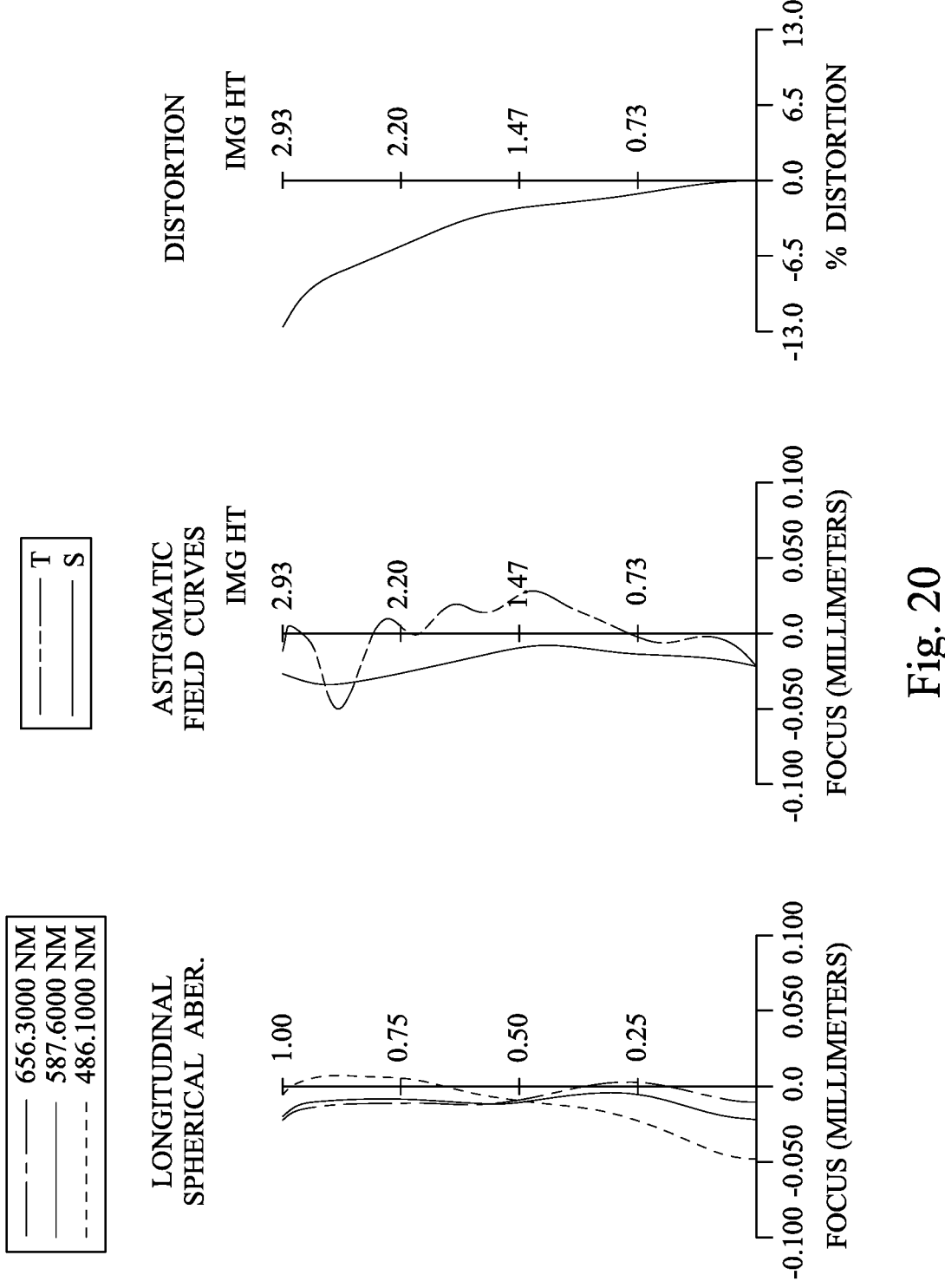
FIG. 20 shows spherical aberration curves, astigmatic field curves and a distortion curve of the imaging apparatus according to the 10th embodiment.

FIG. 19 is a schematic view of an imaging apparatus 10 according to the 10th embodiment of the present disclosure. FIG. 20 shows spherical aberration curves, astigmatic field curves and a distortion curve of the imaging apparatus 10 according to the 10th embodiment. In FIG. 19, the imaging apparatus 10 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes three inflection points.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element includes one inflection point, and the image-side surface of the fourth lens element E4 includes three inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes four inflection points and two critical points in an off-axis region thereof, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes three inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 10th embodiment are shown in Table 10A and the aspheric surface data are shown in Table 10B below.

TABLE 10A

| | | | | 10th Embodiment<br>f = 1.74 mm, Fno = 2.08, HFOV = 62.5 deg. | | | |
| --- | --- | --- | --- | --- | --- | --- | --- |
| Surface # | | Curvature Radius | Thickness | Material | Index | Abbe # | Focal<br>Length |
| 0 | Object | Plano | Infinity | | | | |
| 1 | Lens 1 | −1.0773 ASP | 0.452 | Plastic | 1.544 | 56.0 | −6.65 |
| 2 | | −1.7614 ASP | 0.528 | | | | |
| 3 | Stop | Plano | −0.353 | | | | |
| 4 | Lens 2 | 2.3879 ASP | 0.392 | Glass | 1.617 | 36.6 | −49.61 |
| 5 | | 2.0763 ASP | 0.354 | | | | |
| 6 | Ape. Stop | Plano | −0.041 | | | | |
| 7 | Lens 3 | 2.6094 ASP | 0.837 | Plastic | 1.544 | 56.0 | 2.04 |
| 8 | | −1.7097 ASP | −0.280 | | | | |
| 9 | Stop | Plano | 0.371 | | | | |
| 10 | Lens 4 | −2.8307 ASP | 0.260 | Plastic | 1.686 | 18.4 | 99.61 |
| 11 | | −2.8197 ASP | 0.053 | | | | |
| 12 | Lens 5 | −1.6095 ASP | 0.714 | Plastic | 1.544 | 56.0 | 5.33 |
| 13 | | −1.1971 ASP | 0.054 | | | | |
| 14 | Lens 6 | 0.8019 ASP | 0.360 | Plastic | 1.544 | 56.0 | −13.04 |
| 15 | | 0.6065 ASP | 0.700 | | | | |
| 16 | Filter | Plano | 0.210 | Glass | 1.517 | 64.2 | — |
| 17 | | Plano | 0.449 | | | | |
| 18 | Image | Plano | — | | | | |

Reference wavelength is 587.6 nm (d-line).
Effective radius of Surface 3 (stop S1) is 0.978 mm.
Effective radius of Surface 9 (stop S2) is 0.808 mm.

TABLE 10B

| | | Aspheric Coefficients | | |
| --- | --- | --- | --- | --- |
| Surface # | 1 | 2 | 4 | 5 |
| k= | −1.02049000E+00 | −7.48688000E+00 | 2.11560000E+00 | 1.74961000E+00 |
| A4= | 1.04623158E+00 | 1.73962833E+00 | 1.12123121E+00 | 2.48478656E−01 |
| A6= | −1.79561795E+00 | −5.23049560E+00 | −5.67100997E+00 | −8.46482109E−01 |
| A8= | 2.52429999E+00 | 2.75981430E+01 | 2.48643841E+01 | 3.96827074E+00 |
| A10= | −2.68736219E+00 | −1.74584272E+02 | −8.26590728E+01 | 3.81707406E+00 |
| A12= | 2.11176907E+00 | 8.42500272E+02 | 1.94561678E+02 | −9.06198856E+01 |
| A14= | −1.21228406E+00 | −2.83124698E+03 | −3.07312643E+02 | 3.74069685E+02 |
| A16= | 5.04135970E−01 | 6.67111846E+03 | 3.08483852E+02 | −7.40170532E+02 |
| A18= | −1.49670424E−01 | −1.11765734E+04 | −1.77232129E+02 | 7.22545997E+02 |
| A20= | 3.08498045E−02 | 1.33868448E+04 | 4.40857094E+01 | −2.78231577E+02 |
| A22= | −4.18714428E−03 | −1.13846519E+04 | | |
| A24= | 3.36055697E−04 | 6.71492166E+03 | | |
| A26= | −1.20681949E−05 | −2.61239149E+03 | | |
| A28= | | 6.03068906E+02 | | |
| A30= | | −6.25861752E+01 | | |

| Surface # | 7 | 8 | 10 | 11 |
| --- | --- | --- | --- | --- |
| k= | −2.70046000E−02 | 2.55942000E+00 | 6.05898000E−01 | −1.72765000E+01 |
| A4= | −1.88794246E−02 | 1.55016702E−01 | 4.57953870E−01 | 3.35770538E+00 |
| A6= | 3.38339329E+00 | −8.70410829E+00 | −1.64977161E+01 | −3.07797974E+01 |
| A8= | −9.56125842E+01 | 7.41928065E+01 | 1.42910813E+02 | 1.59589438E+02 |
| A10= | 1.68878277E+03 | −3.33070580E+02 | −8.35256905E+02 | −5.55253699E+02 |
| A12= | −1.99022234E+04 | 6.48808995E+02 | 3.75883204E+03 | 1.36337529E+03 |
| A14= | 1.58555706E+05 | 8.42803942E+02 | −1.34965843E+04 | −2.40452039E+03 |
| A16= | −8.51453958E+05 | −8.00525291E+03 | 3.77521833E+04 | 3.05080729E+03 |
| A18= | 3.02274287E+06 | 2.00464817E+04 | −7.82399738E+04 | −2.75320879E+03 |
| A20= | −6.77876061E+06 | −2.54654801E+04 | 1.13335724E+05 | 1.71950193E+03 |
| A22= | 8.68016311E+06 | 1.64826700E+04 | −1.06869633E+05 | −7.04461657E+02 |
| A24= | −4.82909554E+06 | −4.24654147E+03 | 5.84090115E+04 | 1.69875806E+02 |
| A26= | | | −1.39593041E+04 | −1.82376018E+01 |

| Surface # | 12 | 13 | 14 | 15 |
| --- | --- | --- | --- | --- |
| k= | 2.79397000E−02 | −1.07663000E+00 | −9.97281000E−01 | −1.01241000E+00 |
| A4= | 4.46100190E+00 | 1.14682765E−01 | −7.37480205E−01 | −1.08731704E+00 |
| A6= | −3.06135109E+01 | 6.08234722E−02 | 4.87302878E−01 | 1.45418466E+00 |
| A8= | 1.36706575E+02 | −1.47110133E+00 | −1.44178743E−01 | −1.70937732E+00 |
| A10= | −4.25203216E+02 | 7.43110134E+00 | 2.37152823E−01 | 1.63123784E+00 |
| A12= | 9.53698715E+02 | −2.07932680E+01 | −1.07656826E+00 | −1.23344586E+00 |
| A14= | −1.56743881E+03 | 3.70477596E+01 | 1.92528000E+00 | 7.26375539E−01 |

TABLE 10B-continued

| Aspheric Coefficients | | | |
|---|---|---|---|
| A16= | 1.89682827E+03 | −4.37840903E+01 | −1.92857175E+00 | −3.27877690E−01 |
| A18= | −1.68229859E+03 | 3.44699748E+01 | 1.23347192E+00 | 1.11654787E−01 |
| A20= | 1.07694550E+03 | −1.74971901E+01 | −5.29861579E−01 | −2.81876406E−02 |
| A22= | −4.82882844E+02 | 5.10391565E+00 | 1.55137222E−01 | 5.15642025E−03 |
| A24= | 1.43480335E+02 | −4.50974159E−01 | −3.06085773E−02 | −6.60374426E−04 |
| A26= | −2.53142506E+01 | −2.02862328E−01 | 3.89934476E−03 | 5.58713721E−05 |
| A28= | 2.00333471E+00 | 6.85792192E−02 | −2.89979871E−04 | −2.79290735E−06 |
| A30= | | −6.60114089E−03 | 9.57031897E−06 | 6.22024775E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 10A and Table 10B as the following values and satisfy the following conditions in Table 10C:

TABLE 10C

| 10th Embodiment | | | |
|---|---|---|---|
| f [mm] | 1.74 | f/(T34 + T45 + T56) | 8.79 |
| Fno | 2.08 | f/f23 | 0.78 |
| HFOV [degrees] | 62.49 | f/f4 | 0.02 |
| (CT3 + CT5)/CT4 | 5.97 | f/f5 | 0.33 |
| (N2 + N4)/2 | 1.65 | f/f6 | −0.13 |
| (R11 + R12)/(R11 − R12) | 7.21 | f/T45 | 32.83 |
| (R4 + R12)/(R4 − R12) | 1.83 | f3/f5 | 0.38 |
| (R5 + R6)/(R5 − R6) | 0.21 | R10/R12 | −1.97 |
| (V2 + V4)/2 | 27.51 | R3/T12 | 13.65 |
| f/(CT3 + CT5) | 1.12 | SL/f | 2.12 |
| f/(T12 + T23) | 3.57 | T45/CT4 | 0.20 |

11th Embodiment

Figure 21:
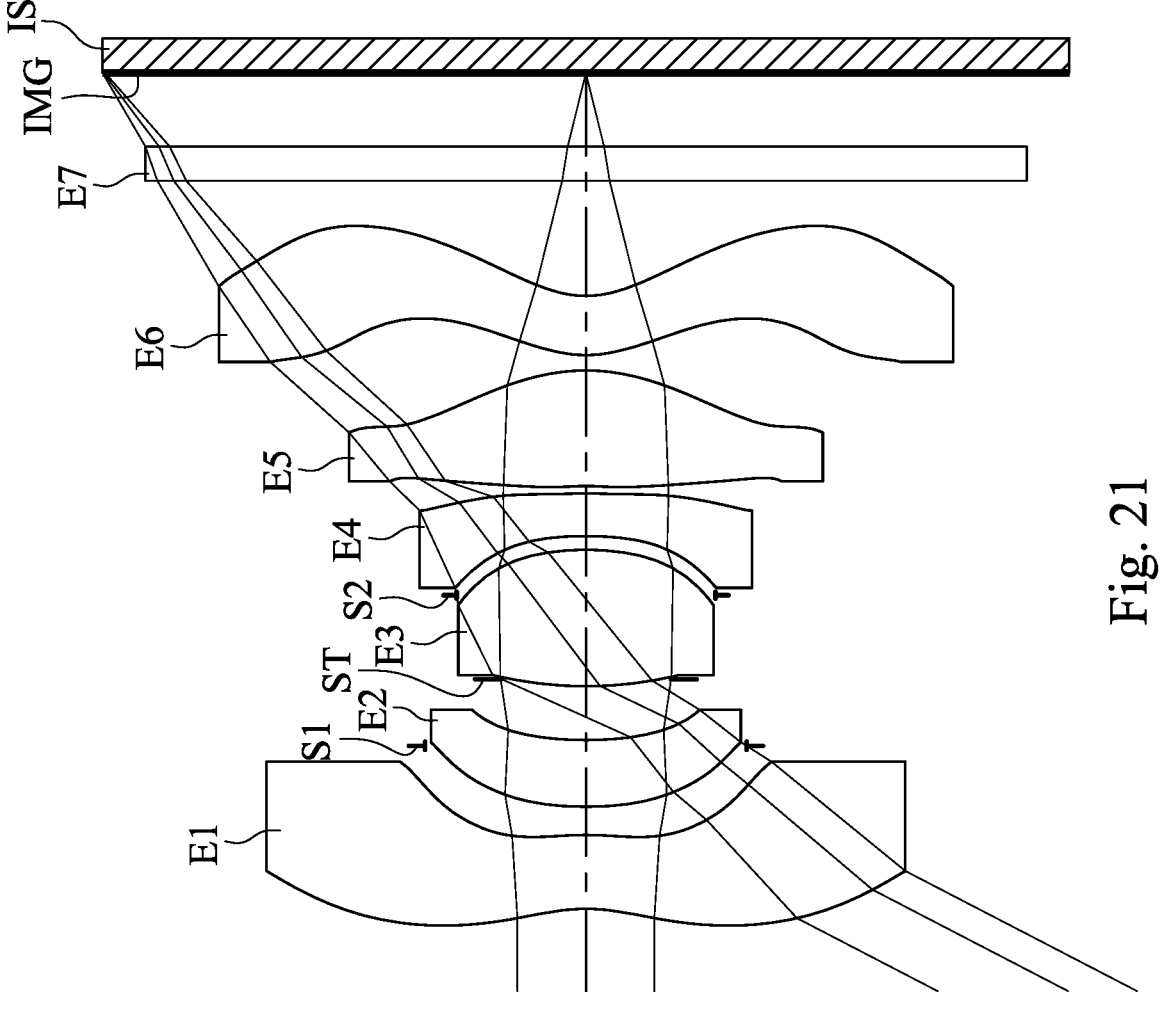
FIG. 21 is a schematic view of an imaging apparatus according to the 11th embodiment of the present disclosure.
Figure 22:
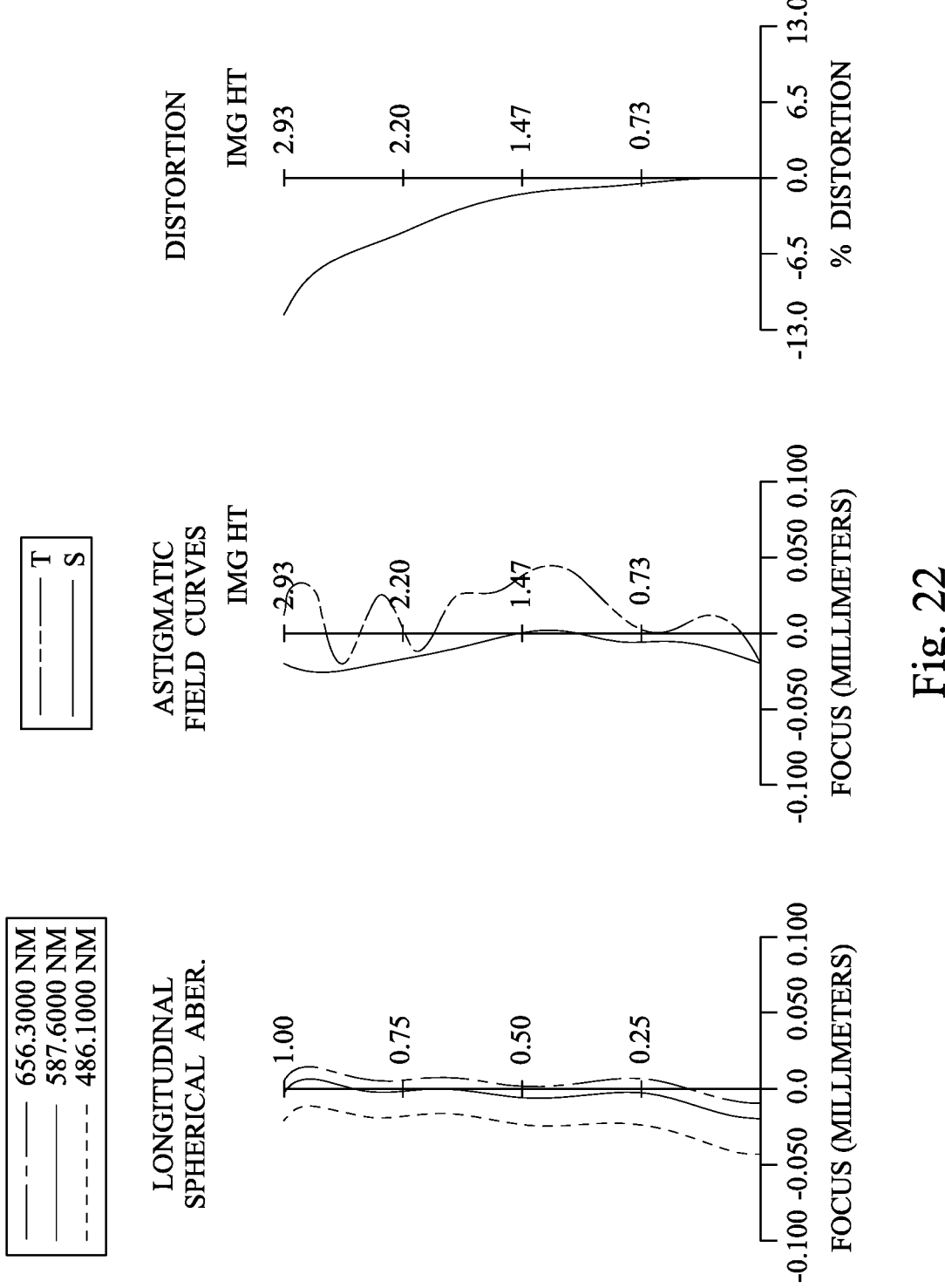
FIG. 22 shows spherical aberration curves, astigmatic field curves and a distortion curve of the imaging apparatus according to the 11th embodiment.

FIG. 21 is a schematic view of an imaging apparatus 11 according to the 11th embodiment of the present disclosure. FIG. 22 shows spherical aberration curves, astigmatic field curves and a distortion curve of the imaging apparatus 11 according to the 11th embodiment. In FIG. 21, the imaging apparatus 11 includes an imaging optical system lens assembly (its reference numeral is omitted) and an image sensor IS. The imaging optical system lens assembly includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a filter E7 and an image surface IMG, wherein the image sensor IS is disposed on the image surface IMG of the imaging optical system lens assembly. The imaging optical system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes two inflection points, and the image-side surface of the first lens element E1 includes two inflection points.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the image-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element includes one inflection point, and the image-side surface of the fourth lens element E4 includes three inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points and two critical points in an off-axis region thereof, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes three inflection points, and the image-side surface of the sixth lens element E6 includes three inflection points.

The filter E7 is made of a glass material, which is located between the sixth lens element E6 and the image surface IMG in order, and will not affect the focal length of the imaging optical system lens assembly.

The detailed optical data of the 11th embodiment are shown in Table 11A and the aspheric surface data are shown in Table 11 B below.

TABLE 11A

11th Embodiment
f = 1.72 mm, Fno = 2.06, HFOV = 62.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −1.0822 ASP | 0.450 | Plastic | 1.534 | 56.0 | −6.71 |
| 2 | | −1.7746 ASP | 0.542 | | | | |
| 3 | Stop | Plano | −0.370 | | | | |
| 4 | Lens 2 | 2.6620 ASP | 0.405 | Plastic | 1.686 | 18.4 | −34.36 |
| 5 | | 2.2438 ASP | 0.371 | | | | |
| 6 | Ape. Stop | Plano | −0.043 | | | | |
| 7 | Lens 3 | 2.4667 ASP | 0.830 | Plastic | 1.544 | 56.0 | 2.01 |
| 8 | | −1.7325 ASP | −0.276 | | | | |
| 9 | Stop | Plano | 0.360 | | | | |
| 10 | Lens 4 | −2.1417 ASP | 0.260 | Glass | 1.728 | 28.3 | −81.35 |
| 11 | | −2.3357 ASP | 0.044 | | | | |
| 12 | Lens 5 | −1.6921 ASP | 0.704 | Plastic | 1.544 | 56.0 | 5.05 |
| 13 | | −1.2004 ASP | 0.094 | | | | |
| 14 | Lens 6 | 0.7948 ASP | 0.360 | Plastic | 1.544 | 56.0 | −16.39 |
| 15 | | 0.6133 ASP | 0.700 | | | | |
| 16 | Filter | Plano | 0.210 | Glass | 1.517 | 64.2 | — |
| 17 | | Plano | 0.447 | | | | |
| 18 | Image | Plano | — | | | | |

Reference wavelength is 587.6 nm (d-line).
Effective radius of Surface 3 (stop S1) is 0.978 mm.
Effective radius of Surface 9 (stop S2) is 0.787 mm.

TABLE 11B

Aspheric Coefficients

| Surface # | 1 | 2 | 4 | 5 |
|---|---|---|---|---|
| k= | −9.93459000E−01 | −6.92200000E+00 | 3.18875000E+00 | 1.74961000E+00 |
| A4= | 1.05031817E+00 | 1.76674525E+00 | 1.01566452E+00 | 2.48478656E−01 |
| A6= | −1.84483575E+00 | −4.97139555E+00 | −5.21730292E+00 | −8.46482109E−01 |
| A8= | 2.66092881E+00 | 2.14590335E+01 | 2.31519351E+01 | 3.96827074E+00 |
| A10= | −2.90849511E+00 | −1.25392387E+02 | −7.74794397E+01 | 3.81707406E+00 |
| A12= | 2.34665724E+00 | 6.06920655E+02 | 1.83854680E+02 | −9.06198856E+01 |
| A14= | −1.38283356E+00 | −2.06826781E+03 | −2.92111926E+02 | 3.74069685E+02 |
| A16= | 5.90152867E−01 | 4.91207965E+03 | 2.93532212E+02 | −7.40170532E+02 |
| A18= | −1.79787153E−01 | −8.22054039E+03 | −1.67669832E+02 | 7.22545997E+02 |
| A20= | 3.80308898E−02 | 9.74495074E+03 | 4.11573144E+01 | −2.78231577E+02 |
| A22= | −5.29960118E−03 | −8.12792439E+03 | | |
| A24= | 4.37020313E−04 | 4.65973507E+03 | | |
| A26= | −1.61429350E−05 | −1.74652354E+03 | | |
| A28= | | 3.85092712E+02 | | |
| A30= | | −3.78560305E+01 | | |

| Surface # | 7 | 8 | 10 | 11 |
|---|---|---|---|---|
| k= | 5.09053000E−01 | 2.70410000E+00 | −3.75277000E+00 | −1.23651000E+01 |
| A4= | −2.52938139E−03 | 2.30095989E−01 | 3.84690878E−01 | 3.48993242E+00 |
| A6= | 2.16194744E+00 | −1.18047061E+01 | −1.51987767E+01 | −3.28734207E+01 |
| A8= | −4.97884119E+01 | 1.39488046E+02 | 1.23344421E+02 | 1.73565881E+02 |
| A10= | 7.55267909E+02 | −1.06020106E+03 | −5.96505506E+02 | −6.06162819E+02 |
| A12= | −8.35594707E+03 | 5.46295974E+03 | 1.82641062E+03 | 1.46625008E+03 |
| A14= | 6.70391927E+04 | −1.93851509E+04 | −3.42804173E+03 | −2.49049617E+03 |
| A16= | −3.76233664E+05 | 4.75115225E+04 | 3.43964446E+03 | 2.95771995E+03 |
| A18= | 1.41378845E+06 | −7.94350542E+04 | −8.64218931E+02 | −2.40149460E+03 |
| A20= | −3.35806330E+06 | 8.69432409E+04 | −1.36050892E+03 | 1.26819589E+03 |
| A22= | 4.53558825E+06 | −5.63391985E+04 | 9.07111610E+02 | −3.91714893E+02 |
| A24= | −2.64718997E+06 | 1.64010797E+04 | | 5.35712989E+01 |

| Surface # | 12 | 13 | 14 | 15 |
|---|---|---|---|---|
| k= | 3.96061000E−02 | −1.19787000E+00 | −1.00353000E+00 | −1.01145000E+00 |
| A4= | 4.88702439E+00 | −5.48964163E−03 | −8.02201064E−01 | −1.01290768E+00 |
| A6= | −3.59789437E+01 | 7.97321852E−01 | 1.13824616E+00 | 1.32133557E+00 |
| A8= | 1.71143296E+02 | −3.89754737E+00 | −2.66008122E+00 | −1.66156659E+00 |
| A10= | −5.62616803E+02 | 1.22385770E+01 | 5.74451136E+00 | 1.78506809E+00 |
| A12= | 1.32441083E+03 | −2.61491697E+01 | −8.96008101E+00 | −1.52177925E+00 |
| A14= | −2.27285923E+03 | 3.99494173E+01 | 9.79448525E+00 | 9.88280967E−01 |
| A16= | 2.86239949E+03 | −4.43540581E+01 | −7.57158847E+00 | −4.79631332E−01 |

TABLE 11B-continued

| Aspheric Coefficients | | | |
|---|---|---|---|
| A18= | −2.63694044E+03 | 3.55013145E+01 | 4.17263918E+00 | 1.72016002E−01 |
| A20= | 1.75209432E+03 | −1.99697322E+01 | −1.64014186E+00 | −4.50589238E−02 |
| A22= | −8.15541459E+02 | 7.54569096E+00 | 4.55440747E−01 | 8.46512504E−03 |
| A24= | 2.51790586E+02 | −1.75659226E+00 | −8.71756834E−02 | −1.10538942E−03 |
| A26= | −4.62286118E+01 | 2.00548600E−01 | 1.09364665E−02 | 9.48511177E−05 |
| A28= | 3.81431991E+00 | 3.18333959E−04 | −8.09132030E−04 | −4.78788915E−06 |
| A30= | | −1.67556390E−03 | 2.67574264E−05 | 1.07241108E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 11A and Table 11B as the following values and satisfy the following conditions in Table 11C:

TABLE 11C

| 11th Embodiment | | | |
|---|---|---|---|
| f [mm] | 1.72 | f/(T34 + T45 + T56) | 7.73 |
| Fno | 2.06 | f/f23 | 0.77 |
| HFOV [degrees] | 62.59 | f/f4 | −0.02 |
| (CT3 + CT5)/CT4 | 5.90 | f/f5 | 0.34 |
| (N2 + N4)/2 | 1.71 | f/f6 | −0.10 |
| (R11 + R12)/(R11 − R12) | 7.76 | f/T45 | 38.99 |
| (R4 + R12)/(R4 − R12) | 1.75 | f3/f5 | 0.40 |
| (R5 + R6)/(R5 − R6) | 0.17 | R10/R12 | −1.96 |
| (V2 + V4)/2 | 23.35 | R3/T12 | 15.48 |
| f/(CT3 + CT5) | 1.12 | SL/f | 2.15 |
| f/(T12 + T23) | 3.43 | T45/CT4 | 0.17 |

12th Embodiment

Figure 24:
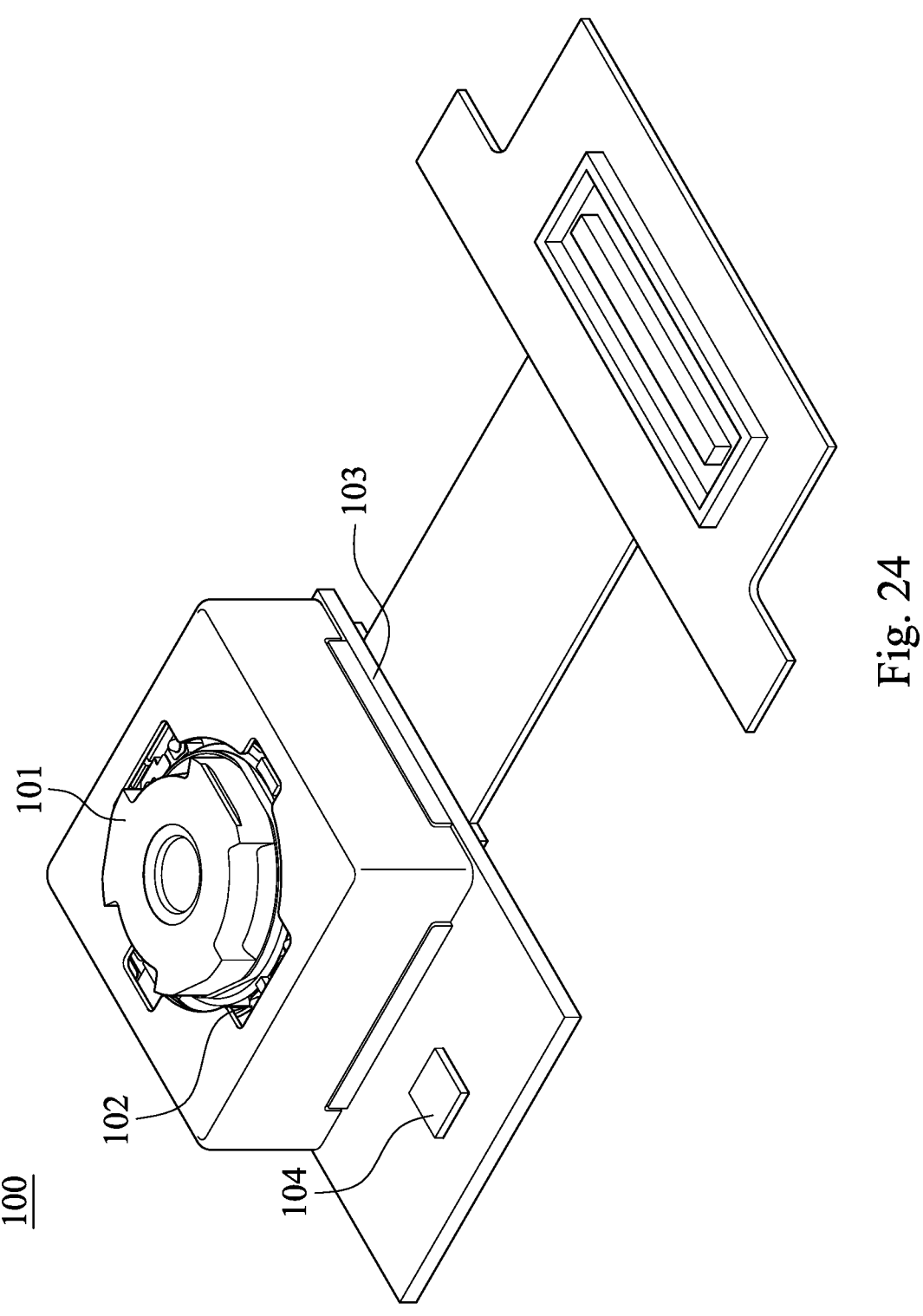
FIG. 24 is a schematic view of an imaging apparatus according to the 12th embodiment of the present disclosure.

FIG. 24 is a schematic view of an imaging apparatus 100 according to the 12th embodiment of the present disclosure. In FIG. 24, the imaging apparatus 100 of the 12th embodiment is a camera module, the imaging apparatus 100 includes an imaging lens assembly 101, a driving apparatus 102 and an image sensor 103, wherein the imaging lens assembly 101 includes the imaging optical system lens assembly of the present disclosure and a lens barrel (not shown in drawings) for carrying the imaging optical system lens assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys etc. The imaging optical system lens assembly can obtain a favorable imaging position by the driving apparatus 102 so as to capture clear images when the imaged object is disposed at different object distances.

The imaging apparatus 100 can include the image sensor 103 located on the image surface of the imaging optical system lens assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, and a Hall Effect sensor. In the 12th embodiment, the image stabilization module 104 is a gyro sensor, but is not limited thereto. Therefore, the variation of different axial directions of the imaging optical system lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 25A:
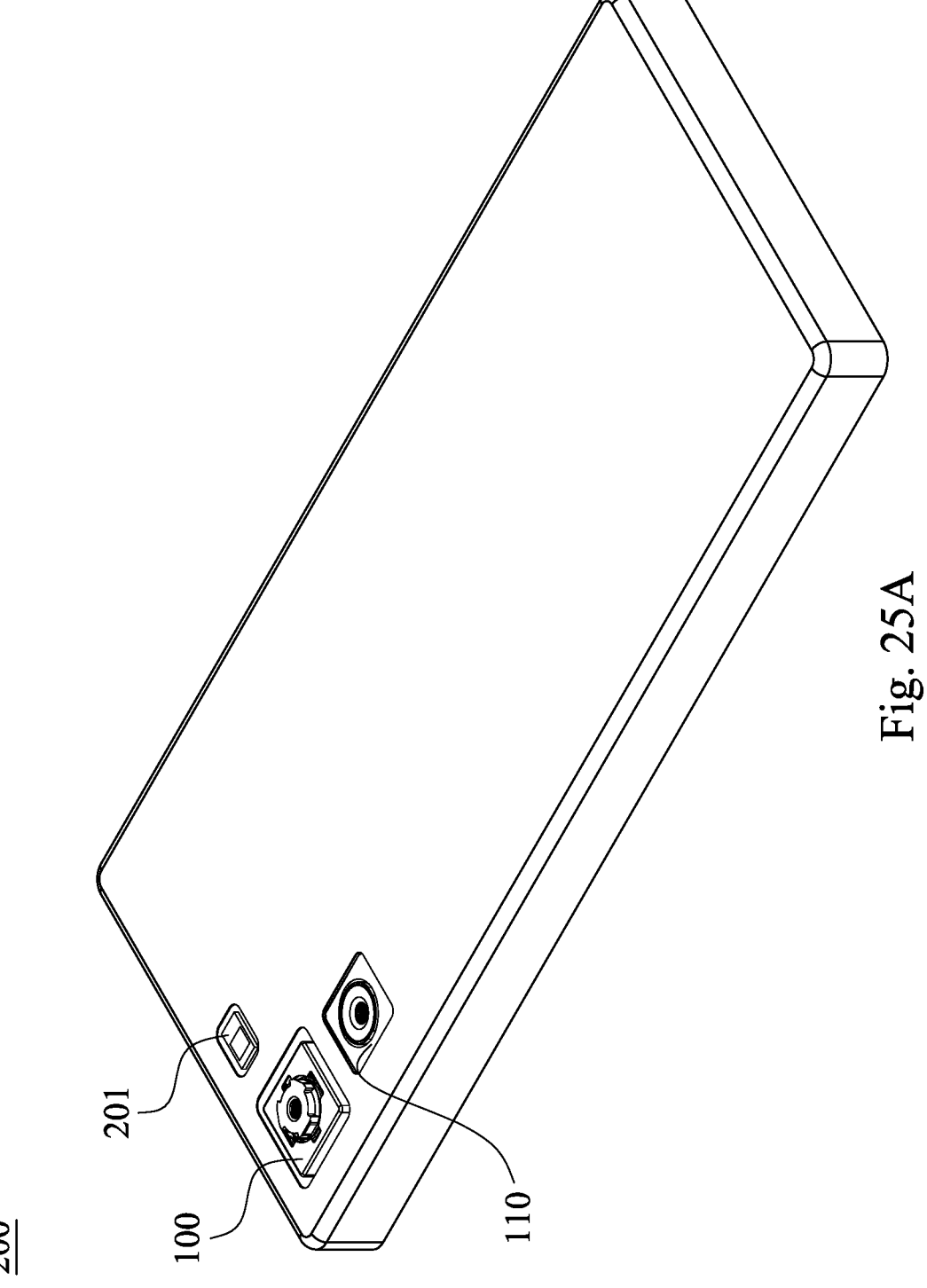
FIG. 25A is a schematic view of one side of an electronic device according to the 13th embodiment of the present disclosure.
Figure 25B:
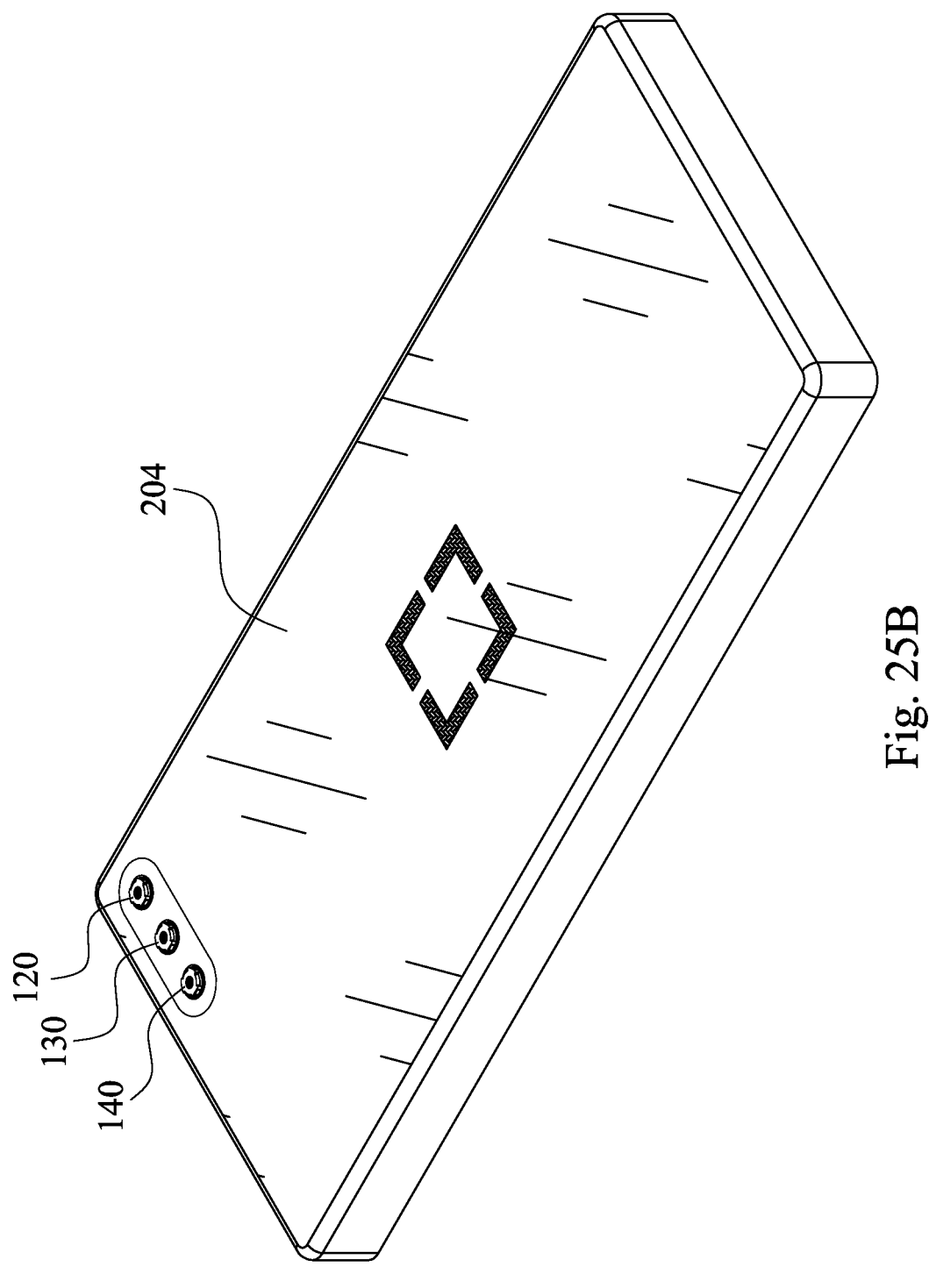
FIG. 25B is a schematic view of another side of the electronic device of FIG. 25A.
Figure 25C:
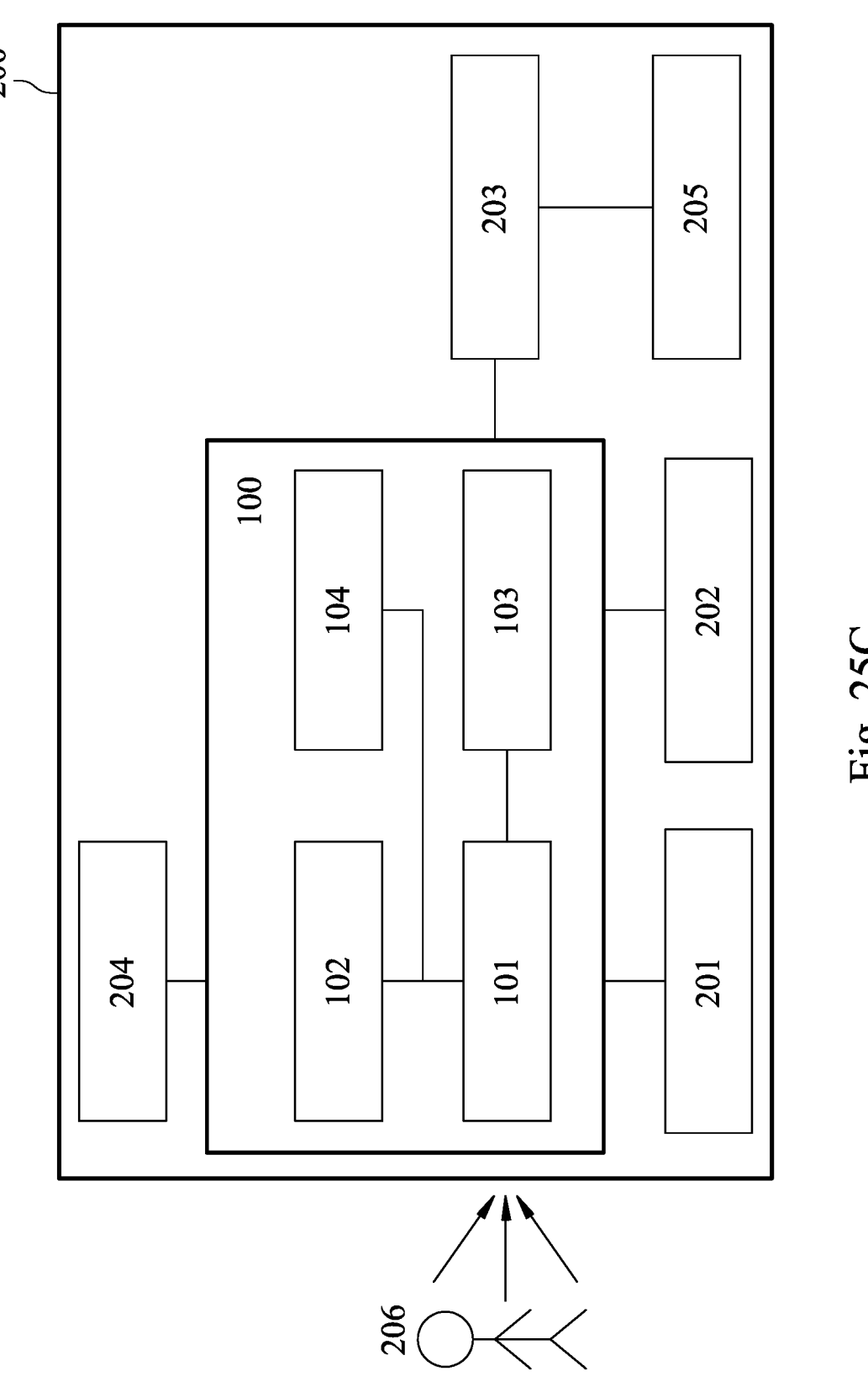
FIG. 25C is a system schematic view of the electronic device of FIG. 25A.

FIG. 25A is a schematic view of one side of an electronic device 200 according to the 13th embodiment of the present disclosure. FIG. 25B is a schematic view of another side of the electronic device 200 of FIG. 25A. FIG. 25C is a system schematic view of the electronic device 200 of FIG. 25A. In FIGS. 25A, 25B and 25C, the electronic device 200 according to the 13th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 13th embodiment can include the imaging optical system lens assembly of the present disclosure, and can be the same or similar to the imaging apparatus 100 according to the aforementioned 12th embodiment, and will not describe again herein. In detail, according to the 13th embodiment, the imaging apparatuses 100, 110 can be wide angle imaging apparatus and ultra-wide angle imaging apparatus, respectively. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 25C, or can be adaptively adjusted according to the type of the imaging apparatuses, which will not be shown and detailed described again.

14th Embodiment

Figure 26:
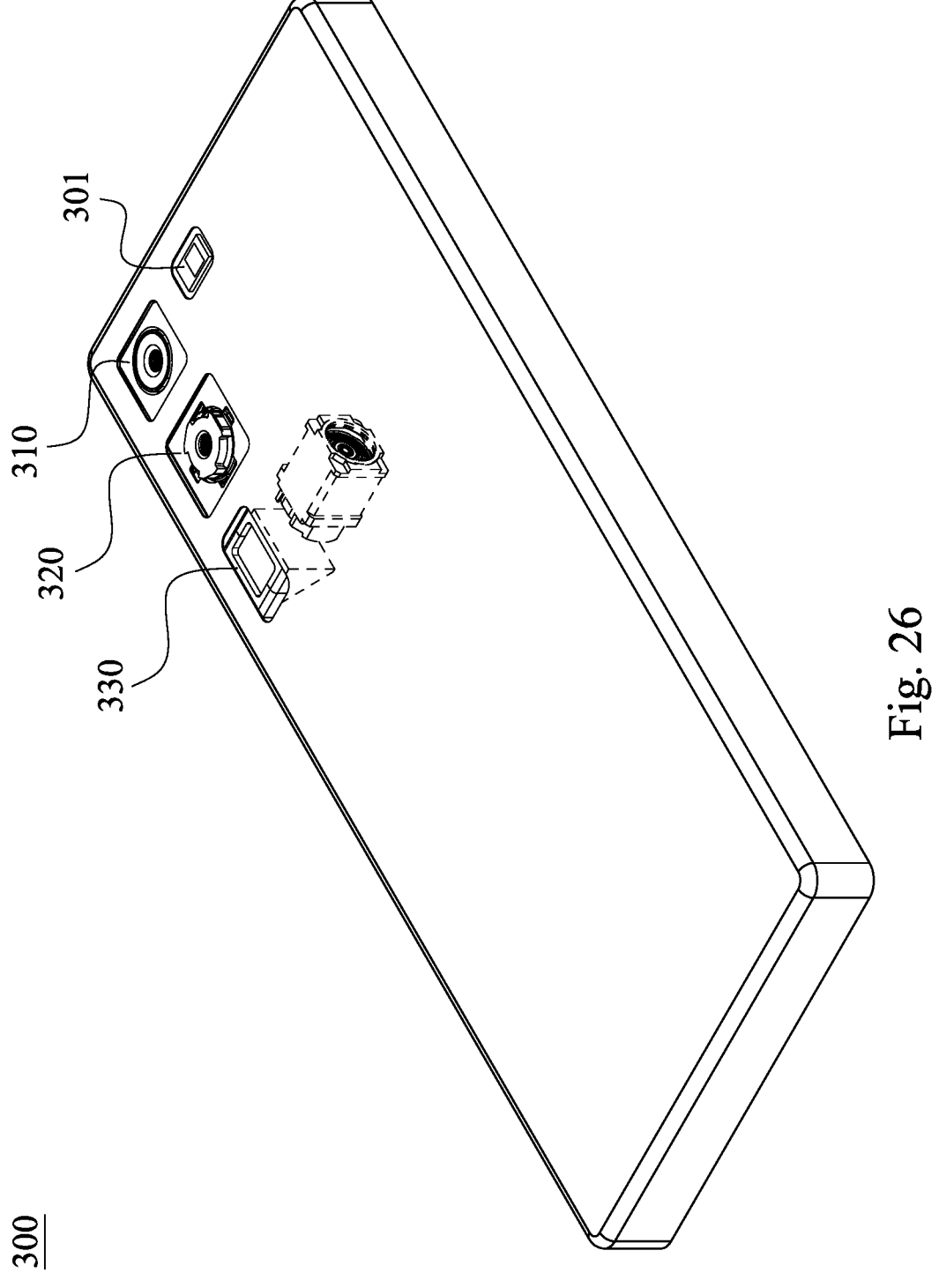
FIG. 26 is a schematic view of one side of an electronic device according to the 14th embodiment of the present disclosure.

FIG. 26 is a schematic view of one side of an electronic device 300 according to the 14th embodiment of the present disclosure. According to the 14th embodiment, the electronic device 300 is a smartphone, which include imaging apparatuses 310, 320, 330 and a flash module 301.

The electronic device 300 according to the 14th embodiment can include the same or similar elements to that according to the 13th embodiment, and each of the imaging apparatuses 310, 320, 330 according to the 14th embodiment can have a configuration which is the same or similar to that according to the 13th embodiment, and will not describe again herein. In detail, according to the 14th embodiment, each of the imaging apparatuses 310, 320, 330 can include the imaging optical system lens assembly of the present disclosure, and can be the same or similar to the imaging apparatus 100 according to the aforementioned 12th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

15th Embodiment

Figure 27:
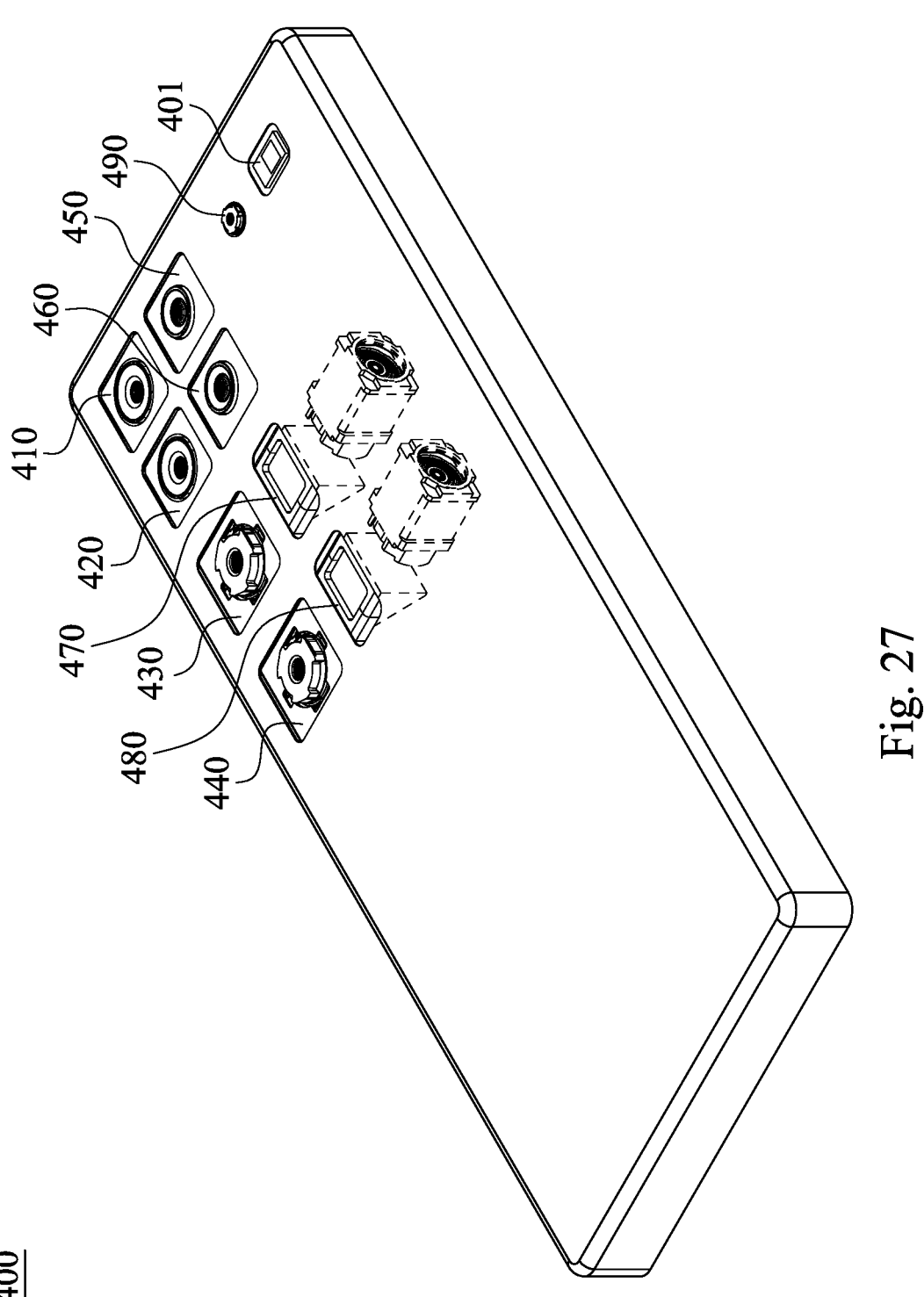
FIG. 27 is a schematic view of one side of an electronic device according to the 15th embodiment of the present disclosure.

FIG. 27 is a schematic view of one side of an electronic device 400 according to the 15th embodiment of the present disclosure. According to the 15th embodiment, the electronic device 400 is a smartphone, which include imaging apparatuses 410, 420, 430, 440, 450, 460, 470, 480, 490 and a flash module 401.

The electronic device 400 according to the 15th embodiment can include the same or similar elements to that according to the 13th embodiment, and each of the imaging apparatuses 410, 420, 430, 440, 450, 460, 470, 480, 490 and the flash module 401 can have a configuration which is the same or similar to that according to the 13th embodiment, and will not describe again herein. In detail, according to the 15th embodiment, each of the imaging apparatuses 410, 420, 430, 440, 450, 460, 470, 480, 490 can include the image capturing system lens assembly of the present disclosure, and can be the same or similar to the imaging apparatus 100 according to the aforementioned 12th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

16th Embodiment

Figures 28A, 28B:
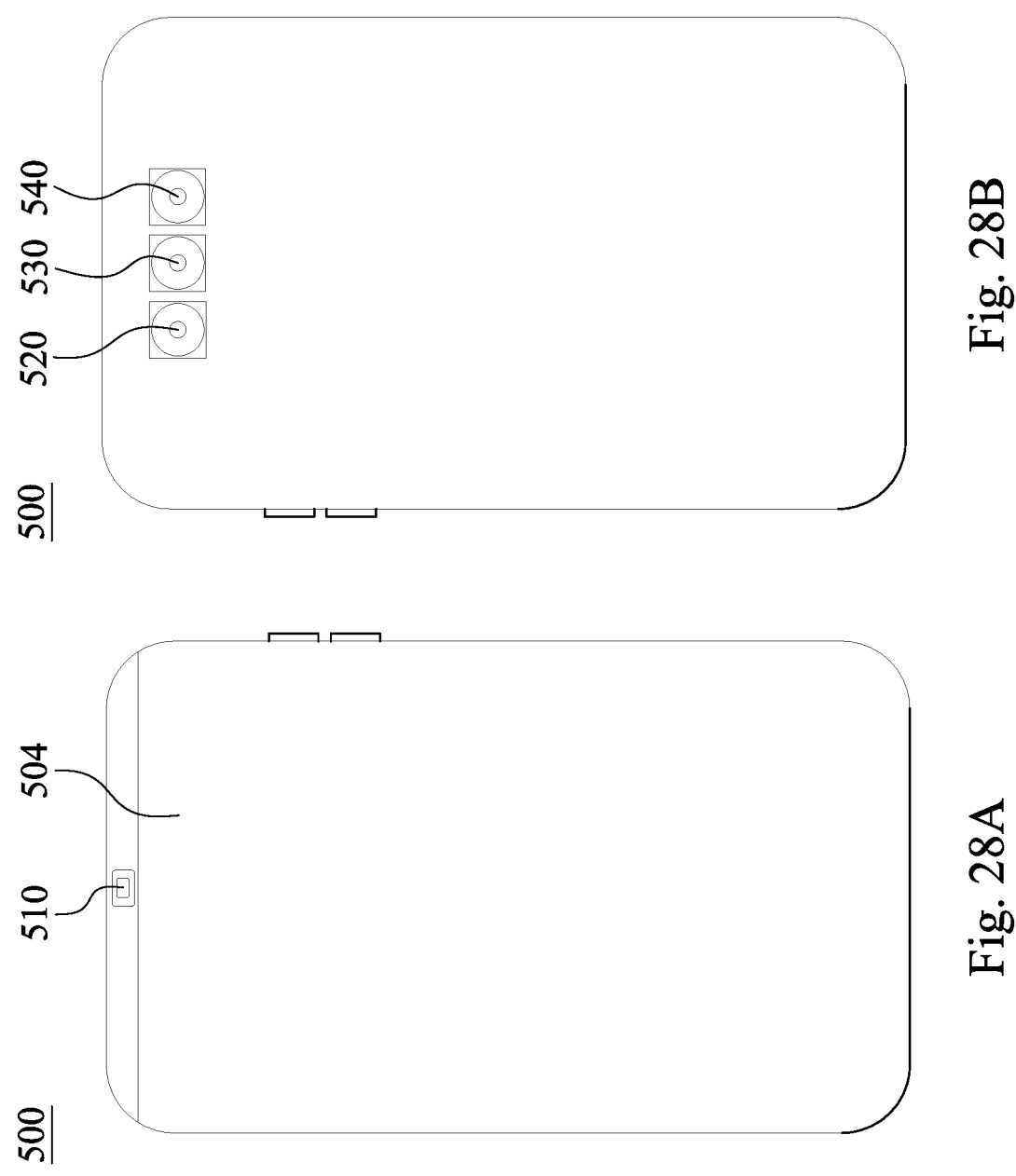
FIG. 28A is a schematic view of one side of an electronic device according to the 16th embodiment of the present disclosure.
FIG. 28B is a schematic view of another side of the electronic device according to the 16th embodiment of FIG. 28A.

FIG. 28A is a schematic view of one side of an electronic device 500 according to the 16th embodiment of the present disclosure. FIG. 28B is a schematic view of another side of the electronic device 500 according to the 16th embodiment of FIG. 28A. In FIG. 28A and FIG. 28B, according to the 16th embodiment, the electronic device 500 is a smartphone, which include imaging apparatuses 510, 520, 530, 540 and a user interface 504.

The electronic device 500 according to the 16th embodiment can include the same or similar elements to that according to the 13th embodiment, and each of the imaging apparatuses 510, 520, 530, 540 and the user interface 504 can have a configuration which is the same or similar to that according to the 13th embodiment, and will not describe again herein. In detail, according to the 16th embodiment, the imaging apparatus 510 corresponds to a non-circular opening located on an outer side of the electronic device 500 for capturing the image, and the imaging apparatuses 520, 530, 540 can be telephoto imaging apparatus, wide angle imaging apparatus and ultra-wide angle imaging apparatus, respectively, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system lens assembly comprising six lens elements, the six lens elements being, in order from an object side to an image side along an optical path:

a first lens element, a second lens element, a third lens element, a fourth lens element, a fifth lens element and a sixth lens element, each of the six lens elements has an object-side surface towards the object side and an image-side surface towards the image side;

wherein the first lens element has negative refractive power, the object-side surface of the first lens element is concave in a paraxial region thereof, the image-side surface of the first lens element is convex in a paraxial region thereof; the second lens element has positive refractive power, the object-side surface of the second lens element is convex in a paraxial region thereof, the image-side surface of the second lens element is concave in a paraxial region thereof; the fifth lens element has positive refractive power;

wherein a central thickness of the third lens element is CT3, a central thickness of the fourth lens element is CT4, a central thickness of the fifth lens element is CT5, a focal length of the imaging optical system lens assembly is f, a focal length of the fourth lens element is f4, a focal length of the sixth lens element is f6, an Abbe number of the second lens element is V2, an Abbe number of the fourth lens element is V4, and the following conditions are satisfied:

$5.30<(CT3+CT5)/CT4<15.0;$ $-2.10<f/f4<1.00;$ $-0.35<f/f6<0.90;$ and $12<(V2+V4)/2\leq20.3.$

2. The imaging optical system lens assembly of claim 1, wherein the focal length of the imaging optical system lens assembly is f, an axial distance between the first lens element and the second lens element is T12, an axial distance between the second lens element and the third lens element is T23, and the following condition is satisfied:

$1.70<f/(T12+T23)<3.80.$

3. The imaging optical system lens assembly of claim 1, wherein a focal length of the third lens element is f3, a focal length of the fifth lens element is f5, and the following condition is satisfied:

$-0.50<f3/f5<2.80.$

4. The imaging optical system lens assembly of claim 1, wherein the focal length of the imaging optical system lens assembly is f, the central thickness of the third lens element is CT3, the central thickness of the fifth lens element is CT5, and the following condition is satisfied:

$0.90<f/(CT3+CT5)<1.27.$

5. The imaging optical system lens assembly of claim 1, wherein a curvature radius of the object-side surface of the sixth lens element is R11, a curvature radius of the image-side surface of the sixth lens element is R12, and the following condition is satisfied:

$5.00<(R11+R12)/(R11-R12)<20.0.$

6. The imaging optical system lens assembly of claim 1, wherein a curvature radius of the object-side surface of the third lens element is R5, a curvature radius of the image-side surface of the third lens element is R6, the focal length of the imaging optical system lens assembly is f, an axial distance between the fourth lens element and the fifth lens element is T45, and the following conditions are satisfied:

$-1.70<(R5+R6)/(R5-R6)<0.40;$ and $18.0<f/T45<65.0.$

7. The imaging optical system lens assembly of claim 1, wherein the Abbe number of the second lens element is V2, the Abbe number of the fourth lens element is V4, and the following condition is satisfied:

$15<(V2+V4)/2<20.$

8. An imaging apparatus, comprising:
the imaging optical system lens assembly of claim 1; and
an image sensor disposed on an image surface of the imaging optical system lens assembly.

9. An electronic device, comprising:
the imaging apparatus of claim 8.

10. An imaging optical system lens assembly comprising six lens elements, the six lens elements being, in order from an object side to an image side along an optical path:
a first lens element, a second lens element, a third lens element, a fourth lens element, a fifth lens element and a sixth lens element, each of the six lens elements has an object-side surface towards the object side and an image-side surface towards the image side;
wherein the first lens element has negative refractive power, the object-side surface of the first lens element is concave in a paraxial region thereof, the image-side surface of the first lens element is convex in a paraxial region thereof; the image-side surface of the second lens element is concave in a paraxial region thereof; the fifth lens element has positive refractive power; at least one surface of at least one of the six lens elements comprises at least one inflection point;
wherein a curvature radius of the image-side surface of the second lens element is R4, a curvature radius of the image-side surface of the sixth lens element is R12, a focal length of the imaging optical system lens assembly is f, a focal length of the sixth lens element is f6, an axial distance between the third lens element and the fourth lens element is T34, an axial distance between the fourth lens element and the fifth lens element is T45, an axial distance between the fifth lens element and the sixth lens element is T56, an Abbe number of the second lens element is V2, an Abbe number of the fourth lens element is V4, and the following conditions are satisfied:

$1.60<(R4+R12)/(R4-R12)<3.30;$ $4.22<f/(T34+T45+T56)<15.0;$ $-0.63<f/f6<1.20;$ and $12<(V2+V4)/2\leq20.3.$

11. The imaging optical system lens assembly of claim 10, wherein the focal length of the imaging optical system lens assembly is f, a focal length of the fifth lens element is f5, a curvature radius of the image-side surface of the fifth lens element is R10, the curvature radius of the image-side surface of the sixth lens element is R12, and the following conditions are satisfied:

$0.18<f/f5<1.00;$ and $R10/R12<-1.60.$

12. The imaging optical system lens assembly of claim 10, wherein the focal length of the imaging optical system lens assembly is f, a composite focal length of the second lens element and the third lens element is f23, and the following condition is satisfied:

$-0.20<f/f23<1.50.$

13. The imaging optical system lens assembly of claim 10, wherein a curvature radius of the object-side surface of the third lens element is R5, a curvature radius of the image-side surface of the third lens element is R6, the focal length of the imaging optical system lens assembly is f, the axial distance between the fourth lens element and the fifth lens element is T45, and the following conditions are satisfied:

$-5.00<(R5+R6)/(R5-R6)<1.50;$ and $20.0<f/T45<60.0.$

14. The imaging optical system lens assembly of claim 10, further comprising:
an aperture stop, wherein an axial distance between the aperture stop and an image surface is SL, the focal length of the imaging optical system lens assembly is f, and the following condition is satisfied:

$2.05<SL/f<2.75.$

15. The imaging optical system lens assembly of claim 10, wherein at least one of the object-side surface and the image-side surface of the fifth lens element comprises at least one critical point in an off-axis region thereof; a curvature radius of the object-side surface of the second lens element is R3, an axial distance between the first lens element and the second lens element is T12, and the following condition is satisfied:

$$2.50 < R3/T12 < 17.0.$$

16. The imaging optical system lens assembly of claim 10, wherein a curvature radius of the object-side surface of the sixth lens element is R11, the curvature radius of the image-side surface of the sixth lens element is R12, the focal length of the imaging optical system lens assembly is f, an axial distance between the first lens element and the second lens element is T12, an axial distance between the second lens element and the third lens element is T23, and the following conditions are satisfied:

$$5.50 < (R11+R12)/(R11-R12) < 19.0; \text{ and}$$

$$1.80 < f/(T12+T23) < 3.75.$$

17. The imaging optical system lens assembly of claim 10, wherein a refractive index of the second lens element is N2, a refractive index of the fourth lens element is N4, and the following condition is satisfied:

$$1.62 < (N2+N4)/2 < 1.79.$$

18. An imaging optical system lens assembly comprising six lens elements, the six lens elements being, in order from an object side to an image side along an optical path:

a first lens element, a second lens element, a third lens element, a fourth lens element, a fifth lens element and a sixth lens element, each of the six lens elements has an object-side surface towards the object side and an image-side surface towards the image side;

wherein the first lens element has negative refractive power, the object-side surface of the first lens element is concave in a paraxial region thereof, the image-side surface of the first lens element is convex in a paraxial region thereof; the third lens element has positive refractive power; the image-side surface of the sixth lens element is concave in a paraxial region thereof; at least one surface of at least one of the six lens elements comprises at least one inflection point;

wherein a curvature radius of the image-side surface of the second lens element is R4, a curvature radius of the image-side surface of the fifth lens element is R10, a curvature radius of the image-side surface of the sixth lens element is R12, a focal length of the imaging optical system lens assembly is f, a focal length of the fourth lens element is f4, a focal length of the sixth lens element is f6, an Abbe number of the second lens element is V2, an Abbe number of the fourth lens element is V4, and the following conditions are satisfied:

$$(R4+R12)/(R4-R12) < 2.32;$$

$$-0.65 < f/f4 < 0.80;$$

$$-0.37 < f/f6 < 1.00;$$

$$-4.00 < R10/R12 < -1.55; \text{ and}$$

$$12 < (V2+V4)/2 \leq 20.3.$$

19. The imaging optical system lens assembly of claim 18, wherein an axial distance between the fourth lens element and the fifth lens element is T45, a central thickness of the fourth lens element is CT4, and the following condition is satisfied:

$$0.05 < T45/CT4 < 0.35.$$

20. The imaging optical system lens assembly of claim 18, wherein a curvature radius of the object-side surface of the third lens element is R5, a curvature radius of the image-side surface of the third lens element is R6, and the following condition is satisfied:

$$-1.68 < (R5+R6)/(R5-R6) < 0.38.$$

21. The imaging optical system lens assembly of claim 18, wherein the focal length of the imaging optical system lens assembly is f, the focal length of the fourth lens element is f4, an axial distance between the fourth lens element and the fifth lens element is T45, and the following conditions are satisfied:

$$-0.38 < f/f4 < 0.80; \text{ and}$$

$$20.0 < f/T45 < 60.0.$$

22. The imaging optical system lens assembly of claim 18, wherein the focal length of the imaging optical system lens assembly is f, a central thickness of the third lens element is CT3, a central thickness of the fifth lens element is CT5, an axial distance between the fourth lens element and the fifth lens element is T45, and the following conditions are satisfied:

$$0.50 < f/(CT3+CT5) < 1.65; \text{ and}$$

$$20.0 < f/T45 < 70.0.$$

23. The imaging optical system lens assembly of claim 18, wherein the Abbe number of the second lens element is V2, the Abbe number of the fourth lens element is V4, and the following condition is satisfied:

$$15 < (V2+V4)/2 < 20.$$

24. The imaging optical system lens assembly of claim 18, wherein the image-side surface of the second lens element is concave in a paraxial region thereof; an f-number of the imaging optical system lens assembly is Fno, a half of a maximum field of view of the imaging optical system lens assembly is HFOV, and the following conditions are satisfied:

$$1.95 < Fno < 2.20; \text{ and}$$

$$58 \text{ degrees} < HFOV.$$

25. The imaging optical system lens assembly of claim 18, wherein a curvature radius of the object-side surface of the sixth lens element is R11, the curvature radius of the image-side surface of the sixth lens element is R12, and the following condition is satisfied:

$$4.90 < (R11+R12)/(R11-R12) < 17.0.$$

26. An imaging optical system lens assembly comprising six lens elements, the six lens elements being, in order from an object side to an image side along an optical path:

a first lens element, a second lens element, a third lens element, a fourth lens element, a fifth lens element and a sixth lens element, each of the six lens elements has an object-side surface towards the object side and an image-side surface towards the image side;

wherein the first lens element has negative refractive power; at least one surface of at least one of the six lens elements comprises at least one inflection point;

wherein the imaging optical system lens assembly further comprises an aperture stop, an axial distance between the aperture stop and an image surface is SL, a focal length of the imaging optical system lens assembly is f, a focal length of the sixth lens element is f6, a composite focal length of the second lens element and the third lens element is f23, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a central thickness of the third lens element is CT3, a central thickness of the fourth lens element is CT4, a central thickness of the fifth lens element is CT5, an Abbe number of the second lens element is V2, an Abbe number of the fourth lens element is V4, and the following conditions are satisfied:

$$4.50 < (CT3+CT5)/CT4 < 8.00;$$

$$1.95 < f/(T12+T23) < 16.0;$$

$$3.70 < f/(T34+T45+T56) < 14.5;$$

$$-0.10 < f/f23 < 0.92;$$

$$-0.25 < f/f6 < 0.55;$$

$$2.00 < SL/f < 2.90; \text{ and}$$

$$12 < (V2+V4)/2 \le 20.3.$$

27. The imaging optical system lens assembly of claim 26, wherein the focal length of the imaging optical system lens assembly is f, a focal length of the fourth lens element is f4, the axial distance between the fourth lens element and the fifth lens element is T45, and the following conditions are satisfied:

$$-1.00 < f/f4 < 1.30; \text{ and}$$

$$20.0 < f/T45 < 60.0.$$

28. The imaging optical system lens assembly of claim 26, wherein the object-side surface of the first lens element is concave in a paraxial region thereof; a focal length of the third lens element is f3, a focal length of the fifth lens element is f5, and the following condition is satisfied:

$$0.20 < f3/f5 < 2.70.$$

29. The imaging optical system lens assembly of claim 26, wherein the focal length of the imaging optical system lens assembly is f, a focal length of the fourth lens element is f4, a curvature radius of the image-side surface of the second lens element is R4, a curvature radius of the image-side surface of the sixth lens element is R12, and the following conditions are satisfied:

$$-0.55 < f/f4 < 0.70; \text{ and}$$

$$1.70 < (R4+R12)/(R4-R12) < 2.30.$$

30. The imaging optical system lens assembly of claim 26, wherein a curvature radius of the object-side surface of the sixth lens element is R11, a curvature radius of the image-side surface of the sixth lens element is R12, and the following condition is satisfied:

$$7.00 < (R11+R12)/(R11-R12) < 17.$$

31. The imaging optical system lens assembly of claim 26, wherein the object-side surface of the first lens element is concave in a paraxial region thereof, the image-side surface of the first lens element is convex in a paraxial region thereof; a curvature radius of the image-side surface of the second lens element is R4, a curvature radius of the image-side surface of the sixth lens element is R12, and the following condition is satisfied:

$$1.35 < (R4+R12)/(R4-R12) < 5.00.$$

32. The imaging optical system lens assembly of claim 26, wherein a refractive index of the second lens element is N2, a refractive index of the fourth lens element is N4, and the following condition is satisfied:

$$1.62 < (N2+N4)/2 < 1.79.$$

* * * * *